United States Patent
Wang

(10) Patent No.: US 12,468,554 B2
(45) Date of Patent: Nov. 11, 2025

(54) METHOD FOR DISPLAYING CONTENT BY DETERMINING CONTENT TO BE DISPLAYED ASSOCIATED WITH RELATED CONTENT AND DISPLAYING CONTENT IN APPLICATION PROGRAM IN QUICK APPLICATION

(71) Applicant: Huawei Technologies Co., Ltd., Shenzhen (CN)

(72) Inventor: Baoyuan Wang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/268,157

(22) PCT Filed: Dec. 13, 2021

(86) PCT No.: PCT/CN2021/137539
§ 371 (c)(1),
(2) Date: Jun. 16, 2023

(87) PCT Pub. No.: WO2022/127743
PCT Pub. Date: Jun. 23, 2022

(65) Prior Publication Data
US 2024/0069932 A1     Feb. 29, 2024

(30) Foreign Application Priority Data

Dec. 18, 2020   (CN) .......................... 202011515114.1
Dec. 29, 2020   (CN) .......................... 202011599878.3
Apr. 25, 2021   (CN) .......................... 202110452487.7

(51) Int. Cl.
*G06F 9/445* (2018.01)

(52) U.S. Cl.
CPC ............................... *G06F 9/44584* (2013.01)

(58) Field of Classification Search
CPC .................................................. G06F 9/44584
See application file for complete search history.

(56) References Cited

U.S. PATENT DOCUMENTS

| 12,299,421 B2* | 5/2025 | Kol ........................ G06F 40/154 |
| 2017/0064004 A1* | 3/2017 | Volkmer ................... G06F 8/30 |
| 2022/0019640 A1* | 1/2022 | Hermann ............... G06F 16/214 |

FOREIGN PATENT DOCUMENTS

| CN | 107438057 A | | 12/2017 | |
| CN | 109144615 A | | 1/2019 | |
| CN | 110182272 | * | 2/2020 | ......... G06Q 30/0241 |
| CN | 110781432 A | | 2/2020 | |
| CN | 110782272 A | | 2/2020 | |

(Continued)

*Primary Examiner* — Tammara R Peyton
(74) *Attorney, Agent, or Firm* — Slater Matsil, LLP

(57) ABSTRACT

A content display method and a terminal device are provided. The method includes obtaining target configuration data for a target quick application. A user terminal determines, in response to a trigger operation on second related content in the target quick application, to-be-displayed content associated with the second related content, and if the target configuration data includes an opening manner for the to-be-displayed content, the user terminal opens an interface including the to-be-displayed content based on the opening manner for the to-be-displayed content that is included in the target configuration data.

20 Claims, 30 Drawing Sheets

(56) References Cited

FOREIGN PATENT DOCUMENTS

| CN | 110990075 | * | 4/2020 | |
|----|-----------|---|--------|---|
| CN | 110990075 A | | 4/2020 | |
| CN | 111212313 | * | 5/2020 | ............. G06F 16/74 |
| CN | 111212313 A | | 5/2020 | |

* cited by examiner

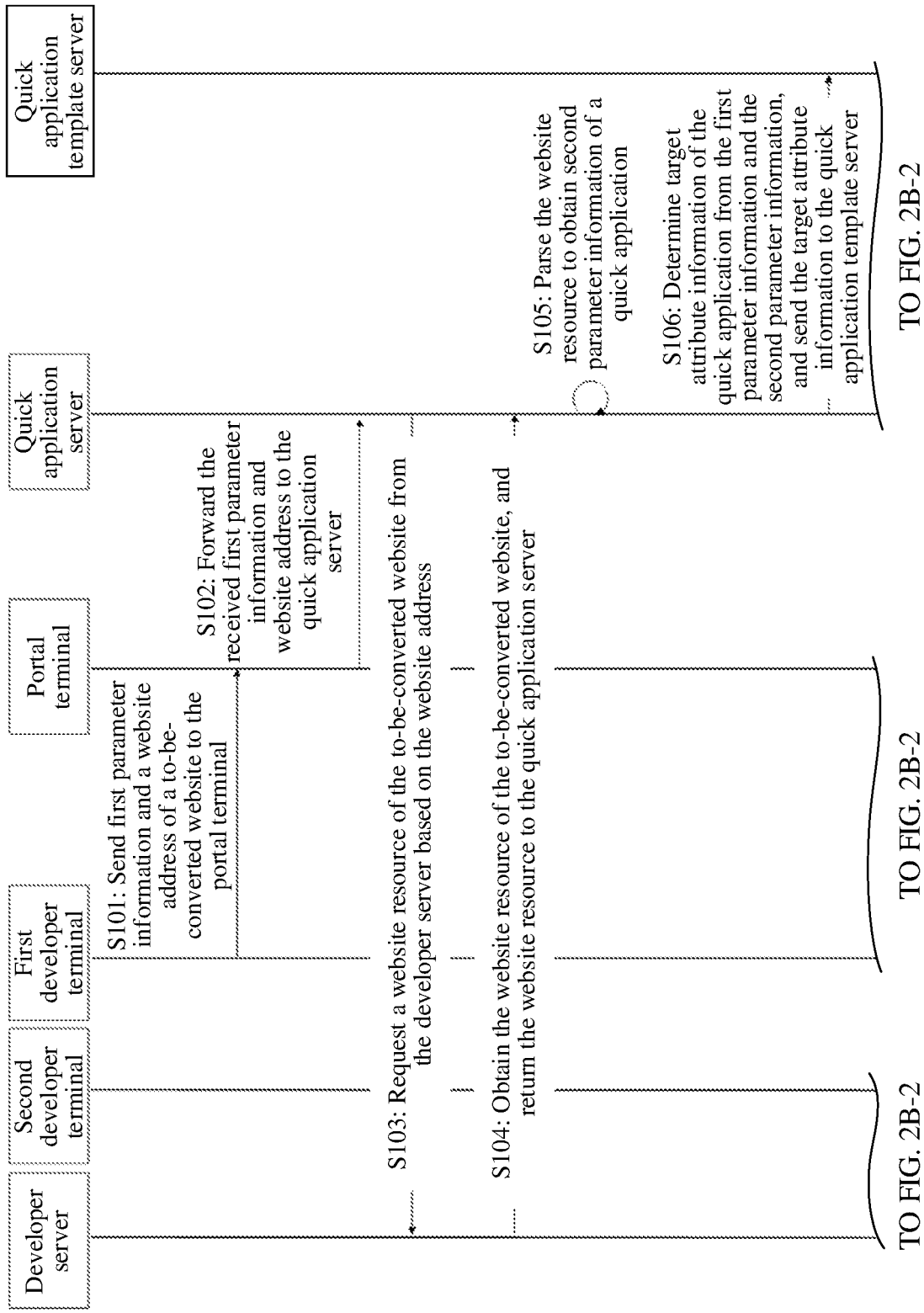

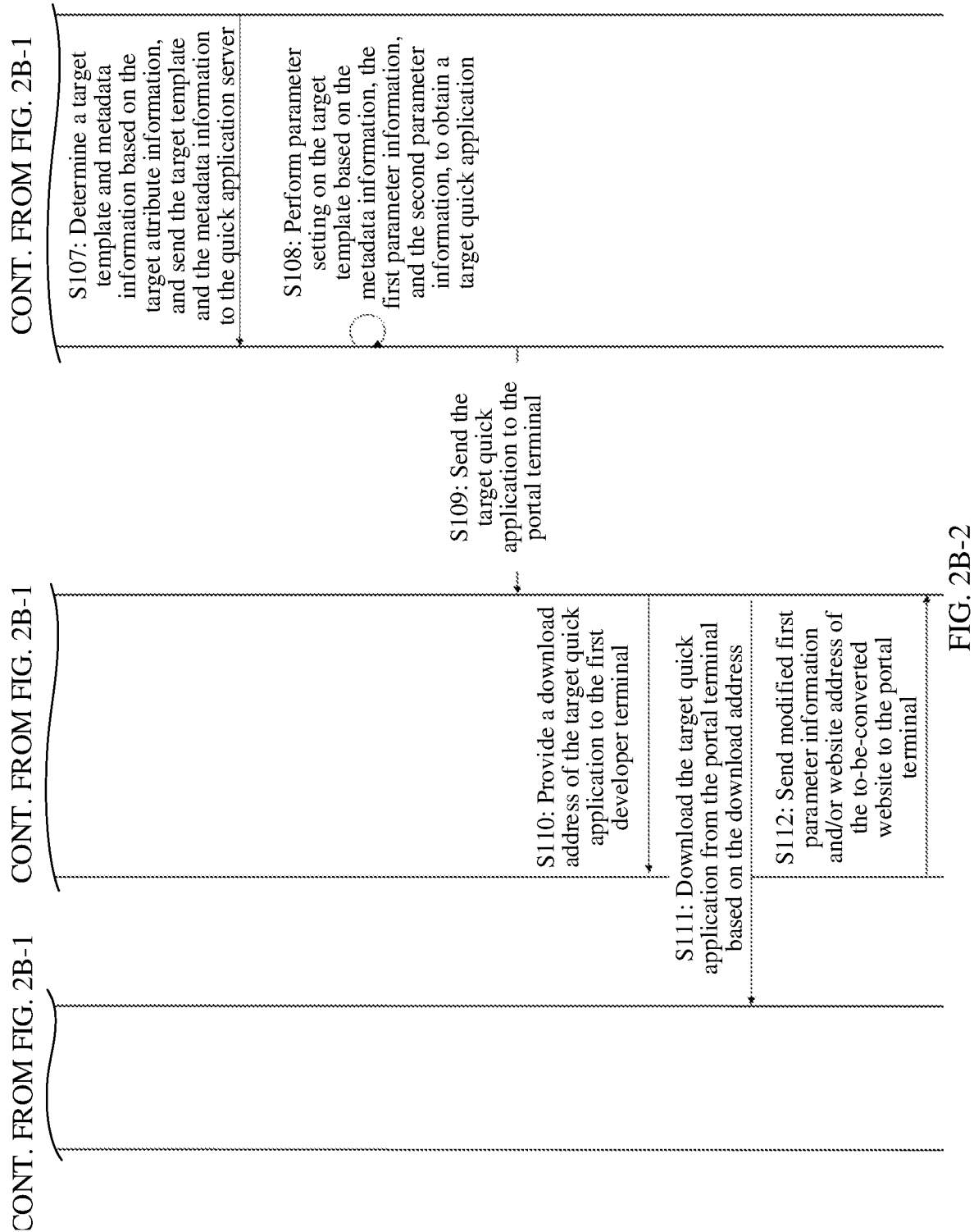

FIG. 2C

\* Website address of to-be-converted website (a)

(b)

METHOD FOR DISPLAYING CONTENT BY DETERMINING CONTENT TO BE DISPLAYED ASSOCIATED WITH RELATED CONTENT AND DISPLAYING CONTENT IN APPLICATION PROGRAM IN QUICK APPLICATION

CROSS-REFERENCE TO RELATED APPLICATIONS

This application is a national stage of International Application No. PCT/CN2021/137539, filed on Dec. 13, 2021, which claims priority to Chinese Patent Application No. 202011515114.1, filed on Dec. 18, 2020 and Chinese Patent Application No. 202011599878.3, filed on Dec. 29, 2020 and Chinese Patent Application No. 202110452487.7, filed on Apr. 25, 2021. All the aforementioned applications are hereby incorporated by reference in their entireties.

TECHNICAL FIELD

This application belongs to the field of quick application technologies, and in particular, to a content display method and a terminal device.

BACKGROUND

An application program in a mobile terminal may provide rich service functions for a user. However, before using an application program, the user needs to first download an application program installation package and install the application program on the mobile terminal. As a result, the application program consumes a relatively large storage resource of the mobile terminal of the user, and a period from downloading to use of the application program is relatively long, thereby deteriorating overall use experience of the user.

In March 2018, a number of mainstream mobile terminal manufacturers in China jointly established the quick application alliance. The quick application alliance proposes a new application form: quick application, and made unification from a technical specification level, so that quick applications can run on different mobile terminals. Compared with a traditional application program, a quick application does not need to be downloaded and installed in advance, and can be used after a user taps the quick application. The quick application is easy to use and application content can be experienced smoothly. Many service functions that can be used in traditional application programs can be easily implemented in quick applications. In this way, the user can quickly enjoy rich service functions without worrying about excessive consumption of storage resources of the mobile terminal. Therefore, the quick application has gradually become a mainstream application. However, in a development process of quick applications, the development is difficult and a development period is long. In addition, in a process of using the quick application, login to the quick application is complex, and an effect of displaying content other than service content of the quick application is poor.

SUMMARY

In view of this, embodiments of this application provide a quick application generation method and a server, to resolve a problem in a current technology that quick application development is relatively difficult and requires a long period. In addition, a quick application login method and a terminal device are provided, so as to resolve a problem in the current technology that a quick application login operation is complicated and inefficient. A content display login method and a terminal device are further provided, so as to resolve a problem in the current technology that a quick application has a poor display effect on content other than service content of the quick application.

A first aspect of the embodiments of this application provides a quick application generation method. The method is applied to a server, and includes: obtaining first parameter information and a website address of a to-be-converted website that are sent by a first developer terminal, and obtaining a website resource of the to-be-converted website based on the website address; then parsing the website resource of the to-be-converted website to obtain second parameter information; then obtaining a target template based on the first parameter information and the second parameter information, where the target template is a set of files in which parameters of some content are to be set; and finally performing parameter setting on the target template based on the first parameter information and the second parameter information, to obtain a target quick application.

According to this embodiment of this application, a developer may provide some parameter information (namely, the first parameter information) of the quick application and the website address of the to-be-converted website for a quick application server as required. The quick application server obtains other parameter information (that is, the second parameter information) of the quick application from the resource of the to-be-converted website based on the website address. Finally, an appropriate target template is obtained based on the first parameter information and the second parameter information, and parameter setting is performed, to obtain the target quick application that meets a requirement of the developer. Therefore, compared with using a professional development tool to perform code development, this embodiment of this application can lower a threshold for quick application development and reduce development difficulty. In addition, a development cycle can be shortened and development efficiency can be improved. Finally, the first developer terminal used by the developer in this embodiment of this application may not be capable of running the development tool, provided that the first developer terminal has a function of providing the first parameter information. Therefore, this embodiment of this application has extremely strong compatibility with a development environment, and has high convenience.

The first developer terminal may directly send the first parameter information and the website address of the to-be-converted website to the quick application server, or may send the first parameter information and the website address of the to-be-converted website to the quick application server through forwarding by one or more terminal devices. For example, the first parameter information and the website address of the to-be-converted website may be first sent to a portal terminal, and then forwarded by the portal terminal to the quick application server.

With reference to the first aspect, in a first possible implementation of the first aspect, the first parameter information includes access information of the to-be-converted website.

The obtaining a website resource of the to-be-converted website based on the website address includes: requesting the website resource of the to-be-converted website from a developer server based on the access information and the website address; and receiving the website resource of the to-be-converted website returned by the developer server.

In actual application, some websites may set access restrictions on some website resources, for example, a login user or an authorized user is required to access a website resource, for another example, a website may be inconvenient or cannot be directly accessed, proxy access is required. Therefore, to effectively obtain the website resource of the to-be-converted website, in this embodiment of this application, the developer may provide the access information of the to-be-converted website in the first parameter information. The to-be-converted website is accessed by using the access information, so that a restriction on accessing the website resource of the to-be-converted website can be reduced or lifted, so that the website resource of the to-be-converted website can be effectively obtained in this embodiment of this application.

With reference to the first aspect, in a possible implementation of the first aspect, the obtaining a website resource of the to-be-converted website based on the website address includes:

first determining, based on language configuration information in the first parameter information, one or more language types supported by the to-be-converted website, or obtaining one or more preset language types; and then requesting, based on the website address, the website resource of the to-be-converted website from the developer server one or more times, where each request carries a parameter value of a requested language type, and parameter values of requested language types carried in different requests are different, the requested language types belong to one or more language types, and the parameter value is used to notify the developer server of a language type of the website resource requested by the server; and finally receiving the website resource of the to-be-converted website returned by the developer server.

In actual application, when the to-be-converted website supports a plurality of languages, each language of the to-be-converted website corresponds to a website resource in the language. To enable the generated target quick application to support a plurality of languages like the to-be-converted website, website resources of the to-be-converted website in different languages need to be obtained. Therefore, in this embodiment of this application, the language type supported by the to-be-converted website may be determined based on the language configuration information set by the developer, or a skilled person may preset a plurality of requested language types. Because a website resource in each language needs to be requested separately, after determining the language types that need to be requested, the quick application server requests the website resource of the to-be-converted website from the developer server for a plurality of times, and sets a different language type parameter value in the request each time until all required language types are requested. Therefore, in this embodiment of this application, the website resources in different language types of the to-be-converted website can be effectively obtained, so that the finally generated target quick application is more suitable for an actual situation of the to-be-converted website. Therefore, the generated target quick application is more accurate and reliable, and is more suitable for an actual requirement of the developer.

With reference to the first aspect, in a possible implementation of the first aspect, the parsing the website resource of the to-be-converted website to obtain second parameter information includes:

constructing a document object model node tree of the to-be-converted website based on the website resource, and determining the second parameter information from the website resource based on the document object model node tree.

In this embodiment of this application, an HTML document object model (Document Object Model, DOM) node tree of the to-be-converted website is constructed, to implement effective analysis of a structure of the to-be-converted website. Then, based on the DOM tree, the analysis and information extraction of the website resource can be carried out, and accurate and effective extraction of the second parameter information can be realized.

With reference to the first aspect, in a possible implementation of the first aspect, the parsing the website resource of the to-be-converted website to obtain second parameter information includes:

running a JavaScript script when the website resource includes the JavaScript script; after running of the JavaScript script is completed, constructing a document object model node tree of the to-be-converted website based on the website resource; and finally determining the second parameter information from the website resource based on the document object model node tree.

Considering that in actual application, the JS script may dynamically modify website content by using the DOM tree, in actual application, if the website has a JS script, an actual DOM tree structure of the website after the JS script is run may be different from an initial DOM tree structure. Based on this, to improve accuracy of the DOM tree and improve reliability of the second parameter information, in this embodiment of this application, when the website resource is being parsed, if the website resource includes a JS script, the quick application server first runs the JS script. Then, after running of the JS script is completed, the website resource is parsed and the DOM tree is generated, so as to obtain an actual reliable DOM. Therefore, in this embodiment of this application, accuracy and reliability of extracting the second parameter information can be improved.

With reference to the first aspect, in a possible implementation of the first aspect, the parsing the website resource of the to-be-converted website to obtain second parameter information includes:

processing the website resource by using a JavaScript engine, and constructing a document object model node tree of the to-be-converted website based on the website resource processed by the JavaScript engine; and finally determining the second parameter information from the website resource based on the document object model node tree.

Because there is no way to predict whether the resource file includes the JS script, it is difficult to predict whether the JS script needs to be run before constructing the DOM tree in actual application. To resolve this problem, in this embodiment of this application, a JS engine is preset. After receiving the website resource of the to-be-converted website, the quick application server puts the website resource into the JS engine for processing. If the JS script is included, the JS engine runs the JS script and then outputs a website resource obtained after the JS script is run. If the JS script is not included, the JS engine does not affect the website resource but directly outputs the input website resource. Finally, the website resource output by JS engine is parsed and the DOM tree is constructed.

With reference to the first aspect, in a possible implementation of the first aspect, the parsing the website resource of the to-be-converted website to obtain second parameter information includes:
- identifying, based on the website address, whether the to-be-converted website belongs to a progressive web page application type website;
- when the to-be-converted website belongs to the progressive web page application type website, finding a manifest.json file from the website resource, extracting the second parameter information from the manifest.json file, and determining whether extraction of the second parameter information is completed; and
- when extraction of the second parameter information is not completed, parsing the website resource to obtain remaining second parameter information that has not been extracted completely.

In actual application, there is a progressive web application (Progressive Web App, PWA) type website in the H5 website. This type of website encapsulates the website into a web application, and a website address header of the website has a specific identifier. In addition, some website information (such as a website name and a website icon) is stored in the manifest.json file of the website. Based on a feature of the PWA website, in this embodiment of this application, whether the to-be-converted website is a PWA website is first identified based on the website address. If the to-be-converted website is a PWA website, the manifest.json file is first extracted from the website resource, and the second parameter information is extracted from the manifest.json file. After the extraction of the manifest.json file is completed, it is determined whether the extraction of the second parameter information is completed. If the extraction of the second parameter information is not completed, the website resource continues to be parsed, so as to obtain the remaining second parameter information. Therefore, in this embodiment of this application, an extraction operation on a part of the second parameter information can be saved, and efficiency of parsing the second parameter information can be improved.

With reference to the first aspect, in a possible implementation of the first aspect, after the parsing the website resource of the to-be-converted website to obtain second parameter information, the method further includes:
- when the second parameter information includes language configuration information, determining, based on the language configuration information, all language types supported by the to-be-converted website; and
- when a quantity of language types supported by the to-be-converted website is greater than 1, requesting the website resource of the to-be-converted website from the developer server one or more times based on the website address, and receiving the website resource of the to-be-converted website that is returned by the developer server. Each request carries a parameter value of a requested language type, and parameter values of requested language types carried in different requests are different. The requested language types belong to the language types supported by the to-be-converted website, and the parameter value is used to notify the developer server of a language type of the website resource requested by the server.

In actual application, when the to-be-converted website supports a plurality of languages, each language of the to-be-converted website corresponds to a website resource in the language. To enable the generated target quick application to support a plurality of languages like the to-be-converted website, website resources of the to-be-converted website in different languages need to be obtained. Therefore, when the second parameter information includes the language configuration information, in this embodiment of this application, the language type supported by the to-be-switched website is determined based on the language configuration information. Because a website resource in each language needs to be requested separately, after determining the language types that need to be requested, the quick application server requests, from the developer server, a website resource of the to-be-converted website in a language type that has not been requested, until all the language types that need to be requested are requested. Therefore, in this embodiment of this application, the website resources in different language types of the to-be-converted website can be effectively obtained, so that the finally generated target quick application is more suitable for an actual situation of the to-be-converted website. Therefore, the generated target quick application is more accurate and reliable, and is more suitable for an actual requirement of the developer.

In addition, in this embodiment of this application, website resources for different language types can be automatically obtained without a need for the developer or the skilled person to set a language type. The whole process is automated, and the operation is simpler and more efficient. The determining of language types is more accurate and reliable. Therefore, obtaining of the website resources is more reliable.

With reference to the first aspect, in a possible implementation of the first aspect, after the parsing the website resource of the to-be-converted website to obtain second parameter information, the method further includes: sending the second parameter information to the first developer terminal, where the second parameter information is used for displaying information of the first developer terminal.

Correspondingly, the obtaining a target template based on the first parameter information and the second parameter information includes:
- when modified second parameter information sent by the first developer terminal is received, obtaining the target template based on the first parameter information and the modified second parameter information. The modified second parameter information is information obtained after the first developer terminal modifies the second parameter information in response to an information modification operation.

In actual application, it is found that the second parameter information obtained by the quick application server may have a specific error, or may have a specific deviation from a development requirement of the developer. To meet the development requirement of the developer as much as possible and improve development efficiency, in this embodiment of this application, after generating the second parameter information, the quick application server further returns a part or all of the second parameter information to the first developer terminal for display. The developer may choose, based on an actual development requirement of the developer, whether to modify the second parameter information, and if necessary, modify the second parameter information on the first developer terminal based on the development requirement. In this case, the first developer terminal performs modification based on the information modification operation of the developer, to obtain the modified second parameter information. Then, the modified second parameter information is returned to the quick application server. For the quick application server, if the second parameter information is modified by the developer, the target template is obtained based on the modified second parameter information.

With reference to the first aspect, in a possible implementation of the first aspect, the obtaining a target template based on the first parameter information and the second parameter information includes:

determining attribute information related to a quick application function from the first parameter information and the second parameter information, to obtain target attribute information, and obtaining the target template based on the target attribute information.

In this embodiment of this application, the quick application template is essentially quick applications (uncompressed) with different function configurations. Therefore, to meet a requirement of the developer for a quick application, in this embodiment of this application, quick application template matching is performed based on a quick application function. Based on this, in this embodiment of this application, after the first parameter information and the second parameter information are obtained, the attribute information (namely, the target attribute information) that is related to the quick application function and that is included in the first parameter information and the second parameter information is first extracted, and then the target template is obtained based on the target attribute information. In this way, the finally obtained target template can meet an actual requirement of the developer.

With reference to the first aspect, in a possible implementation of the first aspect, the obtaining the target template based on the target attribute information includes:

performing matching on metadata information of a plurality of quick application templates based on the target attribute information, and using, as the target template, a quick application template to which metadata information with a highest matching degree belongs. The quick application template is a set of files in which parameters of some content are to be set, and each piece of metadata information records function configuration data of a quick application template to which the metadata information belongs.

In this embodiment of this application, the quick application server and a quick application template server are a same server. Therefore, the quick application server stores some quick application templates that have different function configurations, and metadata information that records function configuration data of the quick application templates. After the target attribute information is determined, matching is performed with the target attribute information based on the record of the metadata information, so as to determine the target template that meets the function requirement. Therefore, accurate matching of the target template can be implemented in this embodiment of this application.

With reference to the first aspect, in a possible implementation of the first aspect, the target template is obtained based on the first parameter information and the second parameter information. The performing parameter setting on the target template based on the first parameter information and the second parameter information, to obtain a target quick application includes:

obtaining the target template and metadata information of the target template based on the first parameter information and the second parameter information, and then performing parameter setting on the target template based on the metadata information, the first parameter information, and the second parameter information, to obtain the target quick application. The metadata information of the target template records function configuration data of the target template.

In this embodiment of this application, the metadata information corresponding to the target template is obtained when the target template is obtained. A function configuration status of the target template is accurately determined by using the metadata information, and then parameter setting is performed by using the first parameter information and the second parameter information based on the status. Therefore, in this embodiment of this application, accurate parameter setting for the target template can be implemented.

With reference to the first aspect, in a possible implementation of the first aspect, after obtaining the target quick application, the method further includes:

sending a download address of the target quick application to the first developer terminal, or sending the target quick application to the portal terminal, where the portal terminal sends the download address of the target quick application to the first developer terminal.

After the target quick application is generated, in this embodiment of this application, the download address of the target quick application is provided to the developer. In this way, the developer can download the target quick application based on a requirement, and use and test the target quick application, to determine whether the generated target quick application meets a development requirement of the developer.

With reference to the first aspect, in a possible implementation of the first aspect, after obtaining the target quick application, the method further includes:

obtaining updated first parameter information sent by the first developer terminal, and returning, based on the updated first parameter information and the website address, to perform the operation of obtaining a website resource of the to-be-converted website based on the website address, until an updated target quick application is obtained. The updated first parameter information is information obtained after the first developer terminal modifies the first parameter information in response to an information modification operation.

If it is found that the target quick application does not meet the requirement of the developer after using and testing the quick application, it indicates that the quick application development is not successful. Theoretically, the developer needs to re-develop a quick application. To cope with this case, in this embodiment of this application, the first developer terminal may provide the developer with a function of modifying the first parameter information. After obtaining the target quick application, the developer finds that the target quick application does not meet a requirement through use or testing. In this case, the parameter may be modified in the first developer terminal. Then, the first developer terminal returns modified first parameter information. If the quick application server receives the modified first parameter information, the quick application server generates a quick application again based on the first parameter information and the existing website address of the to-be-converted website. This allows the developer to regain a target quick application that is closer to the need of the developer.

In this embodiment of this application, theoretically, a process of regenerating the target quick application may be performed for an unlimited quantity of times. That is, theoretically, the developer may continuously adjust the target quick application by continuously modifying the first parameter information and the website address, so that the finally obtained target quick application can meet the development requirement of the developer. Therefore, in this embodiment of this application, reliability of quick application development can be improved, time and energy costs of quick application development can be reduced, and efficiency of quick application development can be improved. In addition, for some developers whose original development requirements are unclear, embodiments of this application have an extremely high fault tolerance rate, and trial and error costs are extremely low. Therefore, a lot of time, energy and economic costs of quick application development can be saved.

With reference to the first aspect, in a possible implementation of the first aspect, after the second parameter information is obtained, the second parameter information is locally stored.

Correspondingly, after obtaining the target quick application, the method further includes:

obtaining a website resource of the to-be-converted website based on the website address in a preset period, and parsing the obtained website resource of the to-be-converted website to obtain the second parameter information;

comparing the second parameter information obtained through parsing with locally stored second parameter information, and determining, based on a comparison result, whether the target quick application needs to be updated; and when the determining result is that the target quick application needs to be updated, selecting any one or more of the following manners for processing.

Manner 1: Generate quick application update prompt information, and push the quick application update prompt information by using a preset push means.

Manner 2: Update the target quick application based on the second parameter information obtained through parsing, and release the updated target quick application.

Manner 3: Update the target quick application based on the second parameter information obtained through parsing, and push the updated target quick application by using a preset push means.

In this embodiment of this application, the quick application server periodically and automatically detects whether the to-be-converted website is updated, and notifies the developer in a timely manner when the to-be-converted website is updated, or automatically updates and releases the target quick application in a timely manner. Compared with a conventional method that requires a developer to periodically and manually perform quick application update and maintenance, this embodiment of this application has the following advantages:

1. Automatic monitoring is implemented throughout the process. Therefore, a monitoring operation of the to-be-converted website during maintenance becomes simple and efficient.
2. In this embodiment of this application, the developer does not need to perform a development operation, and only needs to determine whether the target quick application automatically updated by the quick application server meets the requirement. In this way, the developer can save a lot of operations on re-developing a target quick application, and re-developing the target quick application becomes labor-saving. Therefore, the re-development of the target quick application is more efficient and the period is shorter.
3. A process operation required for releasing the target quick application can be omitted, which greatly improves efficiency of maintaining and releasing the quick application.

A second aspect of the embodiments of this application provides a quick application release method. The method is applied to a server and includes:

obtaining first release information of a target quick application sent by a third developer terminal, and requesting second release information of the target quick application from a quick application server; receiving the second release information of the target quick application that is returned by the quick application server, where the second release information is obtained by the quick application server based on parameter information of the target quick application; and performing release review on the target quick application based on the first release information and the second release information, and releasing the target quick application to an application store when the release review succeeds.

In this embodiment of this application, the quick application server locally stores the parameter information of the target quick application. When the target quick application needs to be released, a developer may upload some release information (that is, the first release information), and then the quick application server extracts remaining required release information (that is, the second release information) based on the parameter information of the target quick application, and returns the information to the application release server. Finally, the application release server performs release review on the target quick application based on the obtained first release information and the obtained second release information. If the review is approved, the quick application can be released.

Compared with a method in which all the release information needs to be manually provided by a developer, this embodiment of this application can greatly reduce information that needs to be entered when the developer releases a quick application, thereby reducing a workload of releasing a quick application. In this way, the whole process of quick application release is simpler and more efficient, and the period is shorter.

With reference to the second aspect, in a first possible implementation of the second aspect, the target quick application is a target quick application obtained by the quick application server by using the quick application generation method in the first aspect, and the parameter information of the target quick application includes first parameter information and second parameter information.

In this embodiment of this application, after generating the target quick application, the quick application server locally stores the parameter information of the target quick application. Therefore, in this embodiment of this application, the second release information automatically provided by the quick application server is highly reliable. In actual application, this part of release information does not need to be reviewed. Therefore, the release review process can be reduced, thereby shortening a release cycle of the quick application.

With reference to the second aspect, in a first possible implementation of the second aspect, the third developer terminal and the first terminal device are a same terminal device.

In this embodiment of this application, the target quick application is a target quick application obtained by the quick application server by using the quick application generation method in the first aspect. The developer can use the same terminal device to perform quick application development and quick application release, so that operation convenience and efficiency of quick application development and release are greatly improved.

A third aspect of the embodiments of this application provides a quick application generation apparatus, including:
an information obtaining module, configured to obtain first parameter information and a website address of a to-be-converted website that are sent by a first developer terminal;
a resource obtaining module, configured to obtain a website resource of the to-be-converted website based on the website address;
a resource parsing module, configured to parse the website resource of the to-be-converted website to obtain second parameter information;
a template obtaining module, configured to obtain a target template based on the first parameter information and the second parameter information, where the target template is a set of files in which parameters of some content are to be set; and
an application generation module, configured to perform parameter setting on the target template based on the first parameter information and the second parameter information, to obtain a target quick application.

A fourth aspect of the embodiments of this application provides a quick application release apparatus, including:
an information obtaining module, configured to obtain first release information of a target quick application sent by a third developer terminal;
an information requesting module, configured to request second release information of the target quick application from a quick application server;
an information receiving module, configured to receive the second release information of the target quick application that is returned by the quick application server, where the second release information is obtained by the quick application server based on parameter information of the target quick application;
a release review module, configured to perform release review on the target quick application based on the first release information and the second release information; and
an application release module, configured to release the target quick application to an application store when the release review succeeds.

A fifth aspect of the embodiments of this application provides a quick application login method, including:
requesting, in response to a preset operation, associated quick application data of a target quick application from a quick application server; receiving the associated quick application data sent by the quick application server, and determining, based on the associated quick application data, a first quick application associated with the target quick application; and reading second login information of the first quick application, and performing user login to the target quick application by using the second login information.

In this embodiment of this application, after the preset operation is triggered, the user terminal first requests to query an associated quick application of the target quick application from the quick application server. The quick application server determines the associated quick application of the target quick application based on a configuration, and returns corresponding associated quick application data. After receiving the associated quick application data, the user terminal may determine, based on the associated quick application data, the first quick application associated with the target quick application. Finally, the user terminal reads login information (that is, the second login information) of the first quick application, and performs user login to the target quick application based on the read login information. Therefore, in this embodiment of this application, in an entire process of the user login operation, the user does not need to enter login information such as an account and a password in the target quick application, and can implement an operation on the target quick application. Finally, quick login to the target quick application is implemented. User login is more efficient and simple.

When the preset operation is manually triggered by the user, an effect of "one-tap login" can be implemented in this embodiment of this application.

With reference to the fifth aspect, in a possible implementation of the fifth aspect, the preset operation is a start operation of the target quick application or a user login operation. The requesting, in response to a preset operation, associated quick application data of a target quick application from a quick application server includes: requesting the associated quick application data of the target quick application from the quick application server when the start operation or the user login operation performed on the target quick application is detected.

In this embodiment of this application, a skilled person may set the start operation or the user login operation for the target quick application to the preset operation based on an actual application requirement. In this case, if the user terminal detects the start operation or the user login operation for the target quick application, the user terminal starts to request the associated quick application data from the quick application server, to perform a subsequent quick login operation. Therefore, this embodiment of this application can meet requirements of more different application scenarios, has higher compatibility with scenarios, and can implement more efficient user login.

In an embodiment of this application, both the start operation and the user login operation for the target quick application may be set to the preset operation. In this case, as long as the user terminal detects either of the start operation and the user login operation for the target quick application, the user terminal may start to request the associated quick application data from the quick application server, to perform a subsequent quick login operation. A triggering manner in which a plurality of operations are compatible is used, so that more flexible and quick user login can be implemented in this embodiment of this application.

With reference to the fifth aspect, in a possible implementation of the fifth aspect, the determining, based on the associated quick application data, a first quick application associated with the target quick application includes:
determining, based on the associated quick application data, quick applications associated with the target quick application; and determining, from the quick applications associated with the target quick application, the first quick application that locally stores quick application data.

After receiving the associated quick application data, the user terminal may determine the associated quick applications of the target quick application. However, in actual application, the user terminal may not store quick application data of the associated quick applications. Therefore, the user terminal determines, from quick applications whose quick application data has been stored in the user terminal (including a quick application that is currently running, and a quick application that has ended running but whose quick application data is still stored in the user terminal), the first quick application that belongs to the associated quick applications. In this way, the first quick application that is an associated quick application of the target quick application and whose quick application data is locally stored in the user terminal is obtained. Therefore, in this embodiment of this application, the first quick application whose quick application data can be shared can be determined, thereby improving reliability of obtaining the second login information.

With reference to the fifth aspect, in a possible implementation of the fifth aspect, the preset operation is the start operation for the target quick application. The reading second login information of the first quick application includes:

starting the target quick application in a process of the first quick application, and reading the second login information of the first quick application from process data of the first quick application.

In this embodiment of this application, to share the quick application data of the first quick application with the target quick application, the target quick application is started in a process of the first quick application, so that the target quick application and the first quick application share the process for running. On this basis, the required second login information may be read from process data of the first quick application, so as to implement effective sharing and obtaining of the second login information.

With reference to the fifth aspect, in a possible implementation of the fifth aspect, the reading second login information of the first quick application includes:

when the quantity of first quick applications is greater than 1, determining at least one quick application from the first quick applications, and reading the second login information of the at least one quick application; and when the second login information fails to be read, returning to performing the operation of determining at least one quick application from the first quick applications, and reading the second login information of the at least one quick application, until the second login information is obtained through reading.

In actual application, there may be a plurality of first quick applications, and each first quick application may store second login information, or may not store second login information. In this embodiment of this application, for a case in which there are a plurality of first quick applications, when the second login information is being read, one or more quick applications are first determined from these first quick applications. Then, second login information of the determined quick applications is read. If these quick applications include a quick application that stores the second login information, the user terminal can successfully obtain the required second login information. However, if none of the quick applications stores the second login information, in this embodiment of this application, one or more quick applications are reselected from the first quick applications. Then, the operation of reading second login information is repeated until the required second login information is successfully read. Therefore, in this embodiment of this application, reliability of obtaining the second login information can be improved, and a probability that the second login information cannot be obtained can be reduced.

In addition, a quantity of quick applications determined from the first quick applications each time and a quick application determining method are not excessively limited in this embodiment of this application, and may be specifically set by the skilled person based on a requirement. For example, in some embodiments, the quantity of quick applications may be set to 1, and the determining method may be set to random and non-repetitive.

With reference to the fifth aspect, in a possible implementation of the fifth aspect, the reading second login information of the first quick application includes:

when the quantity of first quick applications is greater than 1, determining at least one quick application from the first quick applications, and reading the second login information of the at least one quick application; and the quick application login method further includes:

when user login to the target quick application by using the second login information fails, returning to performing the operation of determining at least one quick application from the first quick applications, and reading the second login information of the at least one quick application, until user login to the target quick application is completed.

In actual application, for a single first quick application, login information of the first quick application may fail to be normally used due to reasons such as time validity. As a result, user login cannot be normally performed. Therefore, a user login failure may occur when the user logs in to the target quick application by using the second login information of the single first quick application. For this problem, when there are a plurality of first quick applications, if user login to the target quick application performed by using second login information of a first quick application fails, second login information of another first quick application is used in this embodiment of this application, and user login to the target quick application is attempted again by using the newly read second login information. Therefore, in this embodiment of this application, a user login success rate for the target quick application can be effectively improved, and user login efficiency can be improved.

With reference to the fifth aspect, in a possible implementation of the fifth aspect, the performing user login to the target quick application by using the second login information includes:

sending the second login information to an authentication server; and receiving updated second login information sent by the authentication server, where the updated second login information is information obtained by the authentication server by updating the second login information after the authentication server successfully verifies the second login information;

sending the updated second login information to an application support server; and receiving authentication information sent by the application support server, and completing user login to the target quick application, where the authentication information is information generated after the application support server successfully verifies the updated second login information.

In actual application, login information may have a specific time limitation. When the login information expires, it is often invalid and cannot be used for user login. To prevent a case in which the user cannot log in to the target quick application because the second login information is invalid, in this embodiment of this application, the user terminal first sends the second login information to the authentication server. The authentication server checks and updates the second login information. Then, the updated second login information is used as the second login information of the target quick application, and the user terminal sends the updated second login information to the application support server for verification based on the updated second login information. Finally, the application support server performs information check on the updated second login information and returns authentication information. After receiving the authentication information, the user terminal completes user login to the target quick application. In this embodiment of this application, the second login information is considered invalid and the information is updated, so that a user login failure caused by invalidity of the second login information can be prevented, thereby improving a login success rate of the target quick application user and user login efficiency.

With reference to the fifth aspect, in a possible implementation of the fifth aspect, the performing user login to the target quick application by using the second login information includes:

sending the second login information to the application support server, receiving authentication information sent by the application support server, and completing user login to the target quick application, where the authentication information is information generated after the application support server successfully verifies the second login information.

In actual application, the login information may not have a validity period, or may have a validity period but is still valid. In this case, if the login information is still updated, more steps are required in the user login process, complexity is increased, which in turn leads to less efficient login. Therefore, in this embodiment of this application, user login is directly performed by using the read second login information. This simplifies the login process and improves the login efficiency.

With reference to the fifth aspect, in a possible implementation of the fifth aspect, the performing user login to the target quick application by using the second login information includes:

identifying whether the second login information is invalid; and when the second login information is not invalid, sending the second login information to an application support server, and receiving authentication information sent by the application support server, and completing user login to the target quick application, where the authentication information is information generated after the application support server successfully verifies the second login information; or when the second login information is invalid, sending the second login information to an authentication server, receiving updated second login information sent by the authentication server, where the updated second login information is information obtained by the authentication server by updating the second login information after the authentication server successfully verifies the second login information, sending the updated second login information to an application support server, and receiving authentication information sent by the application support server, and completing user login to the target quick application, where the authentication information is information generated after the application support server successfully verifies the updated second login information.

In actual application, login information may not have a time limitation, or have a time limitation. As a result, it is difficult for the user terminal to predict whether the second login information of the first quick application can be used as the second login information of the target quick application to perform user login to the target quick application. To enable the user terminal to accurately cope with various possible cases of the second login information, and to accurately and efficiently perform user login to the target quick application, in this embodiment of this application, the user terminal first identifies whether the second login information of the first quick application is invalid. If the second login information of the first quick application is not invalid, it indicates that theoretically, the user terminal may use the second login information of the first quick application as the second login information of the target quick application, and perform user login. Therefore, in this embodiment of this application, the user terminal uses the second login information of the first quick application as the second login information of the target quick application, and performs a user login operation for the target quick application. If the second login information is invalid, the user terminal sends the second login information to the authentication server for updating. Then, user login to the target quick application is performed by using the updated second login information. Therefore, regardless of whether the second login information is valid, the user terminal in this embodiment of this application may perform user login in an appropriate manner. Therefore, in this embodiment of this application, more different actual cases of the second login information can be adaptively adapted, so that user login becomes more efficient and reliable.

In an embodiment of this application, the authentication information generated by the application support server is an identity credential of the terminal device in a data exchange process between the terminal device and the application support server.

In this embodiment of this application, when performing data exchange with the application support server, the user terminal uses data sent to the application support server to carry the authentication information. The authentication information is used as an identity credential, so that the application support server can determine the user identity by using the authentication information and normally perform data processing and exchange. Therefore, the user terminal does not need to perform a user login operation again each time the user terminal sends data.

A sixth aspect of the embodiments of this application provides a quick application login apparatus, including:

a data request module, configured to request, in response to a preset operation, associated quick application data of a target quick application from a quick application server;

an application determining module, configured to: receive the associated quick application data sent by the quick application server, and determine, based on the associated quick application data, a first quick application associated with the target quick application; and a user login module, configured to: read second login information of the first quick application, and perform user login to the target quick application by using the second login information.

A seventh aspect of the embodiments of this application provides a quick application login system, including: a terminal device and a quick application server.

In response to the preset operation, the terminal device requests the quick application server for associated quick application data of the target quick application.

After receiving the request of the terminal device, the quick application server queries a quick application managed by the target quick application, generates associated quick application data based on the found quick application, and sends the associated quick application data to the terminal device.

The terminal device receives the associated quick application data sent by the quick application server, and determines, based on the associated quick application data, the first quick application associated with the target quick application.

The terminal device reads the locally stored second login information of the first quick application, and performs user login to the target quick application by using the second login information.

An eighth aspect of the embodiments of this application provides a content display method, including:

obtaining target configuration data for a target quick application; obtaining a trigger operation performed by a user on second related content in the target quick application, and determining, in response to the trigger operation, to-be-displayed content associated with the second related content; determining, based on the target configuration data, a second quick application and/or a first application program associated with the to-be-displayed content; and then opening the second quick application or the first application program and displaying the to-be-displayed content in the second quick application or the first application program.

In this embodiment of this application, the to-be-displayed content is content other than service content of the quick application. Related content (including first related content, the second related content, and the like) refers to data content that is related to the to-be-displayed content and that can be used to display the to-be-displayed content in an associating manner after being triggered. A skilled person or a developer may open the to-be-displayed content by configuring and using another quick application or application program. The user terminal first determines, based on the target configuration data, a specifically used quick application (that is, the second quick application) or application program (that is, the first application program). Then, the corresponding second quick application or first application program is started (if the second quick application or the first application program has been started, jump to the corresponding second quick application or first application program). A new interface is opened in the second quick application or the first application program, and the to-be-displayed content is displayed in the new interface. In this embodiment of this application, different to-be-displayed content may be opened in an appropriate manner. In a case in which direct displaying in an overwriting manner on an original interface of the quick application is not suitable, it may be set that the content is opened in another quick application or an application program, to effectively prevent original interface content on the quick application from being overwritten. Therefore, this embodiment of this application can be adapted to different display requirements of to-be-displayed content, and impact on normal use of the quick application by the user is greatly reduced.

With reference to the eighth aspect, in a first possible implementation of the eighth aspect, the obtaining target configuration data for a target quick application includes: obtaining the target configuration data for the target quick application from a quick application server.

In this embodiment of this application, the target configuration data for the quick application is independently configured on the server side, so that configuration operations for the to-be-displayed content of the quick application and the related content of the to-be-displayed content are more convenient. The skilled person or developer can effectively configure the quick application without modifying original quick application data (for example, original quick application code), which is highly applicable. In addition, by simply modifying the target configuration data or associating a single piece of target configuration data with a plurality of quick applications, one piece of target configuration data is applicable to a plurality of different quick applications. This greatly shortens the configuration period of the quick application and reduces a configuration workload. Costs of quick application development and management can be effectively reduced.

With reference to the eighth aspect, in a second possible implementation of the eighth aspect, the obtaining target configuration data for a target quick application includes:

obtaining a start operation performed by the user on the target quick application; and obtaining the target configuration data for the target quick application from the quick application server in response to the start operation.

Based on the first possible implementation of the eighth aspect, in this embodiment of this application, obtaining of the target configuration data is triggered when the user starts the target quick application. Therefore, the target quick application can learn, when being started, the display manner of the to-be-displayed content. On this basis, if the user needs to display the to-be-displayed content in the target quick application after entering the target quick application, the target quick application can display the to-be-displayed content in a most appropriate manner, so that the user does not need to wait or perform an additional operation in an entire process of displaying the to-be-displayed content. User experience can be greatly improved.

With reference to the eighth aspect, in a third possible implementation of the eighth aspect, the content display method further includes:

in response to the start operation, obtaining first quick application content data of the target quick application, and determining, from the first quick application content data, the first related content associated with the target configuration data; and processing the first related content in the first quick application content data based on the target configuration data, and displaying a quick application interface of the target quick application based on second quick application content data obtained through processing.

In this embodiment of this application, a skilled person or a developer may configure a manner of processing the related content based on a requirement, for example, deleting, hiding, or replacing the related content. After the target quick application is started, the user terminal processes the first related content in the first quick application content data based on the processing manner configured in the target configuration data, to obtain the second quick application content data. Then, the quick application interface of the target quick application is displayed based on the second quick application content data. Therefore, this embodiment of this application may provide a more flexible display manner of related content, so as to reduce a probability of impact of related content display on normal use of the quick application by the user. The first quick application content data and the second quick application content data are respectively unprocessed and processed quick application content data in S905 in the embodiment shown in FIG. 9.

With reference to the eighth aspect, in a fourth possible implementation of the eighth aspect, the processing the first related content in the first quick application content data based on the target configuration includes: skipping displaying the first related content based on the target configuration data.

Based on the third possible implementation of the eighth aspect, in this embodiment of this application, it may be set that the related content is not displayed, so that display of some invalid content in the related content can be avoided, and a probability of the quick application not responding to a user operation due to invalid content such as an invalid web page link in the related content is reduced. In another aspect, some to-be-displayed content that is invalid or unsuitable for display cannot be linked or opened by using the related content. This avoids a case in which the user mistakenly views, by using the related content, to-be-displayed content that is invalid or unsuitable for display. In this way, a probability of impact on normal use of the quick application by the user is reduced.

With reference to the eighth aspect, in a fifth possible implementation of the eighth aspect, the skipping displaying the first related content based on the target configuration data includes:
    based on the target configuration data, deleting the first related content, hiding the first related content, or replacing the first related content with preset content.

Based on the fourth possible implementation of the eighth aspect, in this embodiment of this application, an effect of not displaying related content may be implemented in a deletion, hiding, or replacement manner. A specific situation of the preset content may be set by a skilled person or a developer based on an actual requirement.

With reference to the eighth aspect, in a sixth possible implementation of the eighth aspect, the target configuration data includes a preset script, and the script records a manner of processing the first related content.

The skipping displaying the first related content based on the target configuration data includes: running the script in the target configuration data, to skip displaying the first related content.

In this embodiment of this application, a manner of processing related content may be recorded in a form of a JS script. In this case, the target configuration data includes the JS script set by the skilled person or developer. After obtaining the quick application content data, the user terminal loads the quick application content data, and runs the JS script in the target configuration data. In this case, the user terminal processes the quick application content data according to a rule in the JS script, so that the related content is not displayed.

With reference to the eighth aspect, in a seventh possible implementation of the eighth aspect, the content display method further includes:
    obtaining an interface update operation performed by the user on the target quick application, and obtaining third quick application content data of the target quick application in response to the interface update operation; determining, from the third quick application content data, first related content associated with the target configuration data, and then processing the first related content based on the target configuration; and displaying a second interface of the target quick application based on fourth quick application content data obtained through processing.

In actual application, it is found that as the user uses the target quick application, quick application content data of the target quick application is continuously updated, so that an interface of the target quick application may be updated with use by the user. However, in a process of updating the quick application content data, some first related content may be added. In this embodiment of this application, an occasion of processing the first related content by the user terminal is not limited to starting the target quick application. Alternatively, the first related content in the quick application content data may be processed before the target quick application updates the interface each time. Therefore, in this embodiment of this application, after the quick application content data is updated, newly added first related content can be prevented from affecting display of the to-be-displayed content. In this way, a probability of impact of related content display on normal use of the quick application by the user can be reduced.

With reference to the eighth aspect, in an eighth possible implementation of the eighth aspect, the content display method further includes:
    obtaining an interface update operation performed by the user on the target quick application, and obtaining third quick application content data of the target quick application in response to the interface update operation; and
    displaying a third interface of the target quick application based on the third quick application content data, and determining, from the third quick application content data, the first related content associated with the target configuration data; processing the first related content based on the target configuration data, updating the third interface based on fourth quick application content data obtained through processing, and displaying a second interface obtained after the update.

In this embodiment of this application, an occasion of processing the first related content by the user terminal is not limited to starting the target quick application. Alternatively, the first related content in the quick application content data may be processed after each update of the interface of the target quick application. Therefore, in this embodiment of this application, after the quick application content data is updated, newly added first related content can be prevented from affecting display of the to-be-displayed content. In this way, a probability of impact of related content display on normal use of the quick application by the user can be reduced.

In the seventh and eighth possible implementations of the eighth aspect, for a manner of processing the first related content in the third quick application content data, refer to the fourth to the sixth possible implementations of the eighth aspect. That is, the first related content in the content data of the third quick application may not be displayed in a manner such as deletion, hiding, and replacement.

With reference to the eighth aspect, in a ninth possible implementation of the eighth aspect, the target configuration data records the second quick application and the first application program, and records a priority of the first application program and a priority of the second quick application.

The second quick application and/or the first application program associated with the to-be-displayed content are/is determined based on the target configuration data. The opening the second quick application or the first application program, and displaying the to-be-displayed content in the second quick application or the first application program includes:
    determining, based on the target configuration data, the second quick application and the first application program that are associated with the to-be-displayed content, and determining, from the second quick application and the first application program, a first object with a highest priority; and opening the first object, and displaying the to-be-displayed content in the first object.

When only a single quick application or a single application program is set to display the to-be-displayed content, a case in which the to-be-displayed content cannot be displayed may occur because the single quick application or the single application program cannot be started. To cope with this situation and improve a display effect of the to-be-displayed content, in this embodiment of this application, a skilled person or a developer may set two manners of opening the to-be-displayed content at the same time. That is, the to-be-displayed content is displayed by using the first application program, and the to-be-displayed content is displayed by using the second quick application. In addition, the priority of each opening manner is set. On this basis, the user terminal first displays the to-be-displayed content in a manner with a highest priority. For example, when the first application program has the highest priority (in this case, the first object is the first application program), the first application program is used to display the to-be-displayed content. Therefore, in this embodiment of this application, a success rate of opening the to-be-displayed content can be improved, and a display effect of the to-be-displayed content can be ensured.

In addition, when the first object fails to be opened, in this embodiment of this application, another manner with a lower priority may be selected to display the to-be-displayed content.

In some other optional embodiments, more than two opening manners of the to-be-displayed content may also be set, and a priority sequence of each opening manner may be set. When the to-be-displayed content needs to be displayed, each opening manner is tried in sequence according to a priority order until the to-be-displayed content is successfully displayed. For example, a plurality of application programs may be set and a priority for each application is set. In this case, the application programs may be sequentially opened to display the to-be-displayed content until the to-be-displayed content is successfully displayed.

With reference to the eighth aspect, in a tenth possible implementation of the eighth aspect, the target configuration data records the first application program. The determining, based on the target configuration data, a second quick application and/or a first application program that are/is associated with the to-be-displayed content includes: determining, based on the target configuration data, the first application program associated with the to-be-displayed content.

The content display method further includes: if the first application program fails to be opened, opening the third quick application, and displaying the to-be-displayed content in the third quick application; and if the third quick application fails to be opened, opening a browser, and displaying the to-be-displayed content in the browser.

When only a single application program is set to display the to-be-displayed content, a case in which the to-be-displayed content cannot be displayed may occur because the single application program cannot be started. To cope with this situation and improve a display effect of the to-be-displayed content, the skilled person or the developer may preset a third quick application. When the first application program fails to be opened, an attempt is made to start the third quick application and display the to-be-displayed content. If the third quick application also fails to be started, the to-be-displayed content is displayed by using a browser. The browser may be an application program browser, or may be a quick application browser. Therefore, in this embodiment of this application, a success rate of opening the to-be-displayed content can be improved, and a display effect of the to-be-displayed content can be ensured.

In another optional embodiment of this application, the target configuration data records the second quick application. The determining, based on the target configuration data, a second quick application and/or a first application program that are/is associated with the to-be-displayed content includes: determining, based on the target configuration data, the second quick application associated with the to-be-displayed content.

The content display method further includes: if the second quick application fails to be opened, opening a browser, and displaying the to-be-displayed content in the browser.

When only a single application program is set to display the to-be-displayed content, a case in which the to-be-displayed content cannot be displayed may occur because the single quick application cannot be started. Therefore, in this embodiment of this application, when the second quick application fails to be started, the to-be-displayed content may be displayed by using the browser. The browser may be a browser of an application program class, or may be a browser of a quick application class. Therefore, in this embodiment of this application, a success rate of opening the to-be-displayed content can be improved, and a display effect of the to-be-displayed content can be ensured.

With reference to the eighth aspect, in an eleventh possible implementation of the eighth aspect, after the displaying the to-be-displayed content, the method further includes: detecting a closing operation of the user on the to-be-displayed content, and returning to the target quick application in response to the closing operation.

In this embodiment of this application, after the to-be-displayed content is displayed, if the user wants to continue to use the target quick application, the user may close the to-be-displayed content. That is, the application program or the quick application that displays the to-be-displayed content may be closed or exited. After detecting that the to-be-displayed content is closed, the user terminal automatically returns to the target quick application. In this way, it can be greatly convenient for the user to use the target quick application, and user experience can be improved.

In an optional embodiment of this application, in an eleventh possible implementation of the eighth aspect, when returning to the target quick application, the user terminal returns a quick application interface last displayed by the target quick application before the to-be-displayed content is displayed. In this case, integrity and stability of original interface content of the target quick application can be maintained. After browsing the to-be-displayed content, if the user wants to return to the original interface of the quick application to perform an operation, the user only needs to return to the quick application. The user does not need to worry about the loss of the original interface content or the loss of the original interface. Therefore, this embodiment of this application can be adapted to different display requirements of to-be-displayed content, and impact on normal use of the quick application performed by the user is greatly reduced.

With reference to the eighth aspect, in a twelfth possible implementation of the eighth aspect, the to-be-displayed content is a commodity sales advertisement or a commodity promotion advertisement, the second quick application is a shopping-type quick application, and the first application program is a shopping-type application program.

In this embodiment of this application, a shopping-type application program or a shopping-type quick application may be used to display a commodity sales advertisement or a commodity promotion advertisement. In this case, the user can not only view the commodity sales advertisement, but also view more information about the commodity (such as a commodity sales volume and user comments) in the application program or quick application, or purchase the commodity. In this way, a display effect of the commodity sales advertisement is improved, and operation convenience of the user to the commodity sales advertisement is improved.

With reference to the eighth aspect, in a thirteenth possible implementation of the eighth aspect, the to-be-displayed content is advertisement data, the second quick application is a browser-type quick application, and the first application program is a browser-type application program.

In practice, there are many types of advertisement data, for example, commodity sales advertisements, commodity promotion advertisements, application program or quick application promotion advertisements, publicity advertisements (such as public service advertisements or attraction advertisements), and content promotion advertisements (such as promoting novels or TV dramas), in this embodiment of this application, a browser-type application program or a browser-type quick application may be used to display an advertisement. Because the browser is highly compatible with different types of data display, for example, the browser can generally display images, texts, videos, and music. Therefore, in this embodiment of this application, better compatibility display of different advertisement data can be implemented, thereby improving a success rate of displaying the to-be-displayed content and improving a display effect of the to-be-displayed content.

A ninth aspect of the embodiments of this application provides a content display apparatus, including:
  a data obtaining module, configured to obtain target configuration data for a target quick application;
  an operation obtaining module, configured to obtain a trigger operation performed by a user on second related content in the target quick application;
  a responding module, configured to determine, in response to the trigger operation, to-be-displayed content associated with the second related content;
  an object determining module, configured to determine, based on the target configuration data, a second quick application and/or a first application program associated with the to-be-displayed content; and
  a display module, configured to: open the second quick application or the first application program, and display the to-be-displayed content in the second quick application or the first application program.

A tenth aspect of the embodiments of this application provides a quick application server, where the quick application server includes a memory and a processor, the memory stores a computer program that can be run on the processor, and when the processor executes the computer program, the terminal device is enabled to implement the steps of the quick application generation method according to any implementation of the foregoing first aspect.

An eleventh aspect of the embodiments of this application provides an application release server, where the application release server includes a memory and a processor, the memory stores a computer program that can be run on the processor, and when the processor executes the computer program, the terminal device is enabled to implement the steps of the quick application release method according to any implementation of the foregoing second aspect.

A twelfth aspect of the embodiments of this application provides a terminal device, where the terminal device includes a memory and a processor, the memory stores a computer program that can be run on the processor, and when the processor executes the computer program, the terminal device is enabled to implement the steps of the quick application login method according to any implementation of the foregoing fifth aspect, or the steps of the content display method according to any implementation of the foregoing eighth aspect.

A thirteenth aspect of the embodiments of this application provides a computer-readable storage medium storing a computer program. When the computer program is executed by a processor, a terminal device is enabled to implement the steps of the quick application generation method according to any implementation of the first aspect, or the steps of the quick application release method according to any implementation of the second aspect, or the steps of the quick application login method according to any implementation of the fifth aspect, or the steps of the content display method according to any implementation of the eighth aspect.

A fourteenth aspect of the embodiments of this application provides a computer program product. When the computer program product runs on a terminal device, the terminal device is enabled to perform the quick application generation method according to any implementation of the first aspect, or the quick application release method according to any implementation of the second aspect, or the steps of the quick application login method according to any implementation of the foregoing fifth aspect, or the steps of the content display method according to any implementation of the foregoing eighth aspect.

A fifteenth aspect of the embodiments of this application provides a chip system, where the chip system includes a processor, the processor is coupled to a memory, and the processor executes a computer program stored in the memory, to implement the quick application generation method according to any implementation of the first aspect, or the quick application release method according to any implementation of the second aspect, or the steps of the quick application login method according to any implementation of the fifth aspect, or the steps of the content display method according to any implementation of the eighth aspect.

The chip system may be a single chip or a chip module including a plurality of chips.

It may be understood that, for beneficial effects of the third aspect, the fourth aspect, the tenth aspect, and the eleventh aspect, refer to related descriptions in the first aspect or the second aspect. Details are not described herein again.

For beneficial effects of the sixth aspect and the seventh aspect, refer to related descriptions in the fifth aspect. Details are not described herein again.

For beneficial effects of the ninth aspect, refer to the related description in the eighth aspect. Details are not described herein again.

For beneficial effects of the twelfth aspect, refer to the related description in the fifth aspect or the eighth aspect. Details are not described herein again.

For beneficial effects of the thirteenth aspect, the fourteenth aspect, and the fifteenth aspect, refer to related descriptions in the first aspect, the second aspect, the fifth aspect, or the eighth aspect. Details are not described herein again.

BRIEF DESCRIPTION OF THE DRAWINGS

FIG. 2B-1 and FIG. 2B-2 are a schematic flowchart of a quick application generation method according to an embodiment of this application;

FIG. 2C is a schematic diagram of an upload interface according to an embodiment of this application;

FIG. 7B-1 and FIG. 7B-2 are a schematic flowchart of a quick application login method according to an embodiment of this application;

FIG. 7E-1 and FIG. 7E-2 are a schematic flowchart of a quick application login method according to an embodiment of this application;

FIG. 15-1 to FIG. 15-3 are a schematic diagram of a scenario of a content display method according to an embodiment of this application;

DETAILED DESCRIPTION OF ILLUSTRATIVE EMBODIMENTS

Figure 1A:
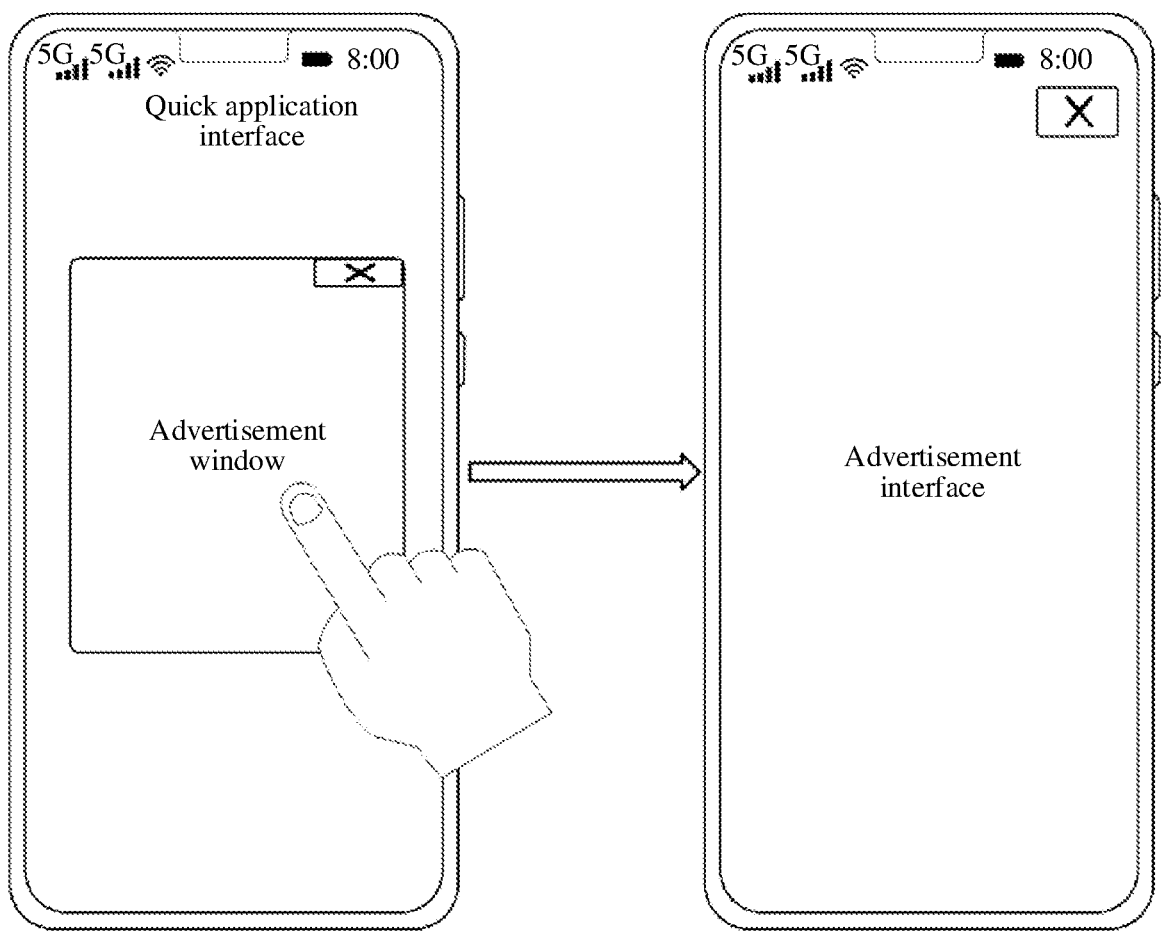
FIG. 1A is a schematic diagram of an application scenario according to an embodiment of this application.

In the following description, for illustration instead of limitation, specific details such as a specific system structure and technology are provided, so as to thoroughly understand embodiments of this application. However, a person skilled in the art should understand that this application may also be implemented in other embodiments without these specific details. In other cases, detailed descriptions of a well-known system, apparatus, circuit, and method are omitted, so as not to obscure the description of this application with unnecessary detail.

For ease of understanding of this application, the embodiments of this application are briefly described herein first.

A life cycle of a quick application includes four important nodes: development, release, maintenance, and use, which are described in sequence below.

Development:

To implement development of a quick application, in the current technology, the quick application alliance and mobile terminal manufacturers (referred to as a manufacturer below) provide some quick application development tools, for example, an integrated development environment (Integrated Development Environment, IDE). Developers need to use these development tools to design and develop quick applications. Therefore, the existing quick application development requires developers to learn and proficiently use development tools. In addition, in a process of using development tools to develop a quick application, the developers need to be familiar with technical specifications of the quick application alliance and have some basic front-end development knowledge, for example, labels, styles, and JavaScript (JS) script knowledge.

To sum up, to smoothly develop a quick application, even professional developers need to spend a lot of time and energy learning the front-end development knowledge, the technical specifications of the quick application alliance, and the development tools. In addition, even if the developers are familiar with the knowledge and are proficient in using development functions, a large number of operations such as code development, testing, and modification are still required for quick application development. Therefore, quick application development is difficult, costs are high, and a development cycle is long (normally, a development cycle of a quick application is one to three months). For non-professional developers, such as some quick application enthusiasts, the front-end development knowledge, the technical specifications of the quick application alliance, and the use of the development tools are difficult, and a learning threshold is high. Therefore, for non-professional developers, the feasibility of quick application development is low, which is not conducive to effective popularization of quick applications.

Release:

When an available quick application has been developed, a developer further needs to put the quick application on the shelf in an application store of a manufacturer, so that the user can search for and use the quick application in a mobile terminal. In the current technology, when the quick application is to be released, the manufacturer requires the developer to fill in a large amount of quick application release information, for example, an application name, an application package name, descriptions, an application screenshot, and an icon of the quick application. After filling in the release information, the developer submits the quick application to the manufacturer for review. If the review is approved, the quick application can be released. If the review is not approved, the developer needs to modify the quick application, fill in quick application information, and submit the quick application for review again.

In practice, it is found that the quick application information filling operation is complex and takes a long time. The review of a quick application takes a long time and is sometimes difficult to be approved at one time. If the review is not approved, quick application information needs to be filled in again, and review needs to be performed again. Therefore, in actual application, a period of releasing the quick application is often long, and the operations are complicated, which is not conducive to effective popularization of quick applications.

Maintenance:

After a quick application is successfully released, a developer needs to maintain the quick application in a timely manner to ensure real-time content, stability, and richness of service functions of the quick application. In actual application, when a large amount of content needs to be maintained, a version update for the quick application is usually required. In this case, the developer needs to perform quick application development and release operations again. The entire operation process is complex and time-consuming. In addition, when an enterprise portal to which the developer belongs includes a website and a quick application, an update of the quick application also means an update of corresponding website content. Therefore, both the website portal and the quick application portal need to be updated, and maintenance difficulty is further increased.

Use:

After a quick application is successfully released, a user can select the quick application from the application store and use the quick application based on his/her own requirement, to meet an actual life or work requirement of the user.

In actual application, quick application user login and non-quick application content display are two common quick application use scenarios, which are described as follows:

Quick Application User Login Scenario:

Processes of quick applications are generally independent of each other. For security purposes, different quick applications are usually not allowed to read application data, for example, some cache data of the quick applications, from each other. In an actual process of using a quick application, a user may need to log in to the quick application to obtain some service content, rights, or the like. Therefore, when a single mobile terminal has a plurality of quick applications, if the user needs to log in to two or more of the quick applications, theoretically, the user needs to enter login information such as an account and a password into each quick application for login. Therefore, for the user, the user login operations of the quick applications are complex and inefficient.

Non-Quick Application Content Display Scenario:

To improve user experience, promote content, and help the developer make profits, the quick application may need to display some content (that is, non-quick application content, which is referred to as to-be-displayed content below) other than service content of the quick application to the user when being used by the user. For example, some advertisements or promotional videos may need to be displayed.

In addition, to prompt the user of existence of the to-be-displayed content, or to enable the user terminal to display the to-be-displayed content, or the like, the quick application may have some content such as a link, code, or resource data related to the to-be-displayed content (in this embodiment of this application, the content such as the link, the code, the advertisement, and the resource data is collectively referred to as related content), for example, a web page link, code, or a media resource corresponding to the to-be-displayed content. By using the related content, the quick application may effectively prompt the user of existence of the to-be-displayed content, or may provide the user with a preview of a part of the to-be-displayed content, or may display the to-be-displayed content based on the related content. For example, it is assumed that in some embodiments, the related content includes a web page link of the to-be-displayed content. In this case, a web page including the to-be-displayed content may be opened based on the web page link in the related content, so as to display the to-be-displayed content.

In some embodiments, to prompt the user of existence of the to-be-displayed content, the quick application may display the related content of the to-be-displayed content on a display interface of the quick application. After viewing the related content, the user may determine whether to view the to-be-displayed content as required. When the user wants to view the to-be-displayed content, the quick application needs to display the to-be-displayed content. In this case, the quick application usually generates a new interface, and displays the to-be-displayed content on the interface. For example, in some embodiments, it is assumed that the to-be-displayed content is advertisement data. The quick application can pop up an advertisement window when the user finishes reading a chapter of a novel. If the user is interested in pushed content in the advertisement window, the user may tap the advertisement window. In this case, the quick application may generate an interface that displays the advertisement data. For another example, as shown in FIG. 1A, in some embodiments in which the user terminal is a mobile phone, it is assumed that the to-be-displayed content is advertisement data, and the quick application uses a pop-up advertisement window (that is, the related content is an advertisement window control and related data in the advertisement window control) to display a part of advertisement content to the user. To view the specific advertisement data, the user may tap the advertisement window. After the advertisement window is tapped, the quick application displays, in a form of a web page, an advertisement interface including the advertisement data (in this case, the mobile phone displays the advertisement interface in full screen) for the user to view.

In some other embodiments, when the related content includes a link to the to-be-displayed content, the quick application may alternatively not display the related content of the to-be-displayed content, but open the link in the related content under some specific conditions, and display a new interface that includes the to-be-displayed content and that is pointed to by the link. The specific condition content may be set by a skilled person or a developer based on a requirement. For example, it may be set that the link in the related content is opened after the quick application is used for a specific period of time, or after it is detected that the user performs a specific operation, or after the quick application performs a specific task (for example, when a game begins or ends, or a game level is passed in a game quick application).

In the foregoing embodiments, the to-be-displayed content is displayed in a manner of generating a new interface in the quick application, so that the to-be-displayed content can be displayed. However, in actual application, the following problems may still exist:

1. When the to-be-displayed content is web page data of a website, but a web page link in related content in the quick application is invalid, the quick application cannot jump to the website, and a web page interface cannot be opened. As a result, the quick application cannot normally respond to the user's operation on the web page link, and the quick application may even be unable to jump to the web page interface or display other content of the quick application (for example, the quick application may be stuck on the "jumping" prompt interface). Consequently, user experience deteriorates.
2. A part or all of the to-be-displayed content cannot be normally displayed or used in the quick application. For example, a part of the to-be-displayed content cannot be supported by a quick application engine. As a result, the part of content cannot be properly displayed. For another example, some content in the to-be-displayed content is invalid, and therefore cannot be normally displayed, or cannot be used even if the content is displayed. In this case, although the quick application may display the to-be-displayed content on the new interface, a visual effect and an operation effect of the new interface may be poor, thereby reducing user experience.
3. Directly opening a new interface in the quick application to display the to-be-displayed content causes original interface content of the quick application to be overwritten. In actual application, it is found that some quick applications have weak stability (for example, a quick application developed based on a Hypertext Markup Language 5 website generally loads a quick application interface in a webview (webview) manner, and in this case, the stability of the quick application interface is poor), or content of a quick application interface is highly real-time (for example, the quick application interface may be a game interface, and a game progress needs to be operated in real time). After browsing the to-be-displayed content, if the user wants to return to the original interface of the quick application to perform an operation, the user may close the new interface that displays the to-be-displayed content. When the user closes the new interface by tapping a close button in the new interface, there is a high probability that original interface content is lost. When the new interface is closed by using a back function (which may also be referred to as a function of returning to a previous page) in the user terminal or the quick application, to return to the original interface, it is very likely that the original interface content is lost, the original interface is lost, or even the quick application is directly exited. Therefore, it is difficult for the user to continue to use the quick application normally, and user experience is greatly reduced.

For quick application development, release, and maintenance, to simplify a quick application development process, an embodiment of this application provides a quick application generation method based on website (Website) conversion. In this embodiment of this application, in an entire quick application development process, a developer does not need to perform an operation such as code development, and the developer only needs to fill in related parameter information of the quick application and a website address of a to-be-converted website based on a preset requirement, to obtain the quick application generated based on content of the to-be-converted website and the parameter information. On this basis, the developer can determine whether the obtained quick application meets a development requirement based on an actual requirement of the developer. If the development requirement is not met, the developer may modify the parameter information of the quick application and generate a new quick application until the development requirement is met. If the development requirement is met, the developer may release the quick application. In addition, in this embodiment of this application, a server may automatically obtain all information required for releasing the quick application in a process of generating the quick application, and release the quick application. Finally, for maintenance of the quick application, the server can automatically monitor the content of the to-be-converted website, and automatically update and release the quick application when the to-be-converted website changes.

This embodiment of this application implements an effect of rapid development, release, and maintenance of a quick application. Compared with the current technology in which the developer needs to have knowledge such as front-end development knowledge, the technical specifications of the quick application alliance, and use of development tools, and needs to perform a large number of operations such as code development, testing, and modification to perform quick application development, this embodiment of this application greatly reduces dependence of quick application development on knowledge and skills of the developer, and reduces the operation difficulty of quick application development. According to the method in this embodiment of this application, the developer can obtain a quick application that meets a requirement in a relatively short time. Therefore, in this embodiment of this application, development difficulty and costs of the quick application can be greatly reduced, and a development cycle can be effectively shortened. In addition, information about the quick application is automatically obtained, the quick application is automatically released, and quick application maintenance is automatically performed. In this embodiment of this application, difficulty of releasing and maintaining the quick application can also be effectively reduced, and a period of releasing the quick application is shortened.

For user login in a process of using a quick application, to simplify a login operation of the quick application and improve efficiency of logging in to the quick application by the user, an embodiment of this application further provides a quick application login method. In this embodiment of this application, when the user needs to perform user login to a quick application, if the user has previously performed user login to another associated quick application, in this embodiment of this application, login information in the associated quick application is automatically obtained, and user login is performed based on the login information.

Therefore, in this embodiment of this application, an effect of one-tap login to the quick application can be implemented, and the user does not need to repeatedly enter login information such as an account and a password. Therefore, a user login operation on the quick application can be greatly simplified, and efficiency of quick application login can be improved.

For a requirement of displaying non-quick application content in a process of using the quick application, to reduce impact of non-quick application content display on normal use of the quick application by the user and improve user experience of using the quick application, in this embodiment of this application, a skilled person or a developer preconfigures, in a quick application server, a manner of opening to-be-displayed content (that is, the non-quick application content) and a manner of processing related content of the to-be-displayed content. For example, an opening manner of to-be-pushed data may be set as follows: using a browser in a user terminal (including a browser for a common application program and a browser for a quick application), or using another application program client or a quick application client, to open the to-be-displayed content. A processing rule may be set to delete, hide, or replace a part or all of the related content.

In a process of running the quick application, the user terminal obtains, from the quick application server, a manner of processing the related content of the to-be-displayed content in the quick application and a manner of opening the to-be-displayed content, and processes the related content in the quick application according to the processing manner, to remove content that cannot be displayed or used in the pushed content. When the related content needs to be displayed, the processed related content is displayed. On this basis, if the quick application needs to display the to-be-displayed content, the user terminal may open and display the to-be-displayed content based on the processed related content and the opening manner of the to-be-displayed content. For example, the quick application browser may be used to display the to-be-displayed content in a new window. In this case, the quick application jumps to the quick application browser, and the quick application browser opens a new window to display the to-be-displayed content.

In this embodiment of this application, the user terminal first processes the related content, and deletes, hides, or replaces content (which may include a web page link, code, resource data, or the like) that cannot be normally viewed or used in the related content. In one aspect, display of some invalid content in the related content can be avoided, and a probability that the quick application cannot normally respond to a user operation due to content such as an invalid web page link in the related content is reduced. In another aspect, some to-be-displayed content that is invalid or unsuitable for display cannot be linked or opened by using the related content. This avoids a case in which the user mistakenly views, by using the related content, to-be-displayed content that is invalid or unsuitable for display. In this way, a probability of impact on normal use of the quick application by the user is reduced. In addition, the to-be-displayed content is opened in a manner configured by a skilled person or a developer, so that different to-be-displayed content can be opened in an appropriate manner. In a case in which direct displaying in an overwriting manner on an original interface of the quick application is not suitable, it may be set that the content is opened in another manner other than the quick application, to effectively prevent original interface content on the quick application from being overwritten. After browsing the to-be-displayed content, if the user wants to return to the original interface of the quick application to perform an operation, the user only needs to return to the quick application. The user does not need to worry about the loss of the original interface content or the loss of the original interface. In a case in which direct displaying in an overwriting manner on an original interface of the quick application is suitable, the to-be-displayed content may be set to be displayed in a manner of generating a new interface in the quick application, or may be set to be opened in another manner other than the quick application. Therefore, this embodiment of this application can be adapted to different display requirements of to-be-displayed content, and impact on normal use of the quick application by the user is greatly reduced.

In addition, some terms and concepts that may be used in embodiments of this application are described as follows:

To-be-converted website: In embodiments of this application, a quick application is quickly generated by converting website content into the quick application. A website that needs to be converted is referred to as a to-be-converted website. The to-be-converted website is set by the developer based on an actual requirement. A website type of the to-be-converted website is not excessively limited in embodiments of this application, includes but is not limited to a common website and a Hypertext Markup Language 5 (HyperText Markup Language 5, HTML5, or H5 for short) website, and may be specifically determined based on an actual application scenario.

Developer server: A developer server is a website server (Website Server) of a to-be-converted website, and is used to provide support services for the to-be-converted website.

Developer terminal (which may include a first developer terminal, a second developer terminal, and a third developer terminal): The first developer terminal is a terminal device used by a developer to develop a quick application. The second developer terminal is a terminal device used by a developer to download a quick application (a target quick application generated by a quick application server). The third developer terminal is a terminal device used by a developer to release a quick application. The three developer terminals may be different terminal devices independent of each other, or may be a same terminal device, which may be specifically determined based on an actual application scenario. For example, when a developer uses a same terminal device to develop and download a quick application, the first developer terminal and the second developer terminal may be a same terminal device. When a same terminal device is used to develop and release a quick application, the first developer terminal and the third developer terminal may be a same terminal device. When a same device is used to download and release a quick application, the second developer terminal and the third developer terminal may be a same terminal device. When a same device is used to develop, download, and release a quick application, the three developer terminals are a same terminal device.

In embodiments of this application, a developer needs to use the first developer terminal to access a portal terminal through a specific portal (for example, a specific portal website, a quick application, a mobile application program, or computer software), and complete upload of parameter information of the quick application and a website address of the to-be-converted website. Therefore, in embodiments of this application, the first developer terminal is required to have a capability of accessing a specific portal. For example, when the specific portal is a portal website, the first developer terminal is required to have a website access capability. When the specific portal is a quick application, a mobile application program, or computer software, the first developer terminal is required to have a capability of running the corresponding quick application, mobile application program, or computer software. On this basis, the first developer terminal in embodiments of this application may not have a capability of running a conventional development tool (such as an IDE). An actual terminal type of the first developer terminal is not excessively limited in embodiments of this application. On a basis that the first developer terminal has a capability of accessing a specific portal, the first developer terminal may be any type of terminal device, for example, may be a mobile phone, a wearable device, a tablet computer, or a desktop computer. It may be specifically determined based on an actual application scenario. The second developer terminal may be any terminal device that can run a quick application, for example, a mobile phone and a tablet computer. Similar to the first developer terminal, the third developer terminal needs to have a capability of accessing a specific release portal (the release portal refers to a portal used for the release of a quick application, and the portal can be a website, a quick application, a mobile application program, or computer software used for the release).

It should be noted that when the specified specific portal is a portal that can be accessed by a mobile terminal, such as a portal website, a quick application, or a mobile application program, the first developer terminal in embodiments of this application may be a mobile terminal. In this case, relative to using a computer that can run a development tool as a quick application development terminal, in one aspect, using a mobile terminal poses a lower requirement for software and hardware configuration of the first developer terminal. In addition, the mobile terminal is extremely popular in an actual life, and most people already own one or more mobile terminals. All of these mobile terminals may be used as first developer terminals, so that in actual application, developers do not need to purchase additional first developer terminals. Therefore, in embodiments of this application, development costs of a developer can be greatly reduced. In another aspect, the mobile terminal has great convenience, so that development of a quick application in embodiments of this application can be greatly separated from dependence on space and time. In actual application, a developer can use a mobile terminal to develop a quick application anytime and anywhere, without being limited to a specific office location or office hour. Therefore, in embodiments of this application, convenience of quick application development can be greatly improved.

Portal terminal: A portal terminal is used to provide support services for a specific portal, and receive quick application parameter information and terminal identification of a website address of a to-be-converted website that are uploaded by a developer terminal. In addition, in embodiments of this application, the portal terminal is further used to send the received parameter information and the website address of the to-be-converted website to the quick application server. A terminal type of the portal terminal is not excessively limited in embodiments of this application, and may be set by a skilled person based on an actual requirement. For example, the portal terminal may be a server or a desktop computer.

Release terminal: The release terminal is used to provide support services for a specific release portal. A terminal type of the release terminal is not excessively limited in embodiments of this application, and may be set by a skilled person based on an actual requirement. For example, the release terminal may be a server or a desktop computer. In addition, in some optional embodiments, a portal used when a developer develops a quick application and a portal used when the developer releases the quick application may be a same portal. In this case, the portal terminal and the release terminal may be a same terminal device.

Quick application template: A quick application template is a set of files that meet quick application development specifications but in which some content parameter settings are incomplete (that is, parameters of some content are to be set).

In embodiments of this application, a skilled person may perform a preliminary development operation of a quick application in advance, for example, code development, testing, and modification of the quick application. After the preliminary development operation, a large number of project files, such as header files and source code files, can be obtained for the single quick application. On this basis, the skilled person chooses to set some of the parameters in these project files, and to not set some of the parameters (in some optional embodiments, for a parameter that is not set, a placeholder may be used for replacement first). In this case, the project files corresponding to the single quick application may constitute a quick application template in embodiments of this application.

For the quick application template, an incomplete parameter in the file set may be set, and then the file set is packed, to obtain a quick application that can be applied to the mobile terminal. Based on this, it may also be understood that the quick application template is an uncompressed quick application with incomplete parameters.

In embodiments of this application, a skilled person presets some quick application templates for selection during generation of a quick application. However, when an actual quick application is to be generated, in embodiments of this application, a quick application template is selected, a parameter is set, and packaging is performed, so as to obtain a complete and available quick application. A quantity and specific types of quick application templates may be set by a skilled person based on actual requirements, and are not excessively limited herein.

Quick application template server: In embodiments of this application, all quick application templates are stored in a server, and the server that stores the quick application templates is a quick application template server. In addition, in some embodiments, the quick application template server may be further configured to perform matching on a quick application template based on data uploaded by the quick application server.

Operation terminal: An operation terminal is a terminal used by a skilled person to upload a quick application template and metadata information to the quick application template server. A terminal type of the operation terminal is not excessively limited in embodiments of this application, and may be determined based on an actual application situation. For example, the operation terminal may be a mobile phone, a computer, a wearable device, or the like.

Configuration terminal: A configuration terminal is a generic term of terminal devices used by a skilled person or a developer to configure quick application parameters. The quick application parameter configuration may be configuration of an associated quick application of a quick application, to-be-displayed content opening manner configuration, or processing manner configuration of related content of the to-be-displayed content, or may be another type of parameter configuration. A terminal type of the configuration terminal is not excessively limited in embodiments of this application, and may be determined based on an actual application situation. For example, the configuration terminal may be a mobile phone, a computer, a wearable device, or the like. In addition, it should be understood that the configuration terminal is a general term of one type of terminal devices. In actual application, when configuring different parameters of the quick application, a skilled person or a developer may use a same terminal device for configuration, or may use different terminal devices for configuration. This is specifically determined based on an actual situation, and is not excessively limited herein.

Quick application server: A quick application server is a server used to receive quick application parameter information and a website address of a to-be-converted website that are uploaded by the portal terminal, parse a website resource of the to-be-converted website based on a website address request, and perform operations such as setting a quick application template parameter. In some optional embodiments, the quick application server may be further used to perform automatic maintenance on the quick application. The quick application server is one of core servers for quick application development in embodiments of this application, and has a data interaction capability with terminal devices such as a quick application template server, a portal terminal, and a developer server. In some embodiments, the quick application server may be further used to record an association relationship between quick applications, to assist the user terminal in determining whether data can be shared between a plurality of quick applications. However, in some optional embodiments, the quick application server may be further used to record configuration data of an opening manner of to-be-displayed content and configuration data of a processing manner of related content of the to-be-displayed content (in the following, the configuration data of the opening manner of the to-be-displayed content and the configuration data of the processing manner of the related content of the to-be-displayed content are collectively referred to as target configuration data).

Application release server: An application release server is a server for releasing a quick application to an application store.

User terminal: A user terminal is a mobile terminal on which a user runs a quick application. A specific terminal type of the user terminal is not excessively limited in embodiments of this application, and may be specifically determined based on an actual application situation. For example, the user terminal may be a mobile phone, a tablet computer, or a wearable device. In addition, in some special scenarios, the user terminal and the developer terminals may be a same terminal device. For example, a developer, as a user, uses a quick application. If the developer uses any developer terminal to run and log in to the quick application, the used developer terminal is a user terminal in embodiments of this application.

Application support server: An application support server is a server that provides data content and service support services for quick applications. To enable a quick application to be normally used by a user, a service provider of the quick application needs to set, for the quick application, an application support server that provides a support service for the quick application. Therefore, a specific server type and quantity of application support servers are not excessively limited herein and need to be determined according to an actual application situation.

Authentication server: An authentication server is a server that provides an identity authentication service for a quick application during user login. In actual application, user login of the quick application is classified into the following two types: 1. Use an account and a password registered with a quick application service provider to perform user login. 2. Use an account and a password of a third-party service provider to perform user login. Therefore, in embodiments of this application, authentication servers may also be classified into two types. One type is an official authentication server provided by a quick application service provider, and the other type is a third-party authentication server provided by a third-party service provider. A specific terminal type of the authentication server is not excessively limited in embodiments of this application, and may be determined by a skilled person based on an actual application situation. For example, in some embodiments, the authentication server may be a central authentication service (Central Authentication Service, CAS) server. In addition, in actual application, details of authentication processes corresponding to authentication servers may be different. For example, in some embodiments, identity authentication during user login may be performed in a single sign-on manner. However, in some other embodiments, identity authentication during user login may be performed in a single login manner. This may be specifically determined according to an actual application situation.

Configuration server: A configuration server is a server used to store target configuration data. A server type and quantity of configuration servers are not excessively limited herein, and need to be determined according to an actual situation. Therefore, in actual application, the configuration server may be any one of a quick application server, a quick application template server, an application release server, an application support server, and an authentication server, or may be a stand-alone server other than these servers.

Associated quick application: An associated quick application of a quick application is a quick application that can share login information with the quick application. For example, it is assumed that a skilled person or a developer sets that a quick application A and a quick application B can share login information. In this case, the quick application A and the quick application B are associated quick applications of each other. That is, the quick application A is an associated quick application of the quick application B, and the quick application B is an associated quick application of the quick application A. In addition, in some embodiments of this application, a range of data shared between associated quick applications may not be limited to login information. That is, in addition to login information, more data can be shared between associated quick applications. For example, some quick application media data or advertisement data may be shared. In embodiments of this application, cases of associated quick applications corresponding to different quick applications and data ranges that can be shared between different associated quick applications may be set by a skilled person or a developer based on an actual requirement. This is not excessively limited herein.

Login information: In embodiments of this application, login information is a general term of related information that may be used by the authentication server to perform user identity verification on the user terminal to perform user login. In some embodiments, the login information may be original login information such as an account and a password of the user. However, in some other optional embodiments, the login information may alternatively be other information that is obtained after the original login information is processed and that can be used for user login. For example, a CAS server generates a service ticket (Service Ticket, ST) after completing verification on original login information such as an account and a password. The ST may also be used to attempt to verify an identity of the user. Therefore, in embodiments of this application, the ST may also be referred to as login information. Specific information content, a type, and the like of the login information are not excessively limited in embodiments of this application, and may be specifically determined according to an actual application situation.

Developer: In embodiments of this application, a developer is a person who performs quick application development. In some embodiments of this application, quick application development may be implemented in a manner of converting a website to obtain a quick application. Therefore, in embodiments of this application, a person who performs a website conversion operation to obtain a target quick application also belongs to a developer.

Skilled person: In embodiments of this application, a skilled person may be another person related to the technology other than the developer. Skilled persons include but are not limited to personnel who develop, operate, and manage a quick application development platform, and operation and management personnel of an application store to which a quick application is released. The quick application development platform includes a quick application server and a quick application template server, and may provide a quick application development platform for developers. In addition, in embodiments of this application, quick application management operations that may be performed by a skilled person include but are not limited to: managing a quick application template in Phase 1, reviewing quick application release in Phase 3, configuring an associated quick application in Phase 5, and configuring an opening manner of to-be-displayed content and a processing manner of related content in Phase 7.

It should be specifically noted that in embodiments of this application, the portal terminal, the quick application server, the quick application template server, the application release server, the application support server, and the authentication server are a plurality of devices whose functions are logically independent of each other. That is, each device has a corresponding function described in the foregoing description. For example, the portal terminal has a function of receiving and sending quick application parameter information and a website address of a to-be-converted website that are uploaded by the developer terminal, the quick application template server has a function of storing a quick application template, and so on. However, in an entity hardware layer, in actual application, these devices may be relatively independent hardware devices, or one hardware device that have functions of the foregoing plurality of devices. For example, in a possible case, the portal terminal, the quick application server, the quick application template server, the application release server, the application support server, and the authentication server are six types of hardware devices that are independent of each other. In another possible case, the quick application server and the quick application template server may be a same server (that is, the server has functions of two servers). In this case, the portal terminal, the quick application server, the quick application template server, the application release server, the application support server, and the authentication server are five independent hardware devices. In still another possible case, if the quick application server, the quick application template server, and the application release server are a same server, the portal terminal, the quick application server, the quick application template server, the application release server, the application support server, and the authentication server may be only four independent hardware devices. Specific hardware device cases of the portal terminal, the quick application server, the quick application template server, the application release server, the application support server, and the authentication server are not limited herein and may be determined according to an actual application scenario.

To describe the technical solutions in this application, the following uses an example in which the portal terminal, the quick application server, the quick application template server, and the application release server are four types of hardware devices that are independent of each other, and the specific portal is a portal website. Specific embodiments are used for description.

In an embodiment of this application, development of a quick application may be divided into two phases: a template preparation phase and a quick application generation phase, which are described as follows:

Phase 1: Template preparation phase, also called a template management phase.

Figure 1B:
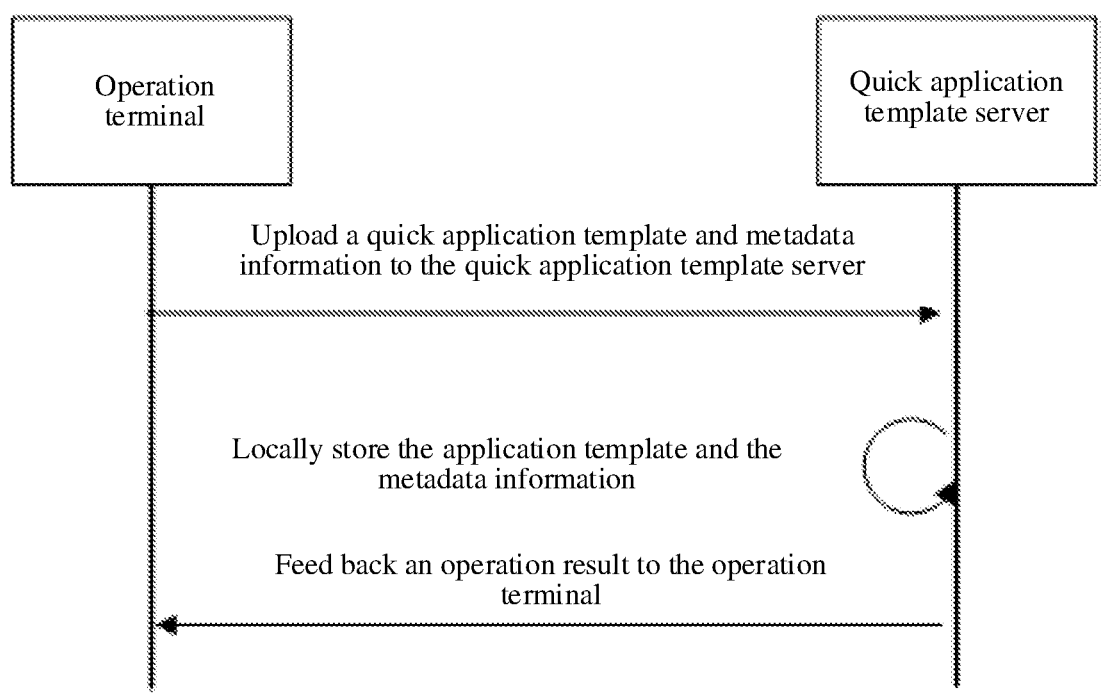
FIG. 1B is a schematic flowchart of a template preparation phase in a quick application generation method according to an embodiment of this application.

FIG. 1B is a schematic flowchart of implementing a template preparation phase. In this phase, a plurality of quick application templates are prepared in advance by a skilled person. In this embodiment of this application, each quick application template is an uncompressed quick application with some incomplete parameters, and some or all quick application functions are configured for each quick application template. A specific type of a quick application function to be configured may be set by a skilled person according to an actual situation. For example, a quick application development requirement survey may be conducted on developers in advance, a plurality of quick application functions that are frequently required by some developers are selected, and the quick application functions are set as quick application functions to be configured. For another example, a user requirement of a quick application user may also be surveyed, to determine a quick application function that is more frequently required by the user, and the quick application function is set as a quick application function that needs to be configured.

In an optional embodiment of this application, any function of the following several quick application functions may be selected to perform function configuration on the quick application template based on a requirement:

a. Configure a quick application menu, for example, whether there is a menu, whether the menu can be moved, a specific location of the menu in the quick application, and a menu option;

b. Configure a landscape/portrait mode of the quick application, for example, whether to support landscape mode, portrait mode, or adaptive landscape/portrait mode;

c. Configure an opening manner of a new window, for example, opening a new window directly in an original window, opening a new window in the quick application, or switching to a browser to open a new window;

d. Configure supported languages, for example, support only Chinese or support both Chinese and English;

e. Configure an application analytics report address, that is, an address of a server to which statistics are reported after statistics collection is performed on quick application behavior; and f. Configure types of web pages that can be displayed, for example, whether to support a web page game.

In addition, based on an actual requirement, the skilled person may further set another quick application parameter other than the quick application functions. For example, a user agent (User Agent, UA) used when a quick application accesses a developer server may be configured. For example, the UA is set to Chrome, a system UA, a quick application default UA, or a customized UA.

To meet quick application development requirements of the developer for different functions, in this embodiment of this application, different quick application templates are distinguished based on functions. That is, in a process of designing a quick application template, function configurations of different quick application templates may be different. For example, some quick application templates may be configured to include menus that can be moved, while other quick application templates may be configured to include no menus. For another example, some quick application templates may be configured to support display in landscape mode, and other quick application templates may be configured to support display in adaptive landscape/portrait mode. In this case, a large quantity of quick application templates with different function configurations can be obtained theoretically, so as to implement compatibility with different developers' requirements for quick application development, and to facilitate subsequent matching of quick application templates. In this embodiment of this application, the skilled person may further set corresponding metadata information for each quick application template. The metadata information is used to record some configured functional features of the quick application template. That is, the skilled person describes quick application function configuration data of the quick application template, for example, a configuration status of the quick application menu, a configuration status of the quick application landscape/portrait mode, a support status of a language type, and a configuration status of a web page type that supports display. When a terminal such as the quick application template server needs to learn a quick application function configuration status of a specific quick application template, the terminal only needs to read corresponding metadata information. In some optional embodiments, the metadata information may further include some other descriptions of the quick application template, for example, a user and a usage scenario to which the quick application template is applicable.

After completing the configuration of the quick application template and the metadata information, the skilled person may upload, by using an operation terminal, the quick application template and the corresponding metadata information to the quick application template server for associated storage. It should be noted that the terminal used by the skilled person to configure the quick application template and the metadata information and the operation terminal may be a same terminal, or may be different terminals. This may be specifically determined according to an actual application situation. For example, the skilled person may use a computer to configure the quick application template and the metadata information, and then upload the configured quick application template and metadata information to the quick application template server by using a mobile phone. In this case, the terminal used for configuring the quick application template and the metadata information is different from the operation terminal.

After receiving the application template and the metadata information, the quick application template server performs local associated storage in one aspect. In another aspect, the quick application template server may feed back corresponding operation result information to the operation terminal based on an operation of the skilled person, so as to help the skilled person know an operation status of the skilled person. For example, after successfully receiving and storing the application template and the metadata information, the quick application template server may return an operation result indicating successful receiving to the operation terminal.

In addition, it should be specifically noted that in actual application, the template preparation phase may be a one-time completion phase, or may be a continuous phase. When the template preparation phase is a one-time completion phase, the template preparation phase is completed before the quick application development phase. In addition, in a process of the quick application development phase, the skilled person no longer performs operations such as adding, deleting, or modifying the quick application template and the metadata information in the quick application template server. When the template preparation phase is a continuous phase, the template preparation phase starts before the quick application development phase, and some quick application templates and metadata information are already stored in the quick application template server. However, in the process of the quick application development phase, the skilled person may still perform operations such as adding, deleting, and modifying the quick application template and the metadata information in the quick application template server based on an actual requirement.

Phase 2: Quick application development phase.

Figure 2A:
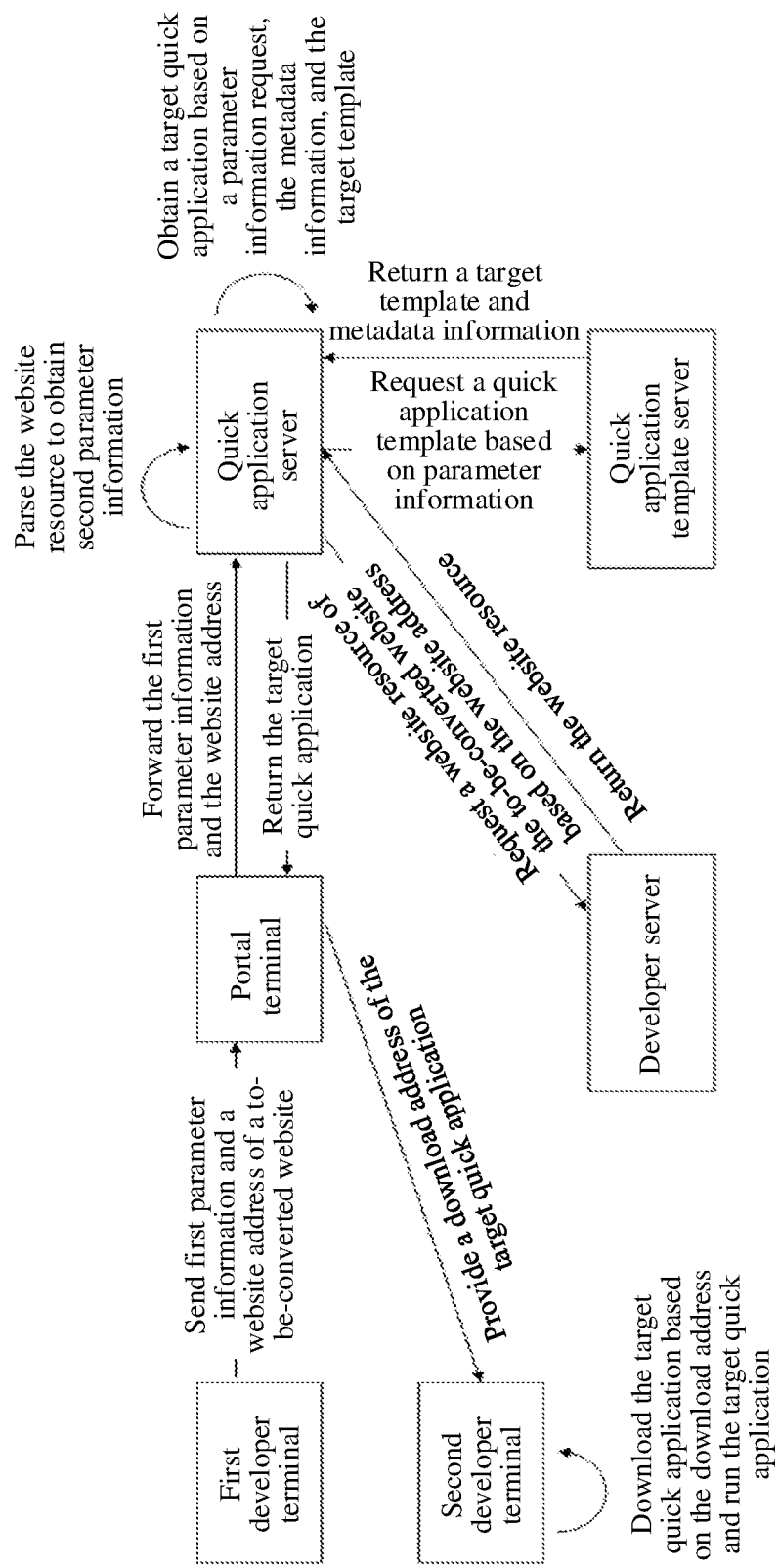
FIG. 2A is a schematic diagram of a system architecture of a quick application generation method according to an embodiment of this application.

FIG. 2A is a schematic diagram of a system architecture in a quick application generation method according to an embodiment of this application. Corresponding to FIG. 2A, FIG. 2B-1 and FIG. 2B-2 are a schematic flowchart of implementing a quick application generation method according to an embodiment of this application. FIG. 2A and FIG. 2B-1 and FIG. 2B-2 are described in detail as follows:

S101: A developer accesses a portal website of a portal terminal by using a first developer terminal, and sends first parameter information of a quick application and a website address of a to-be-converted website to the portal terminal through the portal website.

In some embodiments, the parameter information of the quick application mainly includes the following two types of information:

1. Attribute information of the quick application (referred to as attribute information below), for example, menu configuration information, landscape/portrait mode configuration information, multi-window configuration information, an application analytics report address, language configuration information, an application name, an application package name, an icon (Icon), and a signature and a public key certificate of the quick application. These pieces of attribute information may be used for subsequent quick application template matching and parameter setting.

2. Access information required for accessing the to-be-converted website (referred to as access information below), for example, a UA used for accessing a developer server, authorization information of the to-be-converted website, configuration information of a proxy server used for accessing the to-be-converted website, and a user name and a password of the proxy server.

In actual application, some websites may set access restrictions on some website resources, for example, a login user or an authorized user is required to access a website resource, for another example, a website may be inconvenient or cannot be directly accessed, proxy access is required. In order to minimize the access restriction to the website resource to obtain the required website resource, in this embodiment of this application, the developer may provide the access information of the to-be-converted website according to an actual situation of the to-be-converted website.

Some parameter information is described in detail as follows:

Menu configuration information: The menu configuration information is configuration information related to a menu in the quick application. For example, the menu configuration information may include any one or more of whether there is a menu, whether the menu can be moved, a specific location of the menu in the quick application, and a menu option.

Landscape/portrait mode configuration information: The landscape/portrait mode configuration information is information about whether the quick application supports display in landscape/portrait mode, and may include, for example, whether to support display in landscape mode, whether to support display in portrait mode, and whether to support adaptive display in landscape/portrait mode.

Multi-window configuration information: The multi-window configuration information is information about an opening manner of a new window in the quick application, and may include, for example, opening a new window directly on an original window, opening a new window in the quick application, or jumping to a browser to open a new window.

Application analytics report address: The application analytics report address is an address of a server to which statistics are reported after statistics collection is performed on quick application behavior. For example, in some embodiments, after statistics are collected on an opening time of the quick application and opening device information, the opening time and the opening device information may be reported to a server A. In this case, an address of the server A is an application analytics report address.

Language configuration information: The language configuration information is information about a language supported by the quick application, and may be, for example, only a single language is supported, for example, only Chinese is supported, or a plurality of languages such as Chinese and English are supported.

UA: The UA is a special character string header that enables the website server to identify an operating system and a version of the operating system, a CPU type, a browser and a version of the browser, a browser rendering engine, a browser language, and a browser plug-in used by a visitor. In actual application, a website usually determines the operating system and the browser of the visitor through the UA, and sends different website resources to the visitor according to different situations. Therefore, to enable the visitor to normally view and process website resources, the developer can set a corresponding UA according to an actual situation of the visitor. For example, the UA may be Chrome, a system UA, a quick application default UA, or a customized UA. In this embodiment of this application, the website server is a developer server, and the visitor may be a portal terminal or a terminal device that runs the quick application, for example, a second developer terminal.

Authorization information of the to-be-converted website: Considering that some websites may have some security mechanisms to distinguish different visitors' access to web page content to different degrees and protect website information security, for example, the Robots protocol can be used to set up a security mechanism, setting the authorization information of the to-be-converted website can enable a visitor to obtain higher permission, and the visitor can obtain more web page content.

Configuration information, user name, and password of the proxy server: In actual application, the to-be-converted website may be inconvenient or cannot be directly accessed. In this case, access to the to-be-converted website may be implemented by using a proxy server as a relay station. The configuration information, the user name, and the password of the proxy server include configuration information such as an address of the proxy server, and a user name and a password used for accessing the proxy server, so that the visitor can normally access the proxy server.

In this embodiment of this application, the first parameter information is mainly used by the portal terminal to perform quick application template matching and parameter setting. Therefore, the first parameter information needs to include a part of the attribute information of the quick application. Specific included attribute information content may be selected and set by the skilled person based on an actual requirement. For example, in some optional embodiments, the menu configuration information, the landscape/portrait mode configuration information, and the window configuration information may be selected as the first parameter information. In this case, the developer needs to provide these pieces of attribute information for quick application development.

In an optional embodiment of this application, the skilled person may select a part of information in the attribute information of the quick application as mandatory information, and select a part of information as optional information for the developer. In actual application, the developer needs to provide all attribute information in the mandatory information, but can provide some of the optional information according to an actual situation. For example, the menu configuration information, the landscape/portrait mode configuration information, and the window configuration information may be set as mandatory information, and the application analytics report address and the language configuration information may be used as optional information.

In this embodiment of this application, the website address of the to-be-converted website is used by the portal terminal to access the to-be-converted website, to obtain the website resource of the to-be-converted website. Therefore, the specific website address needs to be set by the developer according to an actual situation. For example, in some optional embodiments, the website address may be https://www.huawei.com/cn/. In addition, in this embodiment of this application, the to-be-converted website may be a common website, or may be an H5 website.

In an optional embodiment of this application, to enable the portal terminal to normally access the to-be-converted website, the first parameter information may further include some access information of the to-be-converted website in addition to the attribute information of the quick application. Specific included access information content may be set by the skilled person based on an actual requirement. For example, a UA may be included. When the to-be-converted website is restricted by permission, the first parameter information may further include authorization information of the to-be-converted website. On this basis, the developer needs to provide corresponding access information based on the settings. In some optional embodiments, the access information may alternatively include mandatory information and optional information. In this case, in addition to providing the mandatory information in the access information, the developer may provide the optional information in the access information according to an actual situation.

In this embodiment of this application, the portal terminal provides the developer with a portal website that can be used for quick application development. In the portal website, a quick application generation function is preset. When the developer needs to develop a quick application, the developer may access the portal website by using the first developer terminal, and use the quick application generation function. The quick application generation function may be an independent function, or may be a composite function integrated with another function. For example, the quick application generation function and a release function may be integrated into a composite function, and the developer may implement development and release operations on the quick application by using the composite function. In addition, the quick application generation function can also be set as a default start function of the portal website. This function is enabled by default as long as the portal website is opened, so that the developer can use this function more conveniently. The first developer terminal may be any terminal device that is convenient for the developer to use, so as to facilitate an actual quick application development work of the developer. For example, the first developer terminal may be a mobile phone, a tablet computer, or a personal computer.

After the quick application generation function is enabled, the portal website provides an upload interface on which the first parameter information of the quick application and the website address can be uploaded. A form of the upload interface is not excessively limited in this embodiment of this application, and may be set by the skilled person based on an actual requirement. For example, in some optional embodiments, the upload interface may be a brand-new interface. In this case, the portal website jumps from the original interface to the upload interface. In some other embodiments, the upload interface may also be a pop-up interface. In this case, the upload interface pops up on the basis of the original interface on the portal website. However, in still some embodiments, the upload interface may alternatively be an interface obtained by modifying the original interface. For example, a new control can be added to the original interface to upload the parameter information and the website address.

In addition, a manner of uploading the first parameter information and the website address in the upload interface is not excessively limited in this embodiment of this application, and may be specifically set by the skilled person based on an actual requirement. For example, in some embodiments, upload may be performed in a file manner (also referred to as offline import). In this case, the developer is required to store the parameter information and the website address in one or more files in advance, and then upload the files to the portal terminal by using the upload interface, so as to upload the first parameter information and the website address. However, in some other optional embodiments, the first parameter information and the website address may alternatively be entered in the upload interface in an online manner. In this case, the developer may enter the specific first parameter information and the website address in the upload interface according to an actual situation, and submit the first parameter information and the website address to the portal terminal. For some parameter information whose content is relatively fixed, content options of the parameter information may alternatively be set in advance in the upload interface. In this case, filling in the parameter information is essentially selecting required content from the content options. For example, it is assumed that the first parameter information includes the landscape/portrait mode configuration information of the quick application. In actual application, landscape/portrait mode configuration usually includes three cases: landscape mode, portrait mode, and adaptive landscape/portrait mode. Therefore, the three cases can be set to corresponding content options for the developer. The developer can select a corresponding option based on an actual requirement.

In an optional embodiment of this application, in one aspect, if the first parameter information includes excessive parameter content in actual application, operation difficulty for the developer is increased, and quick application development difficulty is increased. Therefore, in actual application, parameter content included in the first parameter information is usually relatively limited, and it is difficult to cover all attribute information of the quick application and all access information required for accessing the to-be-converted website. In another aspect, when the first parameter information includes optional information, the developer may also provide some optional information content. Comprehensive analysis of the two aspects shows that in actual application, some attribute information and access information cannot be obtained from the developer. For this case, in this embodiment of this application, the skilled person may select some attribute information and some access information according to an actual situation, and preset corresponding default information content. On this basis, after the first parameter information is obtained, default information content is set for attribute information and access information other than the obtained first parameter information. For example, a default signature and certificate may be set for a signature and a public key certificate of the quick application. For the UA used to access the developer server, a default UA may be set. In actual application, the signature and the public key certificate of the quick application are optional information in the attribute information and are not provided by the developer. The portal website can use the default signature and certificate as an actual signature and public key certificate of the quick application.

In addition, in an optional embodiment of this application, in addition to the first parameter information and the website address, the developer may further provide some other information (which may also be referred to as non-first parameter information), to meet a requirement of actual quick application development. For example, when the quick application development function is integrated with another function into a composite function. Data required by the integrated another function may be provided together with the first parameter information. For example, it is assumed that the quick application generation function and the release function are integrated into a composite function. When providing the first parameter information, the developer may further provide some information required for releasing the quick application, for example, a country or region where the quick application is released, a screenshot of the quick application, and related material information of the quick application, such as a test result. For another example, in some optional embodiments, it is assumed that the developer wants a quick application generated this time to share data with another quick application. In this case, the developer may choose to provide associated quick application data while providing the first parameter information. If it is expected that the generated quick application can share data with a quick application A and a quick application B, the developer may provide related data of the quick application A and the quick application B (which may be application names, application package names, or other data that can help the quick application server determine the quick application A and the quick application B). However, to meet a requirement of the developer for providing the non-first parameter information, in this embodiment of this application, a function of uploading or inputting the non-first parameter information may alternatively be provided in the portal website. In this case, the developer may send the non-first parameter information to the portal terminal through the portal website.

In an optional embodiment of this application, when sending the first parameter information and the website address, the portal website may generate a quick application generation request, and upload the quick application generation request together with the first parameter information and the website address to the portal terminal. The quick application generation request is used to notify the portal terminal that the developer needs to generate the quick application.

Figure 2C:
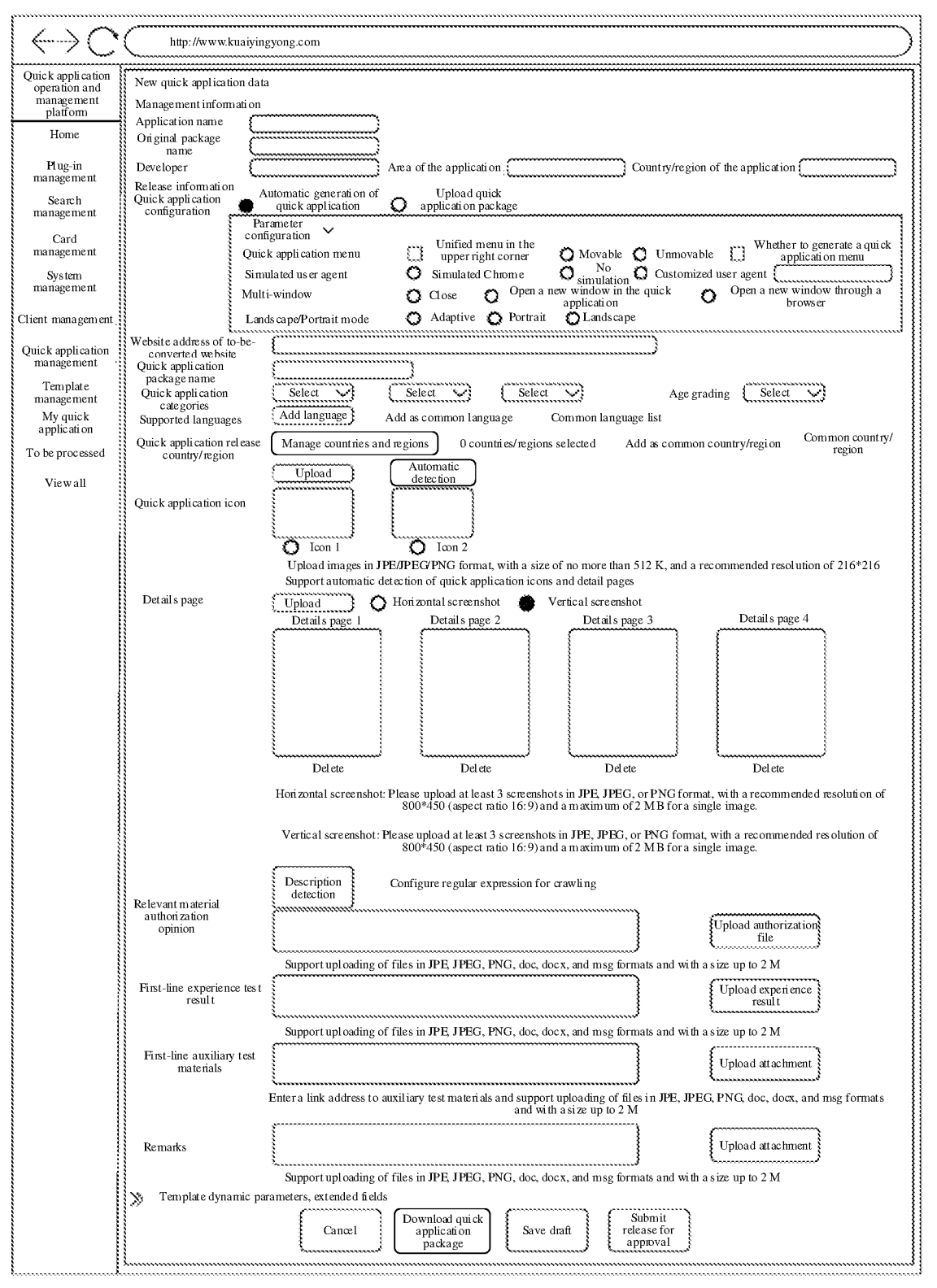

In a specific implementation of providing the first parameter information and the website address of the to-be-converted website in this application, in this embodiment of this application, the quick application development function and the release function are integrated into one composite function. The upload interface is a pop-up interface. FIG. 2C is a schematic diagram of an upload interface that pops up after a quick application development function is enabled.

As shown in FIG. 2C, in this embodiment of this application, quick application attribute information that may be entered in the upload interface includes: a quick application menu (menu configuration information), multi-window (multi-window configuration information), landscape/portrait mode (landscape/portrait mode configuration information), a quick application package name, a supported language (language configuration information), and icons.

Quick application access information that may be entered includes: a simulated user agent (that is, a UA).

Some information required for quick application release may be entered, and includes, for example: quick application categories, countries or regions for release, and details pages (that is, application screenshots). Other related information of the quick application, such as a frontline experience test result in related materials, frontline assistance test materials, and remarks on the quick application, may be entered.

In addition, to facilitate management of the quick application, when the quick application already has a corresponding native application program, related information of the native application program may be entered, for example, an application name of the native application program, a native package name, a developer, an area and a country or region to which the native application program belongs.

In this embodiment of this application, the developer may enter each piece of information content in the upload interface of the portal website based on an actual requirement. When quick application development needs to be performed, the developer may select a function of "Automatic generation of quick application", and then enter the corresponding first parameter information of the quick application and the website address of the to-be-converted website. In addition, "Download quick application package" may be selected after the first parameter information and the website address are entered. In this case, the portal website uploads the first parameter information and the website address that are entered by the developer to the portal terminal, so as to implement the operation of S101.

Figure 2D:
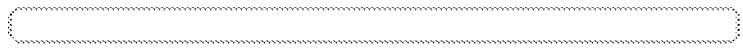
FIG. 2D is a schematic diagram of an application scenario according to an embodiment of this application.

In an optional embodiment of this application, on the basis of the embodiment shown in FIG. 2C, based on an actual requirement, the skilled person may set some information in the upload interface as mandatory information, and set other information as optional information. In addition, a prompt identifier may be added before mandatory information to notify the developer that the information is mandatory. For example, the website address of the to-be-converted website is information that needs to be provided when developing the quick application. In this case, as shown in FIG. 2D, an "*" identifier may be added before "Website address of to-be-converted website" to notify the developer that "Website address of to-be-converted website" is mandatory information.

It should be noted that each piece of information shown in the upload interface in the embodiment shown in FIG. 2C is an example for description. In actual application, the upload interface may include more or less information than that in FIG. 2C. This may be specifically determined according to an actual scenario. For example, information such as "Application name", "Native package name", and "Developer" may not be included. Alternatively, some information such as "Quick application version" may be added. In addition, specific candidate item content and the like included in each piece of information may also be different from that in FIG. 2C in actual application. For example, for "Landscape/Portrait", candidate items can contain only "Landscape" and "Portrait" but no "Adaptive". For "Simulated user agent", "System user agent" and "Quick application default user agent" options may be added on the basis of "Simulated Chrome", "No simulation", and "Customized user agent". Therefore, specific information included in the upload interface, candidate items included in the information, and the like are not excessively limited herein, and may be specifically determined according to an actual application situation.

It should be noted that, when the specific portal is a mobile application program or computer software, the first developer terminal needs to first install and run the mobile application program or computer software, then upload or input the first parameter information and the website address of the to-be-converted website in the mobile application program or computer software, and send the first parameter information and the website address to the portal terminal. When the specific portal is a quick application, the first developer terminal needs to first run the quick application, then upload or input the first parameter information and the website address of the to-be-converted website in the quick application, and submit the first parameter information and the website address to the portal terminal. In addition, for the specific portal, the developer can be required to log in to the portal or do not need to log in to the portal, to perform a quick application development operation. The developer needs to perform user login to the specific portal when it is set that login is required to perform quick application development. In addition, the quick application development and the operation in S101 can be performed only after the user successfully logs in. When it is set that login is not required for quick application development, after accessing the specific portal, the developer can perform quick application development and the operation in S101 without performing user login.

S102: The portal terminal receives the first parameter information of the quick application and the website address of the to-be-converted website, and forwards the first parameter information and the website address to the quick application server.

In this embodiment of this application, a generation operation of the quick application is mainly implemented by the quick application server. Therefore, after receiving the first parameter information and the website address of the to-be-converted website that are uploaded by using the portal website, the portal terminal forwards the first parameter information and the website address of the to-be-converted website to the quick application server. If the quick application generation request is received at the same time, the quick application generation request is also forwarded to the quick application server.

It should be understood that, in actual application, if the portal terminal and the quick application server are a same terminal device, the quick application server may directly receive data sent by the first developer terminal. In this case, the operation in S102 may not exist.

S103: After receiving the first parameter information of the quick application and the website address of the to-be-converted website, the quick application server requests a website resource of the to-be-converted website from the developer server based on the website address.

After receiving the first parameter information and the website address of the to-be-converted website, the quick application server sends a website resource request to the developer server based on the website address of the to-be-converted website, to request the website resource of the to-be-converted website. In this case, a language type (Accept-Language) parameter can be set or not set in the request. If the language type parameter is set (a specific language type is not limited here, and can be set by the skilled person), the developer server returns a website resource corresponding to the language type. If the parameter is not set, the developer server returns a website resource corresponding to a default language of the to-be-converted website.

If the first parameter information includes the access information, when accessing the to-be-converted website, the quick application server implements, based on the access information, access to the developer server and request for the website resource of the to-be-converted website. For example, in some embodiments, if the first parameter information includes a UA, the quick application server simulates the UA to access the developer server. If the UA is Chrome, the quick application server simulates Chrome to access the developer server. If the UA is a developer-defined UA, the quick application server simulates the developer-defined UA to access the developer server. In some other embodiments, if the first parameter information includes a user name and a password of the to-be-converted website, the developer server sends the user name and the password to the developer server when accessing the developer server. The user name and the password are used by the developer server to obtain the website resource of the to-be-converted website. In still some embodiments, if the first parameter information includes the address of the proxy server, the developer server accesses the proxy server based on the address, and accesses the developer server by using the proxy server. If the first parameter information includes the authorization information of the to-be-converted website, the authorization information is also sent to the developer server.

The website resource in this embodiment of this application includes: a web page file (that is, an HTML file) of the website and a resource file included in the website. Content included in the resource file is not excessively limited herein, and may be all resource files included in the website, or may be only some resource files included in the website. This may be specifically set by the skilled person based on an actual quick application development requirement. For example, in some optional embodiments, it is considered that a JS script of a web page, a cascading style sheet (Cascading Style Sheets, CSS), and media data (for example, an image, a video, and audio) may be used in quick application development. In this case, the resource file may be set to include a JS script, a CSS, and media data. In other optional embodiments, the resource file may alternatively include more or less content than the JS script, the CSS, and the media data. For example, the resource file can include only the JS script, the CSS, and an image (Image). Alternatively, the resource file may include only the CSS and the media data.

In actual application, when the to-be-converted website supports a plurality of languages, each language of the to-be-converted website corresponds to a website resource in the language. When accessing the to-be-converted website, a user can switch the website language to view website resources in different languages. For example, when the to-be-converted website supports both Chinese and English, the user can view website content in Chinese and English by switching between Chinese and English. When the quick application is generated, to enable the generated target quick application to support a plurality of languages like the to-be-converted website, website resources of the to-be-converted website in different languages need to be obtained. Therefore, when making a request in S103, the quick application server may attempt to request website resources in different languages of the to-be-converted website from the developer server. To implement website resource request in a plurality of languages, two optional language determining manners provided in this embodiment of this application are as follows:

Language determining manner 1: When providing the first parameter information, the developer provides language configuration information of the to-be-converted website. Because the developer is generally aware of languages supported by the to-be-converted website, when providing the first parameter information in the upload interface, the developer may choose to provide the language configuration information of the to-be-converted website, to implement accurate request for website resources in different languages of the to-be-converted website. For example, both Chinese and English may be requested.

Language determining manner 2: The skilled person presets a plurality of requested language types in the quick application server. In actual application, in one aspect, the developer may not be able to accurately learn the language supported by the to-be-converted website. In another aspect, the behavior of the developer is uncontrollable, and the quick application server may not obtain the language provided by the developer. Therefore, in actual application, the developer may not set a language type, but the skilled person may set a required requested language type in the quick application server in advance. To obtain website resources in different languages supported by the to-be-converted website as accurately as possible, in this manner, the skilled person may pre-investigate language types commonly used by some websites, and set these language types in the quick application server.

On the basis of the language determining manner 1, when the quick application server performs S103, the quick application server may first determine, based on the language configuration information in the first parameter information, all language types that need to be requested this time. On the basis of the language determining manner 2, the quick application server may determine, based on setting of the skilled person, all languages required to be requested this time. If both the language determining manner 1 and the language determining manner 2 are applied, a union set of language types that need to be requested in the language determining manner 1 and language types that need to be requested in the language determining manner 2 may be obtained, or only the language types that need to be requested in the language determining manner 1 may be retained.

Because a website resource in each language needs to be requested separately, after determining the language types that need to be requested, the quick application server requests the website resource of the to-be-converted website from the developer server for a plurality of times, and sets a different language type parameter value in the request each time until all required language types are requested. Therefore, in this embodiment of this application, the website resources in different language types of the to-be-converted website can be effectively obtained, so that the finally generated target quick application is more suitable for an actual situation of the to-be-converted website. Therefore, the generated target quick application is more accurate and reliable, and is more suitable for an actual requirement of the developer.

For example, it is assumed that in some embodiments, a language type that needs to be requested includes Chinese and French. In this case, the quick application server may request a website resource from the developer server at least twice, where a language type that is set in one request is Chinese, and a parameter value is set as follows: Accept-Language: zh-CN, zh; q=0.9, en-GB; q=0.8, en; q=0.7. In the other request, the language is set to French. The parameter value is as follows: Accept-Language: fr-CH, fr; q=0.9, en; q=0.8, de; q=0.7, *; q=0.5.

S104: After receiving the request of the quick application server, the developer server obtains the website resource of the to-be-converted website, and returns the website resource to the quick application server.

After receiving the resource obtaining request of the quick application server, the developer server parses the website resource of the to-be-converted website to obtain the HTML file and the resource file of the to-be-converted website. The obtained HTML file and resource file are returned to the quick application server, thereby realizing the feedback of the website resource. For example, if the resource file includes the JS script, the CSS, and the image, the developer server extracts the JS script, the CSS, and the image of the to-be-converted website and sends them to the quick application server as a resource file.

In an embodiment of this application, when receiving the resource obtaining request, the developer server further receives the access information sent by the quick application server. The access information may be used to parse the website resource of the to-be-converted website. For example, if the developer server receives the user name and the password of the to-be-converted website and the authorization information of the to-be-converted website, the developer server may use the user name, the password, and the authorization information to perform user identity verification and permission verification for the to-be-converted website. Then, based on a verification result, the website resource that can be obtained in the to-be-converted website is determined.

S105: After receiving the website resource of the to-be-converted website, the quick application server parses the website resource to obtain second parameter information of the quick application.

In this embodiment of this application, essentially the to-be-converted website is converted to obtain a quick application that has some features and content of the to-be-converted website, so as to implement quick application development. Therefore, after receiving the website resource of the to-be-converted website, the quick application server parses the website resource to obtain parameter information and a resource (referred to as the second parameter information in this embodiment of this application) that can be used to generate the quick application in the website resource. The second parameter information includes some attribute information of the quick application. Based on different actual requirements for the generated quick application, a type of the attribute information included in the second parameter information may vary to some extent, and may be specifically set by the skilled person based on an actual requirement. For example, in some optional embodiments, the second parameter information may include an application name of the quick application, a description, an icon, language configuration information, multi-window configuration information, and the like. However, in some other optional embodiments, an application name of the quick application, a description, an icon, language configuration information, multi-window configuration information, and a web page type of the to-be-converted website may alternatively be included. The web page type herein can be classified into a game web page (that is, a web page that supports a web page game) and a common web page. Because the generated quick application also needs to support displaying a part of content of the to-be-converted website, that is, theoretically, the quick application also needs to support a web page type of the to-be-converted website, for example, whether a web page game can be supported. Therefore, the web page type of the to-be-converted website may also be considered as one type of attribute information of the quick application.

It should be noted that, because the website resource is parsed, website information of the to-be-converted website is directly obtained, instead of the parameter information of the quick application. Therefore, in an actual operation, the obtaining operation of the second parameter information may be logically divided into two steps:

Step 1: Parse the website resource to obtain the website information of the to-be-converted website. In this case, the website information may be all website information of the to-be-converted website, or may be some website information, provided that a requirement of the second parameter information can be met theoretically. This may be specifically set by the skilled person based on an actual requirement. For example, it may be set that a website name, a website description, a website icon, and a website language are included.

Step 2: Determine the second parameter information based on the website information.

Methods implemented in step 1 and step 2 are not excessively limited in this embodiment of this application, and may be set by the skilled person based on a requirement. For example, for step 1, in some optional embodiments, a natural language recognition technology, keyword matching, or a rule customized by the skilled person (for example, the skilled person can set a location and a reading manner of each piece of website information in the website resource in advance according to an information distribution law in the website resource, and form a customized rule for information extraction) may be used to obtain the website information. For step 2, in some optional embodiments, the skilled person may preset a conversion relationship between some website information and the second parameter information, and then determine the second parameter information based on the website information and the conversion relationship. For example, in some embodiments, it is assumed that the second parameter information includes the application name, and it is set that the website name of the to-be-converted website is used as the application name. In this case, in step 1, the website name is parsed and is used as the application name.

It should be understood that step 1 and step 2 are merely logical division. In actual application, an actual operation such as data calculation and conversion may not exist in the determining process in step 2. For example, when it is set that a specific piece of website information of the to-be-converted website is directly used as a piece of attribute information of the quick application, for example, it is set that the website name of the to-be-converted website is used as the application name of the quick application, parsing of the second parameter information is actually completed in step 1, and the determining process in step 2 is only logical "determining" without operations such actual data calculation and conversion.

In addition, it should be further understood that although the skilled person may set a type of attribute information included in the second parameter information, in actual application, depending on an actual situation of the to-be-converted website, some attribute information in the second parameter information may not be normally determined. For example, in some embodiments, it is assumed that the second parameter information includes the description of the quick application, and it is set that the website description in the to-be-converted website is used as a description of the quick application. Theoretically, the quick application server can obtain the description of the quick application by parsing the website description in the to-be-converted website. However, in practice, not all websites have website descriptions. When there is no website description in the to-be-converted website, the quick application server may not be able to parse the description of the quick application normally. In an optional embodiment of this application, for attribute information that cannot be normally obtained through parsing, content of the attribute information may be set to null. In another optional embodiment of this application, the attribute information that cannot be normally obtained through parsing may alternatively be deleted from the second parameter information in this quick application generation operation. In this case, the second parameter information may include only a part of attribute information types actually set by the skilled person.

In an optional embodiment of this application, the second parameter information may further include some other information on the basis of the attribute information of the quick application. Specific included information content is not excessively limited herein, and may be set by the skilled person based on an actual requirement. For example, to facilitate a subsequent test and release requirement of the developer, the second parameter information may further include one or more page screenshots of the to-be-converted website.

In a specific implementation method for parsing the website resource in step 1 of this application, in this embodiment of this application, after receiving the website resource that includes the HTML file and the resource file, the quick application server parses the HTML file (an HTML parser may be used for parsing, and a parsing method is not excessively limited herein), and constructs an HTML document object model (Document Object Model, DOM) node tree (referred to as a DOM tree below) of the to-be-converted website. After obtaining the DOM tree, the quick application server may obtain each piece of website information included in the HTML file and the resource file by analyzing elements in the DOM tree. In this way, the parsing of the website resource in step 1 is completed.

Figure 2E:
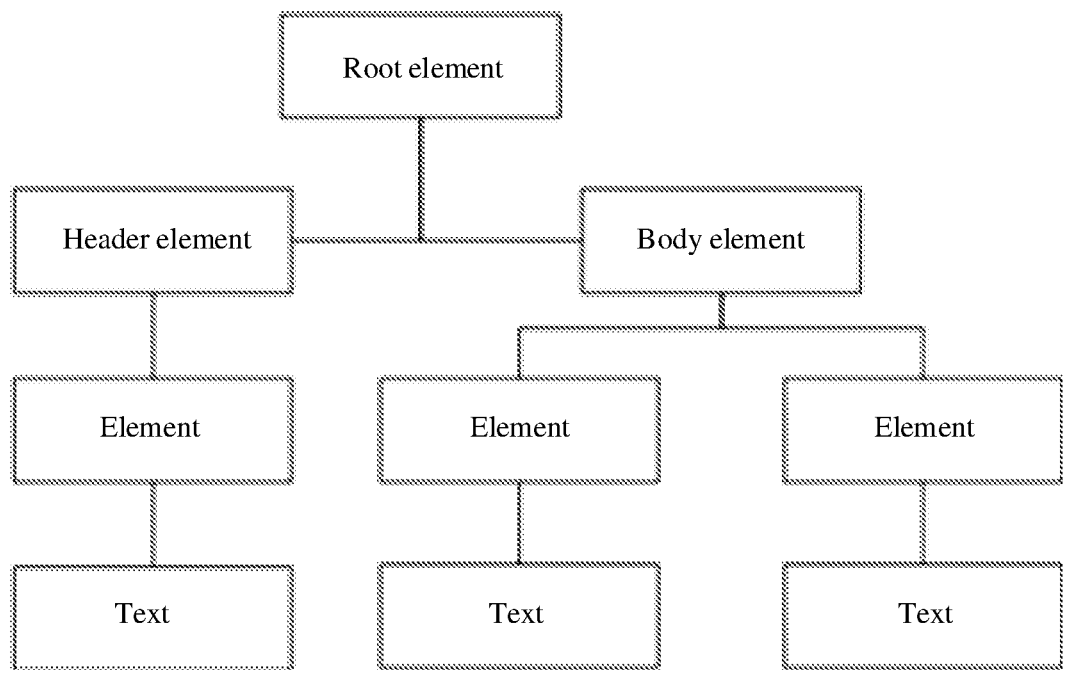
FIG. 2E is a schematic diagram of a structure of a DOM tree according to an embodiment of this application.

FIG. 2E is a schematic diagram of a structure of a DOM tree. A root element is an <HTML> tag, a header element is a <head> tag, and a body element is a <body> tag. The <head> tag is used to define a header of the HTML file, and is a container for all header elements. For example, the <head> tag can include tags such as <base>, <link>, <meta>, <script>, <style>, and <title>. The <body> tag is the body of the HTML file. The <body> tag may include all content that can be seen on the website (such as text, hyperlinks, images, tables, lists, and the like). The DOM tree treats each element of the website as an object, and defines objects and attributes of all HTML elements and methods to access them. All the HTML elements in the website along with text and attributes included in the HTML elements can be accessed by using the DOM tree. Therefore, in this embodiment of this application, the DOM tree of the to-be-converted website is constructed based on the HTML file, so that the quick application server can obtain required website information. For example, the language type supported by the to-be-converted website can be determined by analyzing the <head> tag of the DOM tree. It is assumed that the website address of the to-be-converted website is: www.huawei.com. The language type supported by the to-be-converted website may be analyzed by using <link rel="alternate" hreflang="en" href="www.huawei.com/en"/> in the <head> tag.

In this embodiment of this application, the DOM tree of the to-be-converted website is constructed, so that an effective analysis of a structure of the to-be-converted website is implemented. Then, based on the DOM tree, the analysis and information extraction of the website resource can be carried out, and accurate and effective extraction of the second parameter information can be realized.

In an embodiment of this application, if the resource file includes the CSS, after parsing the HTML file to construct the DOM tree, the quick application server further parses the CSS to obtain corresponding style sheet rules. These style sheet rules are then placed on corresponding tree nodes of the DOM tree. In this case, a DOM tree with style attributes may be obtained.

In another optional embodiment of this application, considering that in actual application, the JS script may dynamically modify website content by using the DOM tree, in actual application, if the website has a JS script, an actual DOM tree structure of the website after the JS script is run may be different from an initial DOM tree structure. Therefore, when the resource file includes the JS script, if the DOM tree is directly constructed by using the HTML file or using the HTML file and the CSS file, the obtained DOM tree may not be accurate. Based on this, to improve accuracy of the DOM tree and improve reliability of the second parameter information, in this embodiment of this application, if the resource file includes the JS script, the quick application server first simulates a browser to run the JS script. Then, the HTML file obtained after the JS script is run or the HTML file and CSS are parsed and the DOM tree is generated, so as to obtain an actual reliable DOM tree. The method for running the JS script is not excessively limited in this embodiment of this application, and may be set by the skilled person. For example, a JS engine (such as a V8 engine) can be used to execute the JS script. Therefore, in this embodiment of this application, accuracy and reliability of extracting the second parameter information can be improved.

In an embodiment of this application, because there is no way to predict whether the resource file includes the JS script, it is difficult to predict whether the JS script needs to be run before constructing the DOM tree in actual application. To resolve this problem, in this embodiment of this application, a JS engine is preset. After receiving the HTML file and the resource file of the to-be-converted website, the quick application server puts the HTML file and the resource file into the JS engine for processing. If the JS script is included, the JS engine runs the JS script and then outputs an HTML file obtained after the JS script is run and the resource file. If the JS script is not included, the JS engine does not affect the HTML file and the resource file, and the JS engine directly outputs the input HTML file and resource file. Finally, the HTML file and the resource file output by the JS engine are parsed and the DOM tree is constructed.

In a specific embodiment of parsing the website resource to obtain the second parameter information in this application, it is assumed that the website resource includes an HTML file and a resource file, and the resource file includes a CSS, a JS script, and an image. In addition, it is assumed that the second parameter information includes an application name of the quick application, a description, an icon, language configuration information, multi-window configuration information, a web page type of the to-be-converted website, and a plurality of web page screenshots. It is set that a website name of the to-be-converted website, a website description, a website icon, information about a language type supported by the website, and information about an opening manner of a new window are respectively used as the application name of the quick application, the description, the icon, the language configuration information, and the multi-window configuration information. On this basis, the quick application server first uses the JS engine to process the HTML file and the resource file. Then the processed HTML file and CSS are parsed to construct a DOM tree. By analyzing a <head> tag and a <body> tag of the DOM tree, a website name, a website description, a website icon, information about a language type supported by the website, information about an opening manner of a new window, and a web page type of the to-be-converted website that are included in the HTML file and the resource file are determined. In addition, a page of the to-be-converted website is drawn based on the DOM tree, and screenshots of the page are taken to obtain a variety of web page screenshots. Finally, the application name of the quick application, the description, the icon, the language configuration information, and the multi-window configuration information are determined based on the website name, the website description, the website icon, the information about a language type supported by the website, the information about an opening manner of a new window, and the web page type of the to-be-converted website. In this way, all information content required in the second parameter information may be obtained.

Figure 2F:
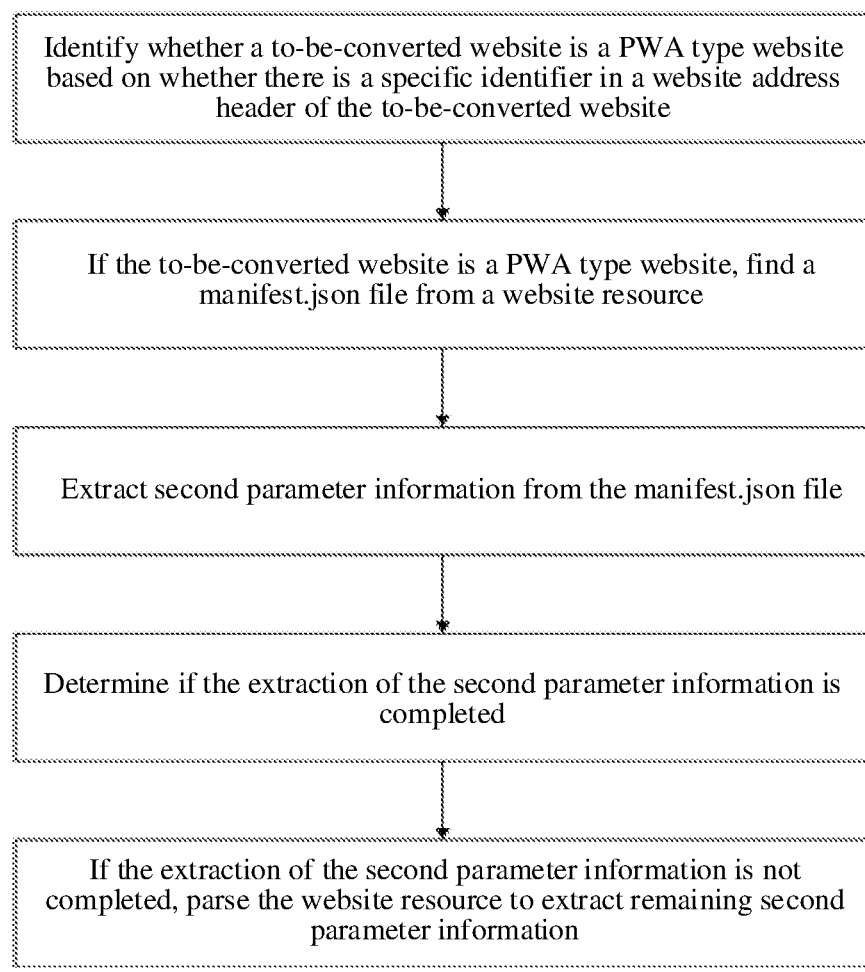
FIG. 2F is a schematic flowchart of parsing a website resource in a quick application generation method according to an embodiment of this application.

In another specific implementation method for parsing the website resource in step 1 of this application, in actual application, there is a progressive web application (Progressive Web App, PWA) type website in the H5 website. This type of website encapsulates the website into a web application (Web App), and a website address header of the website has a specific identifier. The PWA type website includes capabilities such as Add to Homescreen (Add to Homescreen), Offline Cache (Offline Cache), Push (Push), and Notification (Notification), and stores some website information (such as a website name and a website icon) in the manifest.json file of the website. Therefore, to improve parsing efficiency of website information, as shown in FIG. 2F, in this embodiment of this application, whether the to-be-converted website is a PWA type website is first identified based on whether the website address header of the to-be-converted website has the specific identifier. If the to-be-converted website is a PWA type website, during website resource parsing, in this embodiment of this application, the manifest.json file is first found from the HTML file (a manner of searching for <link rel="manifest" href="***"> may be used, and a specific search method is not limited). Then, the website information is extracted from the manifest.json file. For example, a name field in the manifest.json file may be extracted to obtain a website name, a description field may be extracted to obtain a website description, and an icons field may be extracted to obtain a website icon. If there are a large number of website icons, only a website icon of a specific size may be extracted. For example, it may be set that only a website icon above 144×144 and below 192×192 is extracted. The corresponding second parameter information is determined based on the extracted website information.

After the website information extracted from the manifest.json file is obtained, it is determined whether a website information requirement of the second parameter information is met. If the website information requirement is not met, other website information required by the second parameter information continues to be extracted from the website resource, and then the corresponding second parameter information is determined. For example, it is assumed that the required website information is as follows: the website name of the to-be-converted website, the website description, the website icon, the information about a language type supported by the website, and the information about an opening manner of a new window, where the website name, the website description, and the website icon may be extracted from the manifest.json file. In this case, the information about a language type supported by the website and the information about an opening manner of a new window need to continue to be extracted from the website resource. A method for parsing the website resource and continuously extracting the website information is not excessively limited in this embodiment of this application, and may be set by the skilled person based on an actual requirement. For example, reference may be made to the foregoing DOM tree-based website resource parsing method, or a natural language recognition technology, keyword matching, or a rule customized by the skilled person may be used for implementation. In this embodiment of this application, an extraction operation on a part of the second parameter information can be saved, and efficiency of parsing the second parameter information can be improved.

In an optional embodiment of this application, for the target quick application generated based on the to-be-converted website of the PWA type, when generating the target quick application, the quick application server may add one piece of annotation information of the PWA type to the target quick application. In this way, after obtaining the target quick application, the developer can learn type information of the to-be-converted website and the target quick application.

In an optional embodiment of this application, it can be learned from the description that the to-be-converted website supports a plurality of languages in S103 that when the to-be-converted website supports a plurality of language types, it is necessary to determine the language types supported by the to-be-converted website and request website resources of the to-be-converted website in the different language types. In the embodiments of the language determining manners 1 and 2 provided in S103 (the languages that may be supported by the to-be-converted website are manually set by the developer or the skilled person), the quick application server learns the language types that need to be requested before the request is made. In a specific implementation of the multi-language website resource request in this application, it is assumed that the second parameter information includes language configuration information. In this embodiment of this application, after the language configuration information of the quick application is obtained through parsing in S105, the quick application server determines, based on the language configuration information, whether there is a language type for which website resource request has not been performed. If yes, the quick application server sends, to the developer server, a request for which a parameter value of the unrequested language type is set. For example, it is assumed that the language configuration information is supporting Chinese and English, and corresponding website resource request has been sent for Chinese. In this case, in this embodiment of this application, a website resource request for which an English parameter value is set is sent to the developer server.

Compared with the embodiments corresponding to the language determining manners 1 and 2, in this embodiment of this application, website resources for different language types can be automatically obtained without a need for the developer or the skilled person to set a language type. The whole process is automated, and the operation is simpler and more efficient. In addition, in this embodiment of this application, the request is made based on a language type actually supported by the to-be-converted website. Compared with manual setting by the developer or the skilled person in the language determining manners 1 and 2, the language type is determined more accurately and reliably. Therefore, obtaining of the website resources is more reliable.

In addition, the language configuration information may not be obtained by parsing the website resource in actual application. In this case, automatic identification of language types supported by the to-be-converted website cannot be implemented, and automatic obtaining of the website resources of different language types cannot be performed based on the automatically identified language types. To resolve this problem, this embodiment of this application may alternatively be applied in combination with the language determining manner 1 or 2. In this case, the language configuration information of the network resource may be preferentially obtained by using this embodiment of this application. If the obtaining fails, the language type supported by the to-be-converted website is determined by using the language determining manner 1 or 2, and network resources corresponding to different language types are obtained.

In an optional embodiment of this application, after obtaining the second parameter information in S105, the quick application server may theoretically start an operation of generating the quick application. However, in actual application, it is found that the second parameter information obtained by the quick application server may have a specific error, or may have a specific deviation from a development requirement of the developer. To meet the development requirement of the developer as much as possible and improve development efficiency, in this embodiment of this application, after generating the second parameter information, the quick application server further sends some or all of the second parameter information to the portal terminal, and the portal terminal sends, through the portal website, the second parameter information to the first developer terminal for display. The developer may choose, based on an actual development requirement of the developer, whether to modify the second parameter information, and if necessary, modify the second parameter information on the first developer terminal by using the portal website based on the development requirement. In this case, the first developer terminal modifies the second parameter information based on the information modification operation of the developer, to obtain modified second parameter information. Then, the first developer terminal is used to send the modified second parameter information to the quick application server through the portal website. In this embodiment of this application, if the second parameter information is modified by the developer, the modified second parameter information is used by the quick application server in subsequent steps such as S106.

For example, as shown in the upload interface shown in FIG. 2C, in the embodiment to which FIG. 2C belongs, the second parameter information may include an icon of the quick application. In the embodiment to which FIG. 2C belongs, after obtaining the icon, the quick application server sends the icon to the portal terminal, and the portal terminal displays the icon in the upload interface of the portal website shown in FIG. 2C. If the icon meets a development requirement of the developer, the developer does not need to modify the icon. If the icon does not meet the development requirement of the developer, the developer may upload a corresponding icon to the portal terminal through the first developer terminal, and the portal terminal forwards the icon to the quick application server for use.

S106: The quick application server determines target attribute information of the quick application from the first parameter information and the second parameter information, and sends the target attribute information to a quick application template server.

In this embodiment of this application, the attribute information is classified into two types:
1. Attribute information related to a quick application function, for example, the menu configuration information, the landscape/portrait mode configuration information, the multi-window configuration information, the language configuration information, and the web page type of the to-be-converted website.
2. Attribute information unrelated to a quick application function, for example, the application name of the quick application, the description, the application package name, the icon, the signature of the quick application, and the public key certificate of the quick application.

It can be learned from the description in Phase 1: the template preparation phase that a quick application template is essentially quick applications with different function configurations. To meet a requirement of the developer for a quick application, quick application template matching needs to be performed based on a quick application function. Therefore, in this embodiment of this application, the attribute information related to the quick application function is information that affects quick application template matching. Based on this, after obtaining the first parameter information and the second parameter information that include the attribute information of the quick application, the quick application server first extracts the attribute information related to the quick application function (also referred to as target attribute information in this embodiment of this application) that is included in the first parameter information and the second parameter information. Then, the target attribute information is sent to the quick application template server, and the quick application template server performs quick application template matching. In an embodiment of this application, to accurately extract the target attribute information, in this embodiment of this application, the developer may separately perform enumeration and list storage on the two types of attribute information in advance. In application, the quick application server determines the target attribute information one by one from the first parameter information and the second parameter information based on the stored two attribute information lists.

In addition, in an embodiment of this application, in actual application, the first parameter information and the second parameter information may include same target attribute information. For the target attribute information included in both the first parameter information and the second parameter information, there are two possible cases:

1. Information content of the same target attribute information is the same.
2. Information content of the same target attribute information is different.

For example, it is assumed that the developer provides multi-window configuration information in the first parameter information, and the second parameter information extracted based on the website resource also includes multi-window configuration information. The multi-window configuration information in the first parameter information is "opening a new window in the quick application". In this case, if the multi-window configuration information in the second parameter information is also "opening a new window in the quick application", it indicates that information content of the multi-window configuration information is the same. However, if the multi-window configuration information in the second parameter information is not "opening a new window in the quick application", for example, may be "opening a new window directly in the original window" or "jumping to a browser to open a new window", or no valid information content is extracted, and the information content is empty, it indicates that information content of the multi-window configuration information is different.

For same target attribute information with same information content, no matter whether the information content in the first parameter information or the information content in the second parameter information is used to perform quick application template matching, matching results are the same theoretically. Therefore, in this case, the information content of the target attribute information in the first parameter information or the second parameter information may be obtained.

For same target attribute information whose information content is different, quick application template matching is performed by using the information content in the first parameter information, and quick application template matching is performed by using the information content in the second parameter information, which may cause different matching results. Therefore, when the target attribute information is being determined, a specific information content selection method needs to be determined. In this embodiment of this application, to meet an actual requirement of the developer as much as possible, for a case in which information content of same target attribute information in the first parameter information is different from that in the second parameter information, the information content of the target attribute information in the first parameter information configured by the developer may be preferentially selected. For example, when multi-window configuration information exists in both the first parameter information and the second parameter information, information content of the multi-window configuration information in the first parameter information is used as information content of the multi-window configuration information sent to the quick application template server. However, in some other optional embodiments, the information content of the target attribute information in the second parameter information may alternatively be preferentially selected.

S107: The quick application template server performs quick application template matching based on the received target attribute information, to determine a target template and metadata information of the target template, and send the target template and the metadata information to the quick application server.

After receiving the target attribute information, the quick application template server performs matching based on the target attribute information and a function configuration status (recorded in corresponding metadata information) of a quick application template, selects a quick application template that meets a configuration requirement of the target attribute information (in this embodiment of this application, the matched quick application template is referred to as the target template), and returns the target template and the corresponding metadata information to the quick application server.

An example is used for description. It is assumed that the target attribute information includes: the menu configuration information, the landscape/portrait mode configuration information, the multi-window configuration information, the language configuration information, and the web page type of the to-be-converted website. The corresponding information content is as follows: including a movable menu, adaptive display in landscape/portrait mode, opening a new window in the quick application, supporting both Chinese and English, and a game web page. In this case, the quick application template server performs screening based on a function configuration of each quick application template, and obtains a matched template: including a movable menu, adaptive display in landscape/portrait mode, supporting a new window opening manner of opening a new window in the quick application, supporting both Chinese and English, and supporting a game web page, so as to complete target template matching.

In an optional embodiment of this application, the following case may occur in actual application: a quick application template that supports all target attribute information configuration requirements cannot be obtained through matching. However, in actual application, there is a need to help the developer generate a quick application to meet a development requirement. To cope with this case, in this embodiment of this application, when matching is performed on each quick application template, a degree of matching with each quick application template is calculated, and a quick application template with a highest degree of matching is used as the target template. In this case, even if there is no quick application template that supports all the target attribute information configuration requirements, there is still a target template that relatively comprehensively supports the target attribute information configuration requirements. A specific method for calculating a quick application template matching degree is not limited in this embodiment of this application, and may be set by the skilled person based on an actual requirement. For example, in some optional embodiments, a matching score may be preset for each function that can be matched in the quick application template. During matching, for a single quick application template, a function that supports the target attribute information configuration requirement scores, and a function that does not support the target attribute information configuration requirement does not score. Finally, scores are summed up to obtain a matching degree score of the single quick application template.

S108: The quick application server receives the target template and the metadata information, and performs parameter setting on the target template based on the metadata information, the first parameter information, and the second parameter information, to obtain the target quick application.

After receiving the target template and the corresponding metadata information, the quick application server first determines the parameter configuration of the target template based on the metadata information. On this basis, in one aspect, the quick application server compares the parameter configuration of the target template with the target attribute information, determines each quick application function that requires parameter setting in the target template, and performs parameter setting on the quick application function based on the target attribute information, so that the target template can meet the function requirement that is set by the developer.

For example, the configuration supported by the target template may be higher than an actually required configuration. In this case, the target template needs to be configured based on the metadata information. For example, it is assumed that it is learned, based on the metadata information, that the target template supports all three new window opening manners: opening a new window in the original window, opening a new window in the quick application, and jumping to the browser to open a new window. However, in the target attribute information, the quick application is required to open a new window in the quick application. In this case, the new window opening manner in the target template needs to be set to: opening a new window in the quick application. For another example, it is assumed that it is learned, based on the metadata information, that the target template supports four languages: Chinese, English, Japanese, and German. However, in the target attribute information, the quick application is required to support both Chinese and English. In this case, the languages supported by the target template need to be set to: Chinese and English. In this embodiment of this application, a function parameter of the target template may be set, so that the function configuration of the target template can meet a requirement of the developer.

In another aspect, for attribute information (which may also be referred to as non-target attribute information) that is not related to the quick application function and that is included in the first parameter information and the second parameter information, for example, the application name of the quick application, the description, the application package name, the icon, the signature of the quick application, and the public key certificate of the quick application, parameter setting is performed for the target template, and related parameters of the target template are set to information content of the non-target attribute information. For example, when the non-target attribute information includes an application name, the application name is set to an application name of the target template. When the non-target attribute information includes a description of the quick application, the description may be set as a description file of the target template. In this case, in this embodiment of this application, a non-functional parameter of the target template may be set, so that some non-functional attribute information of the target template can meet a requirement of the developer. For a case in which the first parameter information and the second parameter information may repeatedly include same non-target attribute information, refer to the processing manner for the target attribute information. Information content of the non-target attribute information in the first parameter information that is configured by the developer is preferentially selected for processing. This is not excessively limited herein. For example, when both the first parameter information and the second parameter information include application names, the application name in the first parameter information is preferentially used, and is set to the application name of the target template.

After setting the function parameters and the non-function parameters, the quick application server can obtain the specified target template (that is, the generated quick application, also known as the target quick application).

In an optional embodiment of this application, in actual application, the target quick application may need to access the to-be-converted website in a running process. For example, it may be necessary to access some real-time data of the to-be-converted website for display. To enable the target quick application to smoothly access the to-be-converted website, in this embodiment of this application, the quick application server may further write the website address of the to-be-converted website into a network component of the target template. Therefore, the generated target quick application can access the to-be-converted website by using the website address in the network component.

In another optional embodiment of this application, in actual application, parameter information included in the first parameter information and the second parameter information is limited, and sometimes may be difficult to meet a requirement of actual quick application parameters. For example, in some embodiments, it is assumed that a standard quick application needs to include a public-private key pair, a public key certificate, and a signature of the quick application. However, the developer is not required to provide these parameters in the upload interface, or the developer does not provide these parameters in the upload interface even if it is required in the upload interface. As a result, neither the final first parameter information nor the final second parameter information includes the public-private key pair, the public key certificate, and the signature of the quick application. In this case, if parameter setting is directly performed based on only the information content in the first parameter information and the second parameter information, it may be difficult to meet a requirement for generating the target quick application. To resolve this problem, in this embodiment of this application, for some parameters that may not exist in the first parameter information and the second parameter information, but are required for quick application generation, the skilled person may preset corresponding parameter generation methods or default parameter content. When setting parameters for the target template, the parameters are set based on the parameter generation rules or the specified default parameters. For example, in some optional embodiments, the skilled person may preset generation methods for the public-private key pair, the public key certificate, and the signature of the quick application (for example, corresponding key and certificate generation tools and a signature generation tool may be set). In actual application, if the first parameter information and the second parameter information do not include the public-private key pair, the public-key certificate, and the signature of the quick application, the corresponding public-private key pair, the public-key certificate, and the signature are generated by using the generation method.

In addition, it should be noted that after the parameter setting of the target template is completed, the obtained target quick application is still an uncompressed quick application. In this case, the target quick application cannot run normally in the mobile terminal. Therefore, to enable the target quick application to run in the mobile terminal, after completing the parameter setting, the quick application server further packs the target quick application, so as to obtain a target quick application file in a standard RPK format. A specific quick application packaging method is not excessively limited in this embodiment of this application, and may be set by the skilled person. For example, a JS engine and a quick application packaging tool can be used to implement quick application packaging.

It should be understood that, when the quick application server and the quick application template server are a same server, operations of S106, S107, and S108 are all completed on the same server. In this case, there may be no data sending and receiving operations, but data transmission interaction within the server.

S109: The quick application server sends the target quick application to the portal terminal.

S110: The portal terminal provides a download address of the target quick application to the first developer terminal through the portal website.

After the target quick application is obtained, the quick application has been generated theoretically. In this case, the quick application server needs to feed back the target quick application to the developer for the developer to use. Therefore, the quick application server sends the target quick application to the portal terminal, and then the portal terminal provides a network download address of the target quick application for the developer by using the portal website. A form of the download address is not excessively limited in this embodiment of this application, and may be set by the skilled person. For example, the download address may be a file download link (that is, a Uniform Resource Locator, URL), a magnet link (Magnet URI scheme), or a file download two-dimensional code. In this case, the developer can use these download addresses to download the target quick application. For another example, to facilitate an operation of the user on the mobile terminal, the download address may be set to a two-dimensional code, and the two-dimensional code records a URL of the target quick application. The developer can scan the two-dimensional code to obtain the URL of the quick application. In addition, a required download tool may be freely selected to download the target quick application through the URL.

In addition, in an optional embodiment of this application, it is considered that in actual application, generation of a quick application may take a specific time, and a length of the time period is difficult to predict. The developer may do other things while waiting for quick application generation. Therefore, in actual application, after the quick application is generated, the developer may not know the situation, which is not conducive to effective development of the developer. To facilitate the developer, in this embodiment of this application, after generating the download address, the portal terminal pushes prompt information to the developer, to inform the developer that the current target quick application has been generated. A specific prompt information pushing method is not excessively limited in this embodiment of this application, and may be set by the skilled person. For example, the prompt information may be set to a prompt voice, and the prompt voice is automatically played through the portal website. For another example, a function of filling in contact information may alternatively be provided for the developer in the upload interface, and the developer may fill in the contact information such as a phone number or an email address. After generating the download address, the portal terminal may push the prompt information by using the contact information.

S111: The second developer terminal downloads the target quick application from the portal terminal by using the download address in the portal website.

After the portal website displays the download address by using the first developer terminal, the developer may download, by using a terminal device (that is, the second developer terminal) that can run the quick application, the target quick application file in the RPK format by using the download address. Then, a platform that has a capability of running a quick application, such as a quick application loader, a quick application engine, or a quick application center, in the second developer terminal, is used to run the target quick application. At this point, the developer can see and use the real generated quick application. In this case, the developer realizes the preliminary development of the quick application.

In an optional embodiment of this application, Sin may be replaced with:

The first developer terminal downloads the target quick application by using the download address in the portal website, and then sends the downloaded target quick application to the second developer terminal.

In this embodiment of this application, the second developer terminal may not actively download the target quick application. This is applicable to some scenarios in which the second developer terminal is inconvenient to perform quick application download, for example, a scenario in which the download address is a two-dimensional code, but the second developer terminal cannot perform two-dimensional code scanning. Therefore, compatibility with application scenarios can be improved, facilitating development performed by the developer.

After downloading the target quick application by using the second developer terminal, the developer may use and test the target quick application based on a requirement of the developer, to determine whether the development requirement of the developer is met. If the development requirement is met, the development of the quick application is successful, and the developer obtains the required target quick application.

S112: If the target quick application does not meet the requirement of the developer, the developer may modify the first parameter information and/or the website address of the to-be-converted website in the first developer terminal by using the portal website, and resubmit the modified first parameter information and/or website address of the to-be-converted website to the portal terminal. In this case, the operations of S102 to S110 are re-executed, and a new target quick application is generated.

If it is found that the target quick application does not meet the requirement of the developer after using and testing the quick application, it indicates that the quick application development is not successful. Theoretically, the developer needs to re-develop a quick application. To improve the efficiency of quick application development, reduce the time and energy of quick application re-development, in this embodiment of this application, in a quick application development process, the portal website stores the first parameter information and the website address that are newly entered by the developer. In addition to providing the download address, the portal website also provides the developer with a function of modifying the latest input first parameter information and website address. When the developer needs to re-develop a quick application, the developer performs an information modification operation on the first parameter information and the website address in the portal website based on a requirement of the developer, and re-submits the first parameter information and the website address to the portal terminal. In this case, the first developer terminal responds to the information modification operation, that is, modifies the first parameter information based on the information modification operation, to obtain updated first parameter information. Then, the portal terminal, the quick application server, the quick application template server, and the like re-perform operations from S102 to S111 to regenerate a new target quick application. This allows the developer to regain a target quick application that is closer to the need of the developer.

In this embodiment of this application, theoretically, a process of regenerating the target quick application may be performed for an unlimited quantity of times. That is, theoretically, the developer may continuously adjust the target quick application by continuously modifying the first parameter information and the website address, so that the finally obtained target quick application can meet the development requirement of the developer. Therefore, in this embodiment of this application, reliability of quick application development can be improved, time and energy costs of quick application development can be reduced, and efficiency of quick application development can be improved. In addition, for some developers whose original development requirements are unclear, embodiments of this application have an extremely high fault tolerance rate, and trial and error costs are extremely low. Therefore, a lot of time, energy and economic costs of quick application development can be saved.

An example is used for description. Refer to the embodiment to which FIG. 2C belongs. Based on this embodiment, if the developer does not manually close the upload interface in FIG. 2C, when providing the download address, the portal website continues to display the upload interface on which the first parameter information and the website address have been entered. After downloading and testing the target quick application, if the developer finds that the target quick application does not meet the requirement of the developer, the developer can modify each piece of parameter information and the website address in the upload interface, and upload the modified parameter information and website address to the portal terminal through the portal website. After the new target quick application is generated, the new target quick application is downloaded and tested. If the requirement of the developer is still not met, the developer may continue to modify each piece of parameter information and the website address in the upload interface, and regenerate a target quick application until the finally generated target quick application meets the requirement of the developer.

In this embodiment of this application, some quick application templates are first preset. During actual development, the developer can provide some parameter information of the quick application and the website address of the to-be-converted website to the quick application server as required. After obtaining the parameter information of the quick application and the website address, the quick application server automatically accesses the to-be-converted website based on the website address, and parses a part of parameter information of the quick application from the to-be-converted website. Then, this part of parameter information and the parameter information uploaded by the developer are used for template matching of the quick application, and a proper quick application template is obtained. Finally, parameter setting and packaging are performed on the quick application template automatically by using all the obtained parameter information to obtain an available quick application, and the quick application is fed back to the developer, so as to realize rapid development of the quick application. In addition, in this embodiment of this application, a manner in which the developer modifies the latest parameter information and the website address of the to-be-converted website is further supported, so as to quickly adjust and regenerate the quick application. This embodiment of this application has at least the following advantages:

1. In this embodiment of this application, dependency of a quick application development process on knowledge and skills of a developer is greatly reduced, so that a development threshold is relatively low, and a development difficulty is reduced.

2. Quick application development performed by using the method in this embodiment of this application can greatly shorten a development cycle and improve development efficiency. Practice proves that, in this embodiment of this application, a development cycle that is originally one month to three months can be shortened to several days or even several hours, which enables the developer to achieve quick application development in a very short time. In addition, the mechanism for adjusting and regenerating the target quick application based on modification of the parameter information and the website address enables this embodiment of this application to have an extremely high fault tolerance rate, and trial and error costs are extremely low. Therefore, in this embodiment of this application, time, energy, and economic costs of quick application development of the developer can be greatly reduced. A quick application that meets the requirement of the developer can be obtained in a short time.

3. In this application, a main process step of generating the quick application is basically completed on the servers in the cloud. Theoretically, the developer needs only one device that can access the Internet. The developer is virtually unrestricted by a time and place of quick application development. Therefore, this embodiment of this application is more compatible with a quick application development environment, and can be adapted to a plurality of different development environments. Therefore, convenience is extremely high.

After the quick application is developed to obtain the target quick application, in this embodiment of this application, the target quick application may be further released and maintained. Correspondingly, after Phase 2: the quick application development phase, there are two phases: quick application release and quick application maintenance. The description is as follows:

Phase 3: Quick application release phase.

Figure 3:
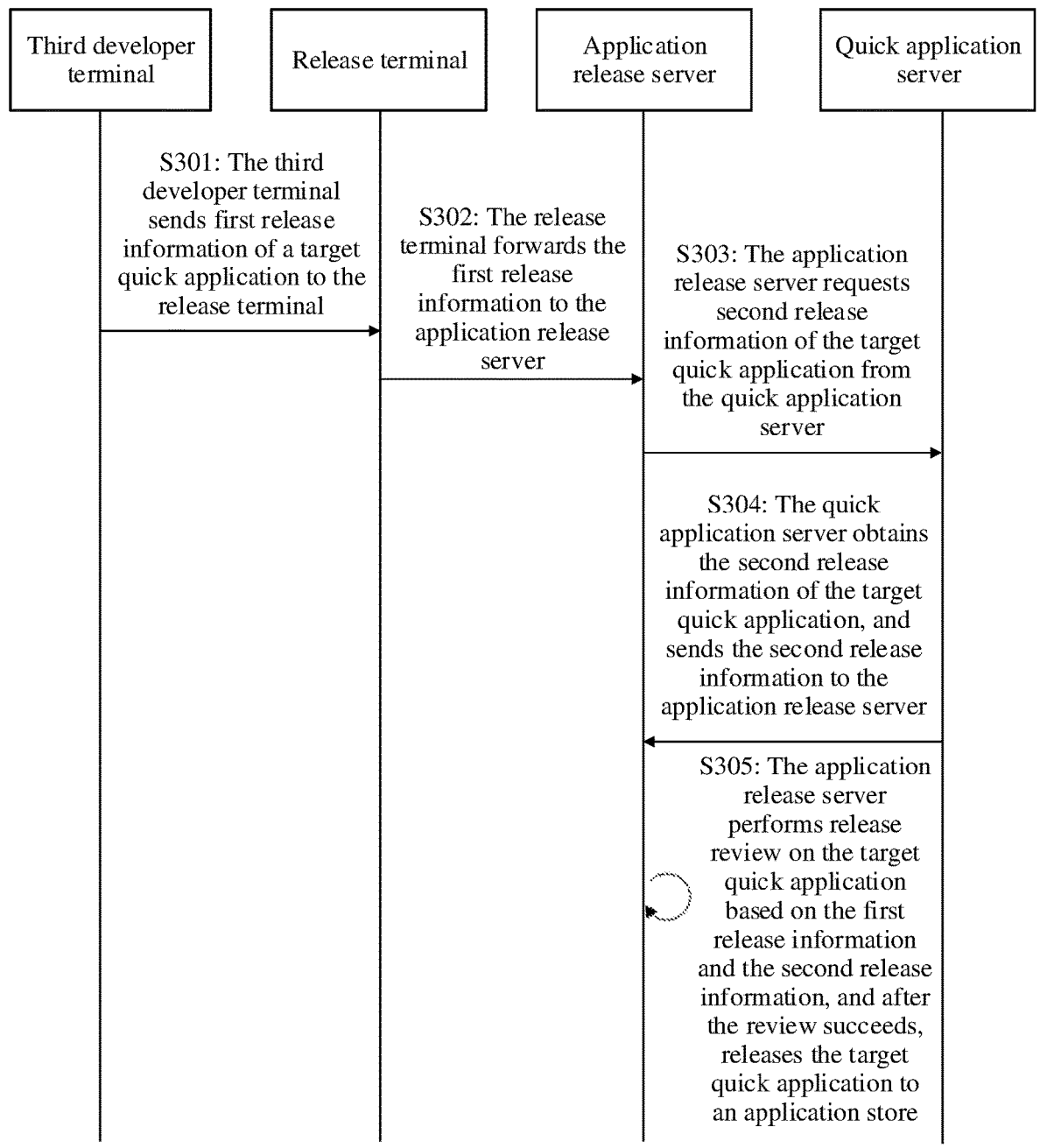
FIG. 3 is a schematic flowchart of a quick application release phase in a quick application generation method according to an embodiment of this application.

FIG. 3 is a flowchart of implementation of a quick application release phase. To simplify the quick application release process, shorten a release cycle, and improve release efficiency, that the release portal is a release website is used as an example. The description is as follows:

S301: A developer accesses a release website by using a third developer terminal, and sends first release information of a target quick application to a release terminal through the release website.

S302: The release terminal forwards the first release information to an application release server.

In this embodiment of this application, the release information is information required for releasing the quick application to a manufacturer's application store. Specific information included in the release information varies based on different release requirements of different manufacturers, and is specifically determined based on an actual requirement of a manufacturer to which the quick application is to be released. For example, in some optional embodiments, the release information may include: an application name of the quick application, an application screenshot, language configuration information, a description, an icon, developer information, authorization comments, and the like.

In addition, in an optional embodiment of this application, based on an actual requirement, when uploading the first release information, the developer may further upload some information other than the release information. For example, in some optional embodiments, it is assumed that the developer expects the quick application generated this time to share data with another quick application. In this case, while providing the first release information, the developer may choose to provide data of an associated quick application of the quick application generated this time, for example, an application name of the associated quick application, an application package name of the associated quick application, or other data that can be used to determine the associated quick application.

It can be learned from the description in Phase 2: the quick application development phase that, in the quick application development phase, the quick application server may obtain a large amount of quick application parameter information (including first parameter information and second parameter information). These parameter information includes a part of information required for quick application release, for example, an application name, language configuration information, and an icon of the quick application. To reduce a workload of the developer in a release process, in this embodiment of this application, after generating the target quick application, the quick application server stores parameter information corresponding to the target quick application. In addition, when the quick application is to be released, a part of the release information (that is, second release information) is provided for quick application release based on the stored parameter information. Release information that the quick application server cannot provide (that is, release information other than the second release information, also referred to as the first release information) is provided by the developer. On this basis, the skilled person presets an upload interface of the first release information in the release website. After using a quick application release function, the developer may enter the first release information in the upload interface and upload the first release information, for example, fill in the developer information and provide the authorization comments and the like. For a manner of uploading the first release information, refer to the description of the manner of uploading the first parameter information in S101. Details are not described herein.

It should be noted that specific information included in the second release information may be set by the skilled person. Because the quick application server stores the parameter information of the quick application, the second release information may include attribute information required for releasing the quick application. For example, the application name, the language configuration information, and the icon of the quick application may be included. Specific information included in the first release information may be set by the skilled person based on an actual release requirement of a manufacturer and the second release information that can be provided in the quick application server. This is not excessively limited herein.

S303: The application release server requests the second release information of the target quick application from the quick application server.

After receiving the first release information, the application release server requests the second release information of the target quick application from the quick application server. In this case, a unique identifier (for example, the package name of the quick application) of the target quick application may be sent to the quick application server, so as to help the quick application determine the target quick application.

S304: After receiving the request of the application release server, the quick application server obtains the second release information of the target quick application, and sends the second release information to the application release server.

After receiving the request of the application release server, the quick application server extracts release information from the parameter information of the target quick application, to obtain the required second release information. If a part of the second release information cannot be directly extracted from the parameter information, the skilled person may preset a corresponding information obtaining method, so as to obtain the corresponding second release information. For example, it is assumed that the second release information includes an application screenshot of the quick application. The quick application server may take a screenshot of an interface of the target quick application. A specific screenshot rule may be set by the skilled person, and is not limited herein. For example, one image may be captured from each layer-level interface starting from a home screen of the quick application, until a preset quantity of images are captured. After obtaining the second release information, the quick application server sends the second release information to the application release server.

In an embodiment of this application, when receiving the first release information, the application release server further receives other information. In this case, the application release server may send the information together with the request to the quick application server. Correspondingly, when receiving the information, the quick application server stores the information locally.

For example, in some optional embodiments, it is assumed that when uploading the first release information, the developer uploads related data of an associated quick application that can share data with the target quick application. In this case, when receiving the related data of the associated quick application, the application release server sends the related data to the quick application server. The quick application server stores the related data locally.

S305: The application release server performs release review on the target quick application based on the first release information and the second release information, and after the review succeeds, releases the target quick application to an application store.

After receiving the second release information, the application release server reviews the first release information and the second release information, and determines whether the current target quick application meets a release condition. A specific review rule needs to be set by the skilled person based on a release requirement of the manufacturer, and is not limited herein. Alternatively, in an optional embodiment of this application, a review process may also be that the application release server sends a part of the release information to a specified terminal. The manufacturer's reviewer uses the terminal to review the part of the release information and returns a review comment. Then, the application release server determines whether the target quick application is approved based on a review result of the application release server and the review comment returned by the reviewer. Finally, after the application is approved, the application release server releases the target quick application to the application store of the manufacturer.

Because a target quick application file needs to be used for releasing, and the target quick application file may also need to be scanned in the review process, the application release server needs to obtain the target quick application file in a PRK format before S305. This embodiment of this application provides two optional methods for obtaining the target quick application. Descriptions are as follows:

Because the quick application server already has the target quick application file in the PRK format in the quick application development phase, in this embodiment of this application, the developer may be required to upload the target quick application file or the developer may not be required to upload the target quick application file.

If the developer is required to upload the target quick application file, in S301, the developer needs to upload the target quick application file and the first release information to the release terminal. Correspondingly, in S302, the release terminal forwards the target quick application file and the first release information to the application release server together.

If the developer is not required to upload the target quick application file, the application release server requests the target quick application file from the quick application server in S303. Correspondingly, in S304, the quick application server sends the target quick application file and the second release information to the application release server.

In addition, in an optional embodiment of this application, in actual application, the second release information may not completely meet the release requirement of the manufacturer, or meet a requirement of the developer. For example, an application screenshot needs to be displayed in the application store after the quick application is released. The application screenshot automatically captured by the quick application server may not meet a display requirement of the manufacturer or the developer. If the second release information generated by the quick application server is directly used in the review, the review may fail, or the requirement of the skilled person cannot be met after the review is approved and the quick application is released. This requires the skilled person to perform releasing again. As a result, the entire release process becomes cumbersome and inefficient.

To resolve the problem that the second release information may not meet the requirement of the developer or the manufacturer for releasing, and simplify the quick application release process to improve release efficiency, in this embodiment of this application, after obtaining the second release information, the quick application server or the application release server may feed back the second release information to the release terminal. The release terminal displays the second release information to the developer through the release website. The developer may determine whether to modify the second release information based on the manufacturer's release requirement and the requirement of the developer. If necessary, the second release information is modified on the release website and then submitted. When receiving the modified second release information, the quick application server or the application release server performs the operation of S304 or S305 based on the modified second release information.

In addition, it should be noted that, in this embodiment of this application, an example in which the release portal is a release website is merely used for description. In actual application, the release portal may alternatively be a portal of a type other than a website, for example, may be a quick application, a mobile application program, or computer software. This may be specifically determined based on an actual application scenario.

Figure 4:
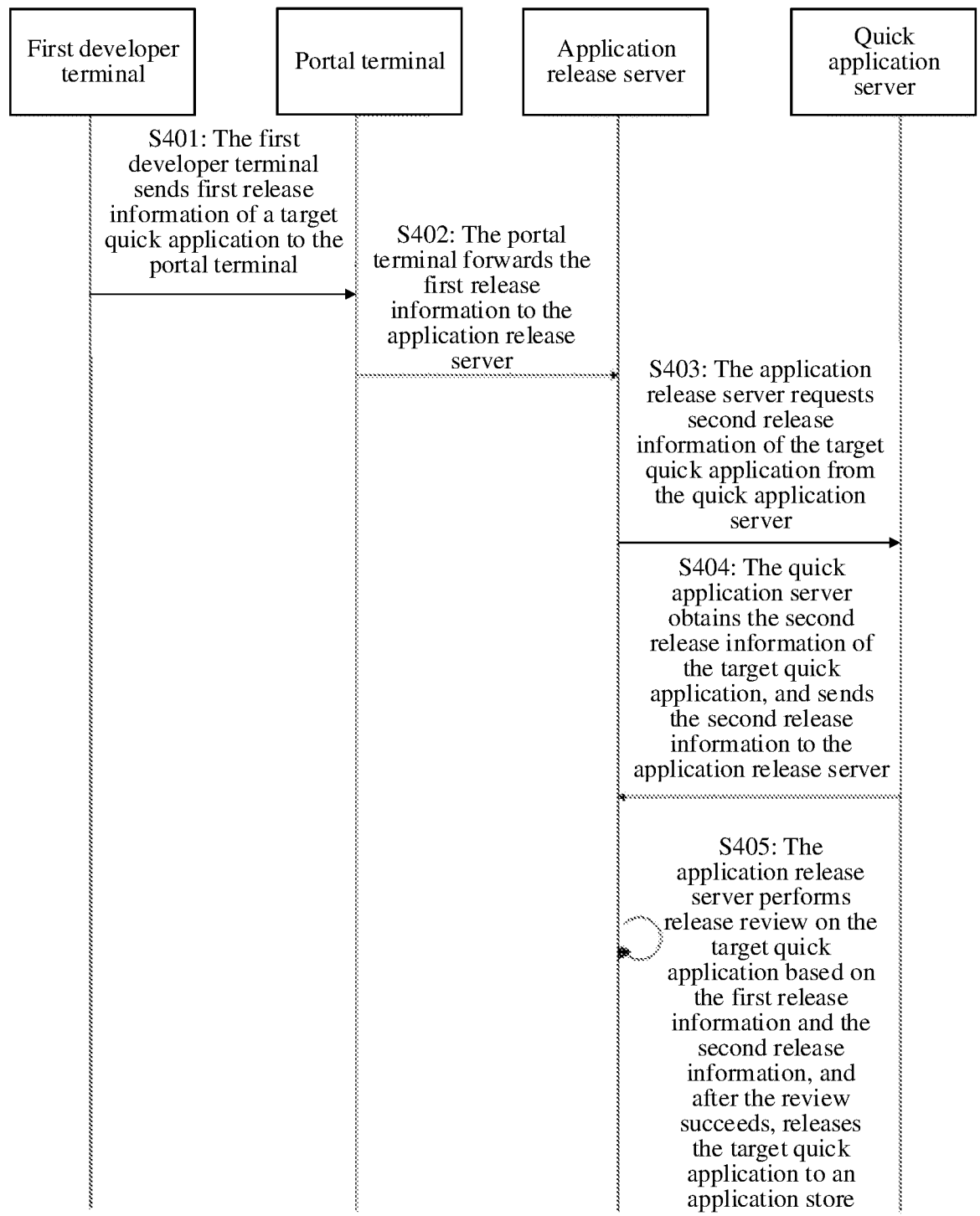
FIG. 4 is a schematic flowchart of a quick application release phase in a quick application generation method according to an embodiment of this application.

In a special case of the embodiment shown in FIG. 3, in this embodiment of this application, a portal used during quick application development and a portal used during release are a same portal, the portal terminal and the release terminal are a same terminal device, and the first developer terminal and the third developer terminal are a same terminal device. As shown in FIG. 4, in an embodiment of this application, the embodiment shown in FIG. 3 may be replaced with:

S401: A developer accesses a portal website of a portal terminal by using a first developer terminal, and sends first release information of a target quick application to the portal terminal through the portal website.

S402: The portal terminal forwards the first release information to an application release server.

For descriptions of S401 and S402, refer to descriptions of S301 and S302. Details are not described herein again. It should be noted that in actual application, if the portal website integrates a quick application generation function and a quick application release function into a composite function, the operation of S401 and S101 may be performed synchronously. That is, the developer may simultaneously enter the first parameter information of the quick application, the website address of the to-be-converted website, and the first release information in the upload interface. On this basis, the portal terminal forwards the received information separately. For example, as shown in the upload interface shown in FIG. 2C, in the embodiment to which FIG. 2C belongs, the developer may simultaneously enter the first parameter information, the website address of the to-be-converted website, and the first release information (for example, related materials such as developer information and authorization comments) on the upload interface shown in FIG. 2C. The entered data can be uploaded to the portal terminal together.

S403: The application release server requests the second release information of the target quick application from a quick application server.

S404: After receiving the request of the application release server, the quick application server obtains the second release information of the target quick application, and sends the second release information to the application release server.

S405: The application release server performs release review on the target quick application based on the first release information and the second release information, and after the review succeeds, releases the target quick application to an application store.

For descriptions of S403 to S405, refer to descriptions of S303 to S305. Details are not described herein again.

In an optional embodiment of this application, to resolve a problem that the second release information may not meet a requirement of the developer or a manufacturer for releasing, and simplify the quick application release process to improve release efficiency, it may be set that the quick application server sends the second release information to the portal terminal after obtaining the second release information in S404. The portal terminal displays the second release information in the upload interface of the portal website. The developer may view the second release information by using the first developer terminal. In addition, the second release information may be modified and uploaded to the portal terminal as required. If the portal terminal receives modified second release information, the portal terminal forwards the modified second release information to the quick application server. If the quick application server receives the modified second release information, in S404, the quick application server sends the modified second release information to the application release server. In this case, the application release server performs release review on the target quick application based on the first release information and the modified second release information.

For example, as shown in the upload interface shown in FIG. 2C, in the embodiment to which FIG. 2C belongs, the details page (that is, an application screenshot) belongs to the second release information. The application screenshot is automatically generated by the quick application server and sent to the portal terminal, and displayed in the upload interface of the portal website. On this basis, if the application screenshot meets a requirement of the developer, the application screenshot may be directly used without modification. If the requirement of the developer is not met, the developer may delete the application screenshot automatically generated by the quick application server from the upload interface shown in FIG. 2C, and may choose to upload an application screenshot.

In the embodiments shown in FIG. 3 and FIG. 4, the quick application server automatically provides a part of release information required for release of the quick application. Compared with a method that all release information needs to be manually provided by a developer, the embodiments in this application have the following advantages:

1. In actual application, a lot of information needs to be filled in for release. According to the embodiments shown in FIG. 3 and FIG. 4, information that needs to be entered when the developer releases the quick application can be greatly reduced, thereby reducing a workload of releasing the quick application. In this way, the whole process of quick application release is simpler and more efficient, and the period is shorter.
2. If a manufacturer that provides a quick application generation function and a manufacturer that provides a quick application release function are a same manufacturer, or the manufacturer that provides the quick application generation function and the manufacturer that provides the quick application release function authorize each other, according to the embodiments shown in FIG. 3 and FIG. 4, the second release information automatically provided by the quick application server is highly reliable. In actual application, this part of release information does not need to be reviewed. Therefore, the release review process can be reduced, thereby shortening a release cycle of the quick application.

In addition, in the embodiment shown in FIG. 4, the quick application development operation and the quick application release operation are integrated, so that the developer can develop and release the quick application at a time, which greatly shortens the period from developing the quick application to releasing the quick application.

Phase 4: Quick application maintenance phase.

After the target quick application is released, in this embodiment of this application, the target quick application may be continuously maintained. In this embodiment of this application, after generating the target quick application, the quick application server stores parameter information (including the first parameter information and the second parameter information) correspondingly used by the target quick application. On this basis, the quick application server periodically requests a website resource from the to-be-converted website, analyzes the website resource, and determines whether the to-be-converted website is updated, for example, whether the supported languages, the icon, and the website description are changed. A specific periodicity of the periodic request is not limited in this embodiment of this application, and may be set by the skilled person. For example, in some embodiments, the periodicity may be set to once a week or once a month. In addition, a method for determining whether the to-be-converted website is updated is not limited herein. For example, it may be determined that the to-be-converted website is updated as long as the website information changes, or it may be determined that the to-be-converted website is updated only when specific website information changes. Specific information content included in the specific website information is set by the skilled person, and is not limited herein. For example, in some optional embodiments, the specific website information may include: a website structure, a website main title, a DOM tree structure, a website interface layout, and the like. In addition, in still another optional embodiment of this application, for the target quick application, the second parameter information obtained based on the website resource of the to-be-converted website has a direct and relatively large impact on the target quick application. Therefore, it may alternatively be determined whether the to-be-converted website changes by determining whether the second parameter information obtained based on the website resource of the to-be-converted website changes.

If the to-be-converted website is updated, it may be determined that the target quick application needs to be updated. In this case, the operations of S105 to S108 may be performed based on the latest website resource (if the second parameter information has been obtained through parsing when the website resource is analyzed, the operations of S106 to S108 may be performed), to update the target quick application. Then, the updated target quick application is pushed to the developer, or the updated target quick application is directly automatically released. Alternatively, the target quick application may not be automatically updated after the to-be-converted website is updated, but prompt information is pushed to the developer, to inform the developer that the current target quick application can be updated. It is up to the developer to decide whether to update the target quick application. A manner of pushing the updated target quick application or the prompt information to the developer is not excessively limited herein, and may be set by the skilled person. For example, the developer may preset a corresponding push means, and then push is performed based on the preset push means. For example, the updated target quick application or the prompt information may be pushed by using an email address or a social tool as a push means.

Figure 5:
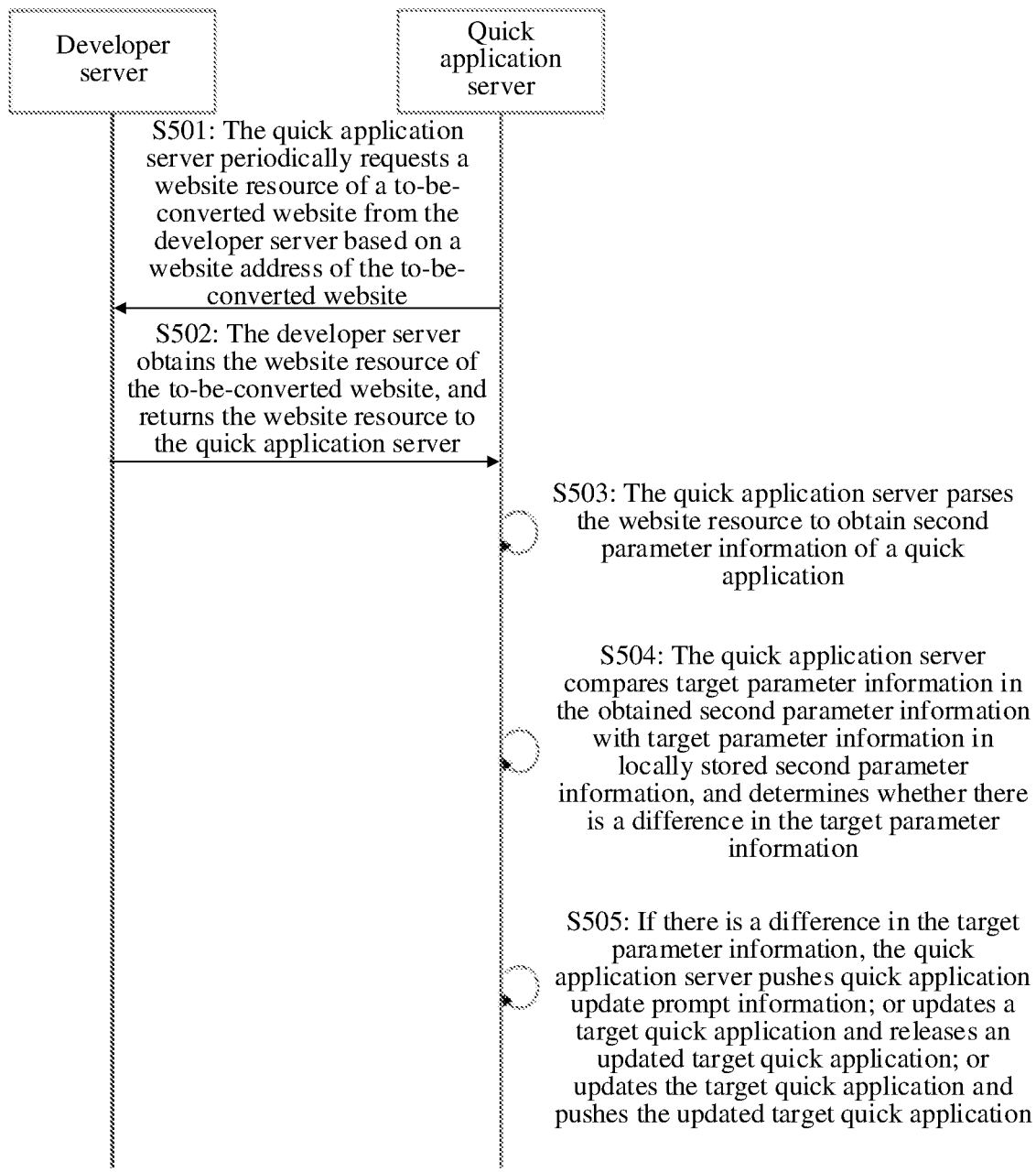
FIG. 5 is a schematic flowchart of a quick application maintenance phase in a quick application generation method according to an embodiment of this application.

In an optional specific implementation of quick application maintenance in this application, FIG. 5 is a schematic diagram of a maintenance procedure according to an embodiment of this application. Details are as follows:

S501: A quick application server periodically requests a website resource of a to-be-converted website from a developer server based on a website address of the to-be-converted website.

S502: After receiving the request of the quick application server, the developer server obtains the website resource of the to-be-converted website, and returns the website resource to the quick application server.

S503: After receiving the website resource of the to-be-converted website, the quick application server parses the website resource to obtain second parameter information of the quick application.

Operations of S501 to S503 are the same as basic operations of S103 to S105. For details, refer to related descriptions of S103 to S105. Details are not described herein again. The website resource of the to-be-converted website is periodically requested by the quick application server in S501. Therefore, operations in S501 to S505 are periodically performed. A specific periodicity value may be set by a skilled person based on an actual requirement, and is not limited herein. For example, the periodicity may be set to once a week or once a month.

S504: The quick application server compares target parameter information in the obtained second parameter information with target parameter information in locally stored second parameter information, and determines whether there is a difference in the target parameter information.

In this embodiment of this application, attention is not paid to all quick application parameter information, but only paid to a part of the parameter information (that is, the target parameter). Specific information included in the target parameter information is not limited herein, and may be set by the skilled person based on an actual requirement. For example, in some optional embodiments, the target parameter information may be set to include: language configuration information, an icon, and a description of the quick application. In this case, only language configuration information, an icon, and a description in the obtained second parameter information are compared with language configuration information, an icon, and a description in the locally stored second parameter information. Other parameter information in the two pieces of second parameter information is ignored.

S505: If there is a difference in the target parameter information, determine that the target quick application needs to be updated. In this case, the quick application server may generate quick application update prompt information, and push the quick application update prompt information by using a preset push means. Alternatively, the quick application server updates the target quick application based on the obtained second parameter information, and releases an updated target quick application. Alternatively, the quick application server updates the target quick application based on the obtained second parameter information, and pushes the updated target quick application by using a preset push means.

When the target parameter information is different, it indicates that the to-be-converted website changes. In this case, theoretically, the target quick application needs to be updated. Therefore, this embodiment of this application provides three optional processing manners, which are as follows: prompting, by using the quick application update prompt information, that the target quick application needs to be updated; automatically updating the target quick application and releasing the updated target quick application; and automatically updating the target quick application and sending the updated target quick application to the developer. Specifically, the skilled person or the developer may set a required processing manner based on an actual requirement. In the method for automatically updating the target quick application, essentially, the operations of S106 to S108 are performed by using the second parameter information obtained this time and the first parameter information locally stored in the quick application server. Therefore, for details, refer to related descriptions of S106 to S108. Details are not described herein again. During automatic release, the quick application server may use the release information obtained in Phase 3: the quick application release phase, to perform release. In addition, when the quick application update prompt information or the updated target quick application is sent to the developer, target parameter information in which a difference exists may also be sent to the developer. This helps the developer understand a real-time situation of the to-be-converted website and determine whether the target quick application needs to be updated.

In an optional embodiment of this application, the target quick application is automatically updated and released. In an actual situation, the target parameter information in the obtained second parameter information may conflict with the target parameter information in the locally stored second parameter information. For example, it is assumed that the target parameter information includes language configuration information, and the language configuration information in the obtained second parameter information is: supporting Chinese and English, and the language configuration information in the locally stored second parameter information is: supporting Chinese and German. In this case, German that is originally supported is not supported.

For a case in which the target parameter information conflicts, in a processing manner, the target quick application may be directly updated based on latest target parameter information. However, such a direct update may cause an updated target quick application to deviate from an original development expectation of the developer, and controllability of the updated target quick application is poor for the developer, so that the updated target quick application may not meet an actual development requirement of the developer. To prevent this case, in this embodiment of this application, even after the target parameter information is different, the target quick application is automatically updated and released. Alternatively, after it is determined that there is a difference in the target parameter information, it is determined whether a conflict of the target parameter information exists in the difference (that is, configuration content originally supported in the locally stored target parameter information is not supported in the obtained target parameter information). If a target parameter information conflict exists in the difference, the target quick application is not automatically updated or released. Instead, the developer is notified through a push means, and the developer determines whether to automatically update and release the target quick application. If there is no target parameter conflict in the difference, the target quick application is automatically updated and released.

In this embodiment of this application, the quick application server periodically and automatically detects whether the to-be-converted website is updated, and notifies the developer in a timely manner when the to-be-converted website is updated, or automatically updates and releases the target quick application in a timely manner. Compared with a conventional method that requires a developer to periodically and manually perform quick application update and maintenance, this embodiment of this application has the following advantages:

1. A change status of the to-be-converted website can be learned at the first time when the to-be-converted website changes without always caring about the status of the to-be-converted website. Therefore, a monitoring operation of the to-be-converted website during maintenance becomes simple and efficient.
2. In actual application, a target quick application needs to be re-developed when a quick application version is updated. In this case, although the workload is less than that of new quick application development, the developer still needs to use traditional development tools to modify and edit code. Therefore, the workload is still heavy and time-consuming. However, in this embodiment of this application, the developer does not need to perform a development operation, and only needs to determine whether the target quick application automatically updated by the quick application server meets the requirement. The developer can save a lot of operations on re-developing a target quick application, and re-developing the target quick application becomes labor-saving. Therefore, the re-development of the target quick application is more efficient and the period is shorter.
3. According to this embodiment of this application, after updating the target quick application, the quick application server may synchronously automatically release the updated target quick application. Because the quick application server already obtains all release information required for release of the target quick application in Phase 3: the quick application release phase, based on the release information, the entire automatic release process can be implemented without the participation of the developer. Therefore, for the developer, the process operations required for releasing the target quick application are not required.

In conclusion, by maintaining the quick application according to this embodiment of this application, synchronous real-time update of the target quick application and the to-be-converted website can be implemented theoretically. For the developer, maintenance of the target quick application becomes extremely efficient and easy.

It should be noted that, in the foregoing description of Phase 1 to Phase 4, an example in which the portal terminal, the quick application server, the quick application template server, and the application release server are four types of hardware devices that are independent of each other and the specific portal is a portal website is used for description. However, the protection scope of this application is not limited thereto. In actual application, the portal terminal, the quick application server, the quick application template server, and the application release server may alternatively be one hardware device that has all functions of the foregoing plurality of devices. In addition, the specific portal may alternatively be a portal other than a website, such as a quick application, a mobile application program, and computer software. Actual conditions of the software and hardware need to be determined based on an actual application scenario.

In this embodiment of this application, user login in using the quick application may be divided into two phases: associated quick application configuration and quick application user login, which are separately described in the following.

Phase 5: Associated quick application configuration phase.

In this phase, the skilled person or the developer first determines an associated quick application that can share data with the target quick application. Specific selection of the associated quick application is not excessively limited in this embodiment of this application, and may be determined by the skilled person or the developer based on an actual situation.

For example, in some optional embodiments, for a plurality of quick applications provided by a same service provider, the quick applications are characterized by relatively high universality of user accounts and relatively high security of data sharing. In actual application, a user often uses a same account and password for registration and login when using different quick applications provided by the same service provider. In addition, for the quick applications provided by the same service provider, the service provider often provides a function of login with a common account. That is, the user can use the same account and password to log in to different quick applications of the service provider. Based on these actual situations, theoretically, information such as accounts and passwords can be shared between the plurality of quick applications provided by the same service provider. Therefore, when the associated quick application of the target quick application is being determined, a service provider to which the target quick application belongs may be first determined, and then the associated quick application is selected from other quick applications provided by the service provider. For example, all the other quick applications provided by the service provider can be selected as associated quick applications. In some other optional embodiments, in addition to the plurality of quick applications provided by the same service provider, other quick applications that can be mutually trusted may alternatively be selected as associated quick applications. For example, quick applications provided by a cooperative service provider of the service provider to which the target quick application belongs and the target quick application may be associated quick application of each other.

After the associated quick application of the target quick application is determined, the skilled person or the developer may configure the associated quick application of the target quick application on the quick application server. That is, each associated quick application corresponding to the target quick application is recorded in the quick application server. A recording manner of the associated quick application is not excessively limited in this embodiment of this application, and may be specifically set by the skilled person or the developer. For example, in some embodiments, in an application group manner, quick applications that are associated with each other may be uniformly recorded in one application group. For example, it is assumed that a quick application A, a quick application B, and a quick application C are mutually associated quick applications. In this case, the three quick applications may be recorded in a same application group. Alternatively, in some other optional embodiments, a plurality of quick applications may be recorded in advance in the quick application server, every two quick applications form a quick application pair, and then whether the quick application pairs are associated quick application pairs is recorded.

In an optional embodiment of this application, to implement data sharing between quick applications, in addition to allowing the quick applications to read data from each other, different quick applications may further perform process sharing. That is, different quick applications are placed in a same process to run. In this case, quick applications in the same process can also read data such as login information from each other. Correspondingly, in this embodiment of this application, the associated quick applications recorded in the quick application server are quick applications that can be placed and run in a same process (an essential purpose is still to implement sharing of login information between associated quick applications, and therefore this is not contradictory to the foregoing description of the associated quick application "An associated quick application of a quick application is a quick application that can share login information with the quick application"). Based on this, when setting the associated quick application, the skilled person or the developer may determine an associated quick application of each quick application based on "whether the quick applications can run in a same process". For example, when the quick application A, the quick application B, and the quick application C can run in a same process, the three quick applications may be set as mutually associated quick applications theoretically.

In addition, a manner and an occasion of configuring the associated quick application of the target quick application are not excessively limited in this embodiment of this application, and may be determined by the skilled person or the developer based on an actual requirement.

Figure 6:
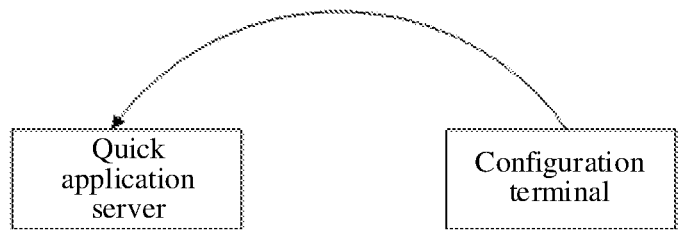
FIG. 6 is a schematic flowchart of an associated quick application configuration phase in a quick application login method according to an embodiment of this application.

For example, for a configuration manner of the associated quick application, in some embodiments, configuration data of the associated quick application may be uploaded in a manner such as a specific portal. In this case, reference may be made to the configuration manner of the first parameter information in the foregoing Phase 2: the quick application development phase, or the configuration manner of the first release information in the foregoing Phase 3: the quick application release phase, to perform uploading, online input, or the like of the configuration data of the locally associated quick application. In this case, the specific portal may be used to provide an upload interface for the configuration data of the associated quick application to the skilled person or the developer. However, in some other optional embodiments, the skilled person or the developer may directly exchange data with the quick application server by using a configuration terminal, and upload the configuration data of the associated quick application. In this case, reference may be made to FIG. 6, which is a flowchart of possible implementation of an associated quick application configuration phase.

Theoretically, a configuration occasion of the associated quick application may be at any node in a life cycle of the quick application. For example, the associated quick application configuration may be performed in a quick application development process, or the associated quick application configuration may be performed in a quick application release or maintenance process, or the associated quick application configuration may be performed in a quick application use process. In addition, configuration of the associated quick application is not limited in this embodiment of this application, and may be determined by the skilled person or the developer based on an actual requirement. Therefore, in this embodiment of this application, an associated quick application configuration operation is relatively flexible. The skilled person or the developer may perform associated quick application configuration one or more times at any time in the life cycle of the quick application based on an actual requirement.

In an optional embodiment of this application, the configuration operation of the associated quick application may be an independent operation, or may be an operation performed together with another quick application operation. For example, in some embodiments, if the associated quick application configuration is performed in a quick application development or release process, when uploading the first parameter information or the first release information, the developer may upload the configuration data of the associated quick application together in the upload interface. In this case, the configuration operation of the associated quick application is performed together with the operation of generating or releasing the quick application. However, in some other optional embodiments, an independent associated quick application configuration function may also be set, and the skilled person or the developer uses the function to perform an independent associated quick application configuration operation when necessary.

In addition, it should be particularly noted that in order to improve information security between quick applications, in an embodiment of this application, in a process of configuring the associated quick application, the quick application server performs authorization verification on the quick applications that are mutually associated with each other. That is, it is determined whether a plurality of quick applications associated with each other belong to a same developer, or whether there is a mutual authorization license of each quick application developer. In addition, the current configuration of the associated quick application takes effect only when the plurality of quick applications associated with each other belong to a same developer, or when the developers have licensed each other. Therefore, in this embodiment of this application, when configuring the associated quick application, the skilled person or the developer needs to upload developer information of each quick application and license authorization information for the quick application.

For example, it is assumed that the skilled person or the developer configures the quick application A, the quick application B, and the quick application C as associated quick applications. In this case, the quick application server checks whether developers of the quick application A, the quick application B, and the quick application C are the same, or whether the developers have licensed each other. If the quick application A, the quick application B, and the quick application C belong to the same developer, or the developers of the three quick applications have licensed each other, associated quick application configuration of the quick application A, the quick application B, and the quick application C takes effect.

After the skilled person or the developer completes the foregoing configuration of the associated quick application, when using the quick application in the user terminal, the user may enter Phase 6 of this embodiment of this application, to perform user login to the quick application.

Phase 6: Quick application user login.

Figure 7A:
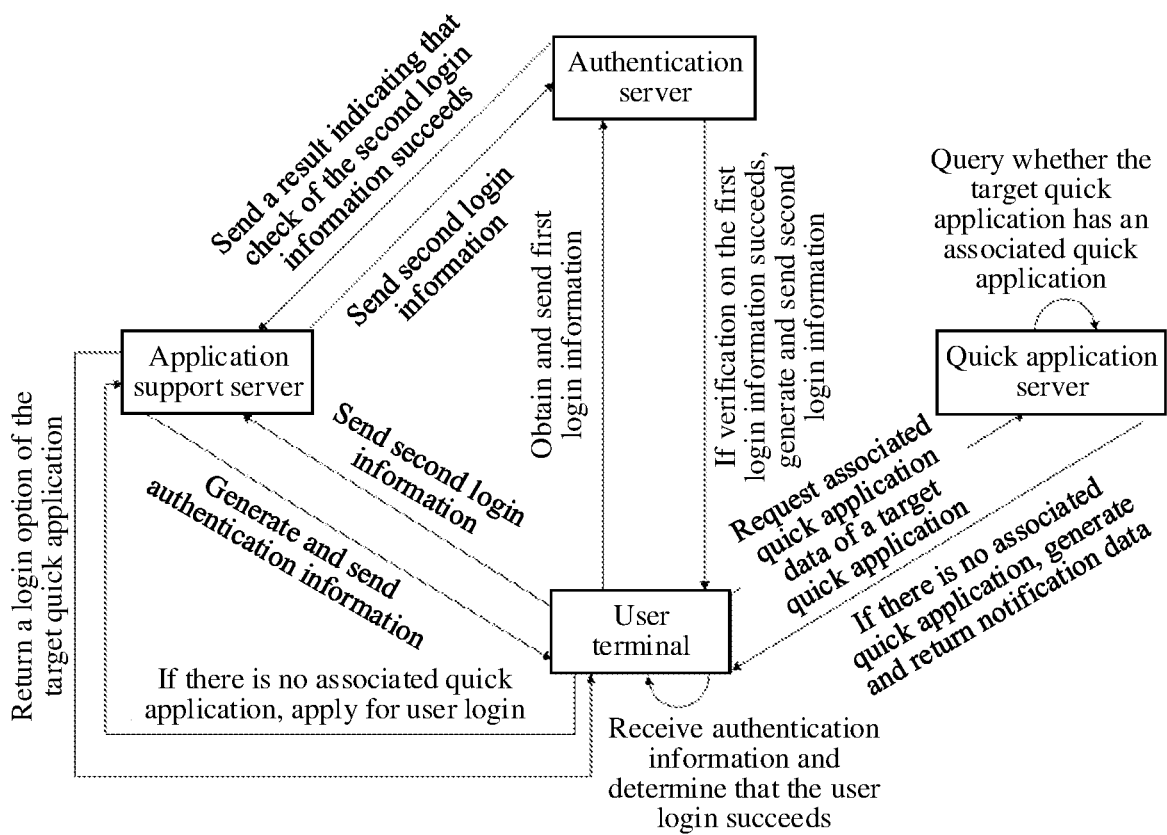
FIG. 7A is a schematic diagram of a system architecture of a quick application login method according to an embodiment of this application.

FIG. 7A is a schematic diagram of a system architecture in a quick application generation method according to an embodiment of this application. Corresponding to FIG. 7A, FIG. 7B-1 and FIG. 7B-2 are a schematic flowchart of implementing a quick application generation method according to an embodiment of this application. FIG. 7A and FIG. 7B-1 and FIG. 7B-2 are described in detail as follows:

S701: In response to a preset operation, a user terminal requests, from a quick application server, associated quick application data of a target quick application.

In this embodiment of this application, a skilled person presets a preset operation corresponding to associated quick application data query. When detecting that the preset operation is triggered, the user terminal requests the association quick application data of the target quick application from the quick application server, to determine whether the target quick application has an associated quick application and the specific associated quick application. The associated quick application data includes information about the associated quick application of the target quick application. For example, it is assumed that a quick application A, a quick application B, and a quick application C are associated quick applications of each other, and the quick application A is the target quick application. In this case, the associated quick application data includes information about the quick application B and the quick application C, so as to notify the user terminal that associated quick applications of the target quick application include the quick application B and the quick application C. A specific information type of the associated quick application information is not limited herein, and may be set by the skilled person. For example, in some optional embodiments, the associated quick application information may be an application name or an application package name of a quick application, or may be other information for determining a specific quick application.

In addition, a specific operation type of the preset operation and an implementation of responding to the preset operation are not excessively limited in this embodiment of this application, and may be set by the skilled person based on an actual requirement.

For example, for a type of the preset operation, in some optional embodiments, the preset operation may be set to a start operation of the target quick application. On this basis, if the user terminal detects that the target quick application is started, the user terminal performs the operation of requesting, from the quick application server, the associated quick application data of the target quick application. However, in some other optional embodiments, the preset operation may alternatively be set to a user login operation. In this case, if the user terminal detects that user login in the target quick application is triggered, the user terminal performs the operation of requesting, from the quick application server, the associated quick application data of the target quick application.

For a specific implementation of responding to the preset operation, in some optional embodiments, it may be set that the target quick application responds to the preset operation. In this case, when detecting the preset operation, the target quick application requests the associated quick application data of the target quick application from the quick application server. For example, it is assumed that the preset operation is starting the target quick application. On this basis, when starting, the target quick application requests the associated quick application data of the target quick application from the quick application server. However, in some other optional embodiments, it may alternatively be set that a quick application engine (configured to run a quick application) in the user terminal responds to the preset operation. That is, when detecting the preset operation, the quick application engine requests the associated quick application data of the target quick application from the quick application server. For example, it is assumed that the preset operation is starting the target quick application. On this basis, when loading the target quick application (that is, when the target quick application is started), the quick application engine requests the associated quick application data of the target quick application from the quick application server.

In addition, a specific triggering manner of the preset operation is not excessively limited in this embodiment of this application, and may be specifically determined based on an actual application situation. For example, in some embodiments, a user may manually perform the preset operation on the user terminal. For example, the user manually starts the target quick application or starts a user login function in the target quick application. However, in some other embodiments, the user terminal may trigger the preset operation. For example, another service (for example, another quick application) in the user terminal is linked to start the target quick application or a user login function in the target quick application. An example is used for description. It is assumed that the preset operation is a user login operation. In this embodiment of this application, a triggering manner of the user login operation in the target quick application may include: The user manually starts a user login function; the user login function is automatically started when the target quick application is started; the user login function is started after preset duration after the target quick application is started; and a function other than user login (for example, a function that can be used only after the user logs in) in the target quick application is associated with the start of the user login function.

In addition, it should be understood that this embodiment of this application is for a scenario in which the user needs to log in to the target quick application. Theoretically, S701 can be normally performed regardless of whether the user logs in to the target quick application. However, in actual application, in a scenario in which the user has successfully logged in to the target quick application, S701 and subsequent operations may be performed or not performed based on an actual requirement. This may be specifically set by the skilled person based on an actual requirement.

S702: After receiving the request of the user terminal, the quick application server queries whether the target quick application has an associated quick application.

After receiving the request of the user terminal, the quick application server queries a probability quick application configuration corresponding to the target quick application, that is, queries whether the target quick application has an associated quick application, and queries specific associated quick applications of the target quick application if the target quick application has an associated quick application. For example, it is assumed that the target quick application is a quick application A, and the quick application server preconfigures the quick application A, a quick application B, and a quick application C as associated quick applications. In this case, the quick application server may find that the target quick application has two associated quick applications: the quick application B and the quick application C. However, if no associated quick application is configured for the target quick application in the quick application server, the quick application server cannot find an associated quick application of the target quick application. Therefore, in this case, it may be determined that the target quick application has no associated quick application.

When the target quick application has no associated quick application, the quick application server performs an operation of S7031. In this case, refer to FIG. 7B-1. When the target quick application has an associated quick application, the quick application server performs an operation of S7032. In this case, refer to FIG. 7E-1.

S7031: If the target quick application has no associated quick application, the quick application server generates one piece of notification data, and returns the notification data to the user terminal. The notification data is used to notify the user terminal that the target quick application has no associated quick application.

When determining that the target quick application has no associated quick application, the quick application server generates one piece of notification data and sends the notification data to the user terminal, to notify the user terminal that the current quick application has no associated quick application. A data form of the notification data is not excessively limited in this embodiment of this application, and may be specifically set by the skilled person based on an actual requirement. For example, the notification data may be a notification message, or may be associated quick application data. In this case, a quantity of associated quick applications recorded in the associated quick application data is 0.

S704: If the user terminal determines, based on the received notification data, that the target quick application has no associated quick application, the user terminal applies to an application support server of the target quick application for user login.

After receiving the notification data, the user terminal determines, based on the notification data, whether the target quick application has associated quick application. A specific determining rule needs to be determined based on a data form of the notification data that is set by the skilled person. For example, when the notification data is a notification-type message, when the notification data is received, it means that the target quick application has no associated quick application. In this case, determining may be directly performed. When the notification data is the associated quick application data, determining needs to be performed based on a specific quantity of associated quick applications recorded in the associated quick application data. If the quantity is 0, it may be determined that the target quick application has no associated quick application.

When it is determined that the target quick application has no associated quick application, it indicates that no quick application can share data with the target quick application. In this case, the user terminal cannot implement quick user login to the target quick application by using login information of another quick application. Therefore, login information such as an account and a password needs to be entered for login. Based on this, the user terminal applies to the application support server for user login, so as to notify the application support server that the current target quick application needs to perform user login.

S705: When receiving a user login application of the user terminal, the application support server returns a login option of the target quick application.

When receiving the user login application of the user terminal, the application support server determines a specific login manner in which the target quick application can perform user login. In this embodiment of this application, there are two login manners: login using an official account or login using a third-party account. Official login means that the user performs user login by using an account, a password, and the like registered with a target quick application service provider. In this case, an authentication server is an official authentication server provided by the quick application service provider. Login using a third-party account means that the user uses an account, a password, and the like registered with a third-party service provider to perform user login. In this case, the authentication server is a third-party authentication server provided by the third-party service provider. For login using a third-party account, in some embodiments, login may be implemented by using an authorization mechanism. For example, an authorization mechanism such as the Oauth solution or Oauth 2.0 solution can be used to implement login using a third-party account.

In actual application, a quick application generally supports login using an official account, but may not support login using a third-party account. This is not excessively limited herein. It may be specifically set by a quick application developer when developing the quick application.

In this embodiment of this application, the application support server prestores a login manner supported by the target quick application. Then, a corresponding login option is returned based on the login manner. For example, whether only login using an official account is supported or both login using an official account and login using a third-party account are supported. If only login using an official account is supported, the returned login option includes only an official account login option. If both login using an official account and login using a third-party account are supported, the returned login options include both an official account login option and a third-party account login option.

S706: The user terminal displays a login interface based on the login option, obtains first login information entered by the user in the login interface, and sends the first login information to the authentication server.

After receiving the login option, the user terminal determines a corresponding login interface based on the login option, and then displays the login interface. An example is used for description. As shown in (a) in FIG. 7C, (a) in FIG. 7C is a login interface according to an embodiment of this application when the login option includes only the official account login option. In this case, the user can enter an account and a password in the login interface. As shown in (b) in FIG. 7C, (b) in FIG. 7C is a login interface according to an embodiment of this application when the login options include both the official account login option and the third-party account login option. In this case, the user can enter the account and the password in the login interface or may select a third-party account to log in.

In this embodiment of this application, after viewing the login interface, the user may select a login manner in the login interface and enter login information (namely, the first login information) such as an account and a password to perform login. The user terminal sends the first login information entered by the user to the authentication server for identity verification. According to different selected login manners, in this embodiment of this application, authentication server objects to which the user terminal sends the first login information may be different. For example, when the official account is selected for login, the authentication server object for sending is the official authentication server provided by the quick application service provider. If the third-party account is selected for login, the authentication server object for sending is the third-party authentication server provided by the third-party service provider. This is specifically determined based on an actual application scenario.

S707: The authentication server attempts to verify the first login information, and if the verification succeeds, generates second login information, and sends the second login information to the user terminal.

After receiving the first login information, the authentication server attempts to verify the first login information, to determine whether the user identity is valid. If the verification is successful, the user identity is valid. In this case, the authentication server generates one piece of second login information for the first login information, and sends the second login information to the user terminal. In one aspect, the second login information may be used to notify the user terminal that the verification on the first login information is successful. In another aspect, the second login information is further used by the user terminal to perform identity verification on an application support terminal.

It should be noted that, in actual application, actual data types of the second login information may vary based on different types of authentication servers. This may be specifically determined based on an actual application situation, and is not excessively limited herein. For example, in some alternative embodiments, when the authentication server is a CSA server, the CSA server attempts to verify the first login information, and generates a corresponding cookie and an ST after the verification succeeds. In this case, the ST and the cookie are the second login information in this embodiment of this application.

In an embodiment of this application, in actual application, the first login information entered by the user may not be accurate. Therefore, a case in which the first login information fails to be verified may occur. In this embodiment of this application, the authentication server generates a result indicating that the first login information fails to be verified, and sends the result to the user terminal, so as to notify the user terminal that the first login information is incorrect.

If the user terminal receives the result indicating that the first login information fails to be verified, the user terminal notifies the user that the first login information is incorrect by using a text, a voice, an image, a video, or the like. In this way, the user can easily know a cause of the login failure. This improves user login efficiency.

S708: The user terminal stores the received second login information locally, and sends the second login information to the application support server.

After receiving the second login information, in one aspect, the user terminal stores the second login information locally for later use. In another aspect, the second login information is further sent to the application support server, so as to attempt to verify the second login information.

In an optional embodiment of this application, in actual application, second login information returned by some authentication servers includes a relatively large amount of information content. However, when performing identity verification on the user terminal for the authentication server, the application support server may only use some information in the second login information. For example, when the authentication server is the CSA server, the second login information includes the cookie and the ST. However, in actual application, the application support server may use only the ST to implement identity verification on the user terminal for the authentication server. Therefore, in this embodiment of this application, the second login information sent by the user terminal to the application support server may be a part or all of the second login information, and this may be specifically determined based on an actual application situation.

S709: The application support server sends the received second login information to the authentication server to request check.

After receiving the second login information, the application support server sends the received second login information to the authentication server.

S710: The authentication server checks the received second login information, and if the check succeeds, sends a result indicating that the check succeeds to the application support server.

After receiving the second login information sent by the application support server, the authentication server checks validity of the second login information, and determines whether the second login information is forged information.

If the check succeeds, a check success result is fed back to the application support server. A specific check method for the second login information is not excessively limited in this embodiment of this application, and may be set by the skilled person based on an actual requirement. For example, in some optional embodiments, the authentication server may choose to compare the received second login information with the second login information generated in S707, to determine whether the second login information is valid. However, in some other optional embodiments, the skilled person may preset some check rules for the second login information, and then check the second login information according to the check rules.

In an embodiment of this application, for a case in which the check of the second login information fails, it indicates that the second login information is invalid. For example, the second login information may be forged, or the second login information may expire, or some data may be lost or tampered with during transmission. In this case, the authentication server may generate a result indicating that the check of the second login information fails, and send the result to the application support server.

S711: After receiving the result indicating that the check succeeds, the application support server generates authentication information for the user terminal, and sends the authentication information to the user terminal. The authentication information is an identity credential of the user terminal in a data exchange process between the user terminal and the application support server.

When the application support server receives the result indicating that the check succeeds, the user login is valid. So far, the application support server has completed user login verification on the target quick application. In this case, the application support server generates authentication information for the user terminal, and sends the authentication information to the user terminal. The authentication information may be used as an identity credential during subsequent data exchange with the application support server. A specific generation manner and a quantity type of the authentication information are not excessively limited in this embodiment of this application, and may be set by the skilled person based on an actual requirement. For example, the authentication information may be a unique character string, or may be specific data associated with the application support server. An example is used for description. In this embodiment of this application, after receiving the result indicating that the check succeeds, the application support server configures cookies of a domain name of the application support server for the user terminal. The cookies are sent to the user terminal as authentication information.

In an optional embodiment of this application, when sending the authentication information to the user terminal, the application support server may further push one piece of login success information to the user terminal, to notify the user that the current user login is successful.

In an optional embodiment of this application, if the application support server receives a result indicating that the check of the second login information fails, it indicates that the received second login information is faulty. In this case, the application support server may generate a piece of check failure notification data and send the data to the user terminal, or forward the result indicating that the check of the second login information fails to the user terminal.

Correspondingly, when receiving the check failure notification data or the result indicating that the check of the second login information fails sent by the application support server, the user terminal may attempt to perform S708 again to send the second login information to the application support server, so as to perform identity verification again. Alternatively, S706 is returned to be performed, and first login information obtained this time is sent to the authentication server, so as to re-obtain second login information for identity verification. Alternatively, the user may be prompted that the current login fails, and the user is prompted to re-enter first login information, and S706 is re-executed to send the current first login information to the authentication server, so as to re-obtain second login information for identity verification.

S712: After receiving the authentication information, the user terminal determines that the user login succeeds.

After receiving the authentication information, the user terminal may determine that the current user login succeeds. So far, in this embodiment of this application, a complete process of performing user login when the user normally enters login information such as an account and a password can be implemented. In addition, in some embodiments, when the application support server further sends the login success information, the user terminal may prompt the user in the target quick application that the current user login succeeds.

After the user successfully logs in, when the user uses the target quick application, the user terminal needs to exchange data with the application support server. In this embodiment of this application, when performing data exchange with the application support server, the user terminal uses data sent to the application support server to carry the authentication information. The authentication information is used as an identity credential, so that the application support server can determine the user identity by using the authentication information and normally perform data processing and exchange. Therefore, the user terminal does not need to perform a user login operation again each time the user terminal sends data. For example, it is assumed that the authentication information is cookies configured with the domain name of the application support server. When sending data to the application support server, the user terminal uses the sent data to carry the cookies. The application support server may determine the user identity based on the cookies.

Figures 1, 7B:
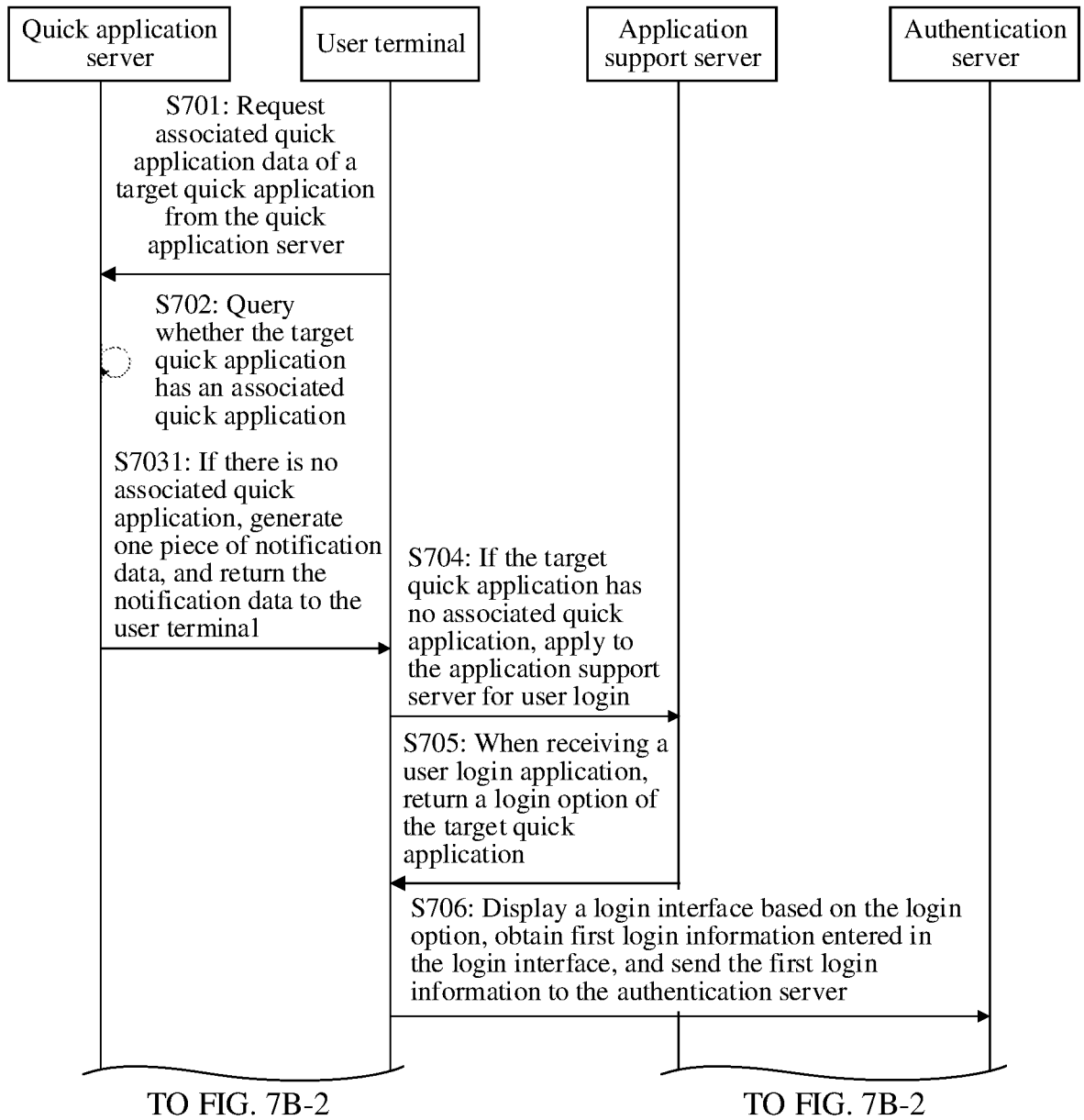
Figures 2, 7B:
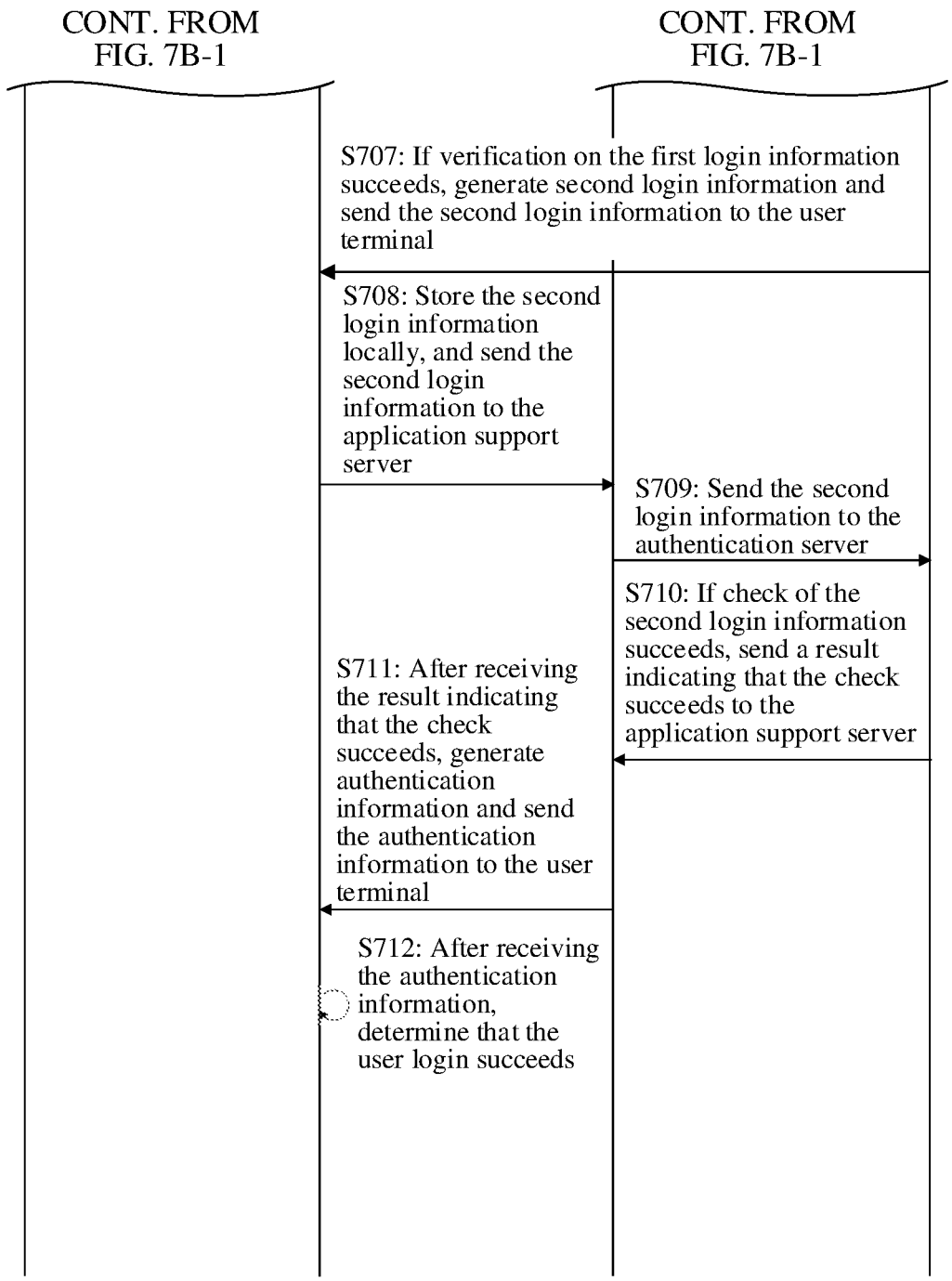
Figure 7C:
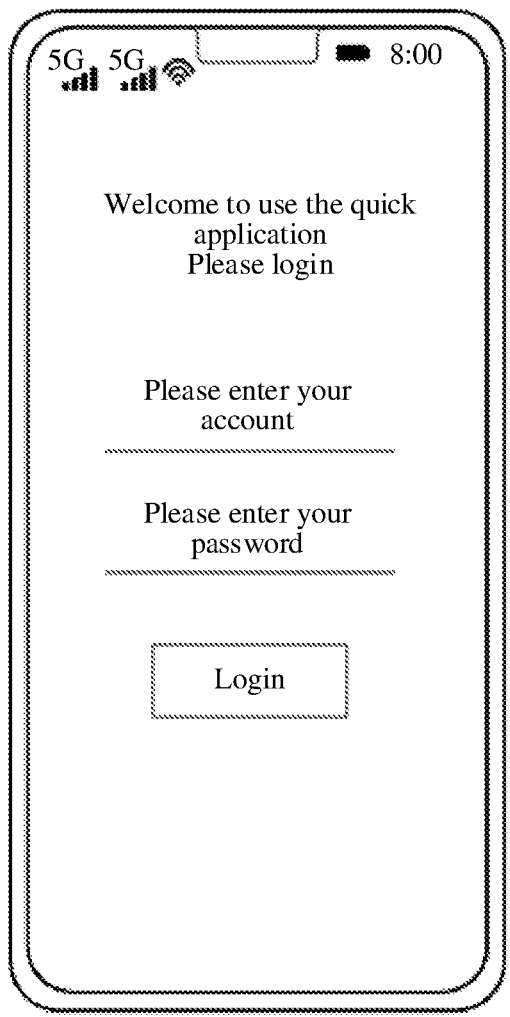
FIG. 7C is a schematic diagram of a quick application login interface according to an embodiment of this application.
Figure 7C:
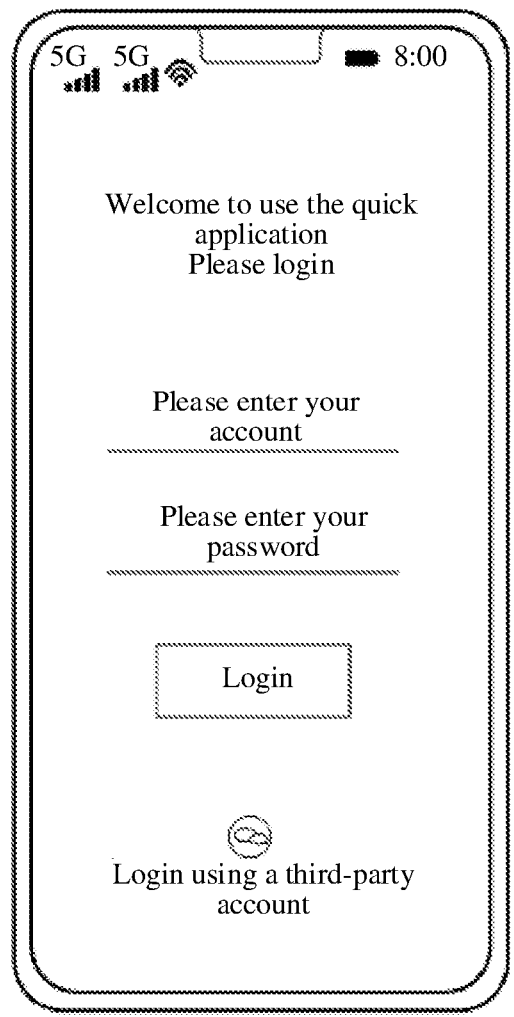

It should be noted that operations of S7031 to S712 shown in FIG. 7B-1 and FIG. 7B-2 are a case branch of quick application login in this embodiment of this application. In this case branch, the target quick application has no associated quick application. Therefore, the user needs to normally enter login information such as an account and a password in the user terminal to log in to the quick application.

Figure 7D:
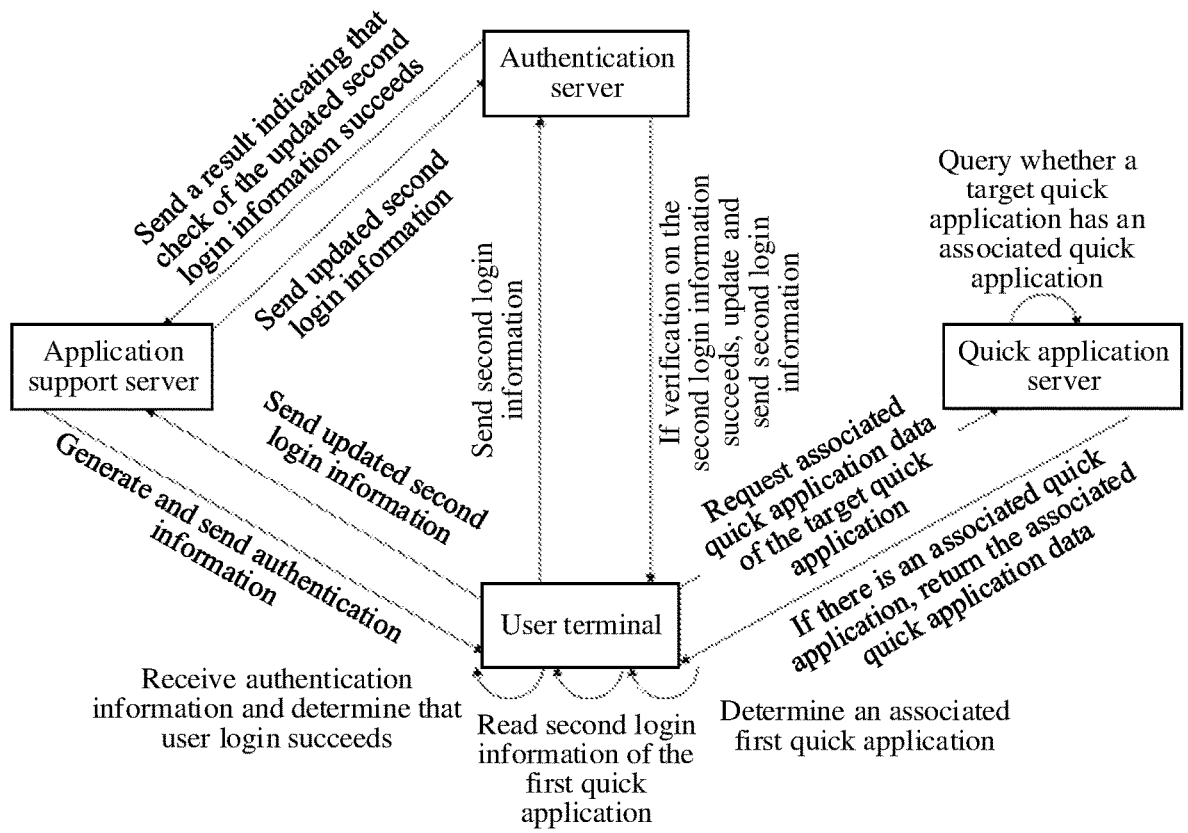
FIG. 7D is a schematic diagram of a system architecture of a quick application login method according to an embodiment of this application.
Figures 1, 7E:
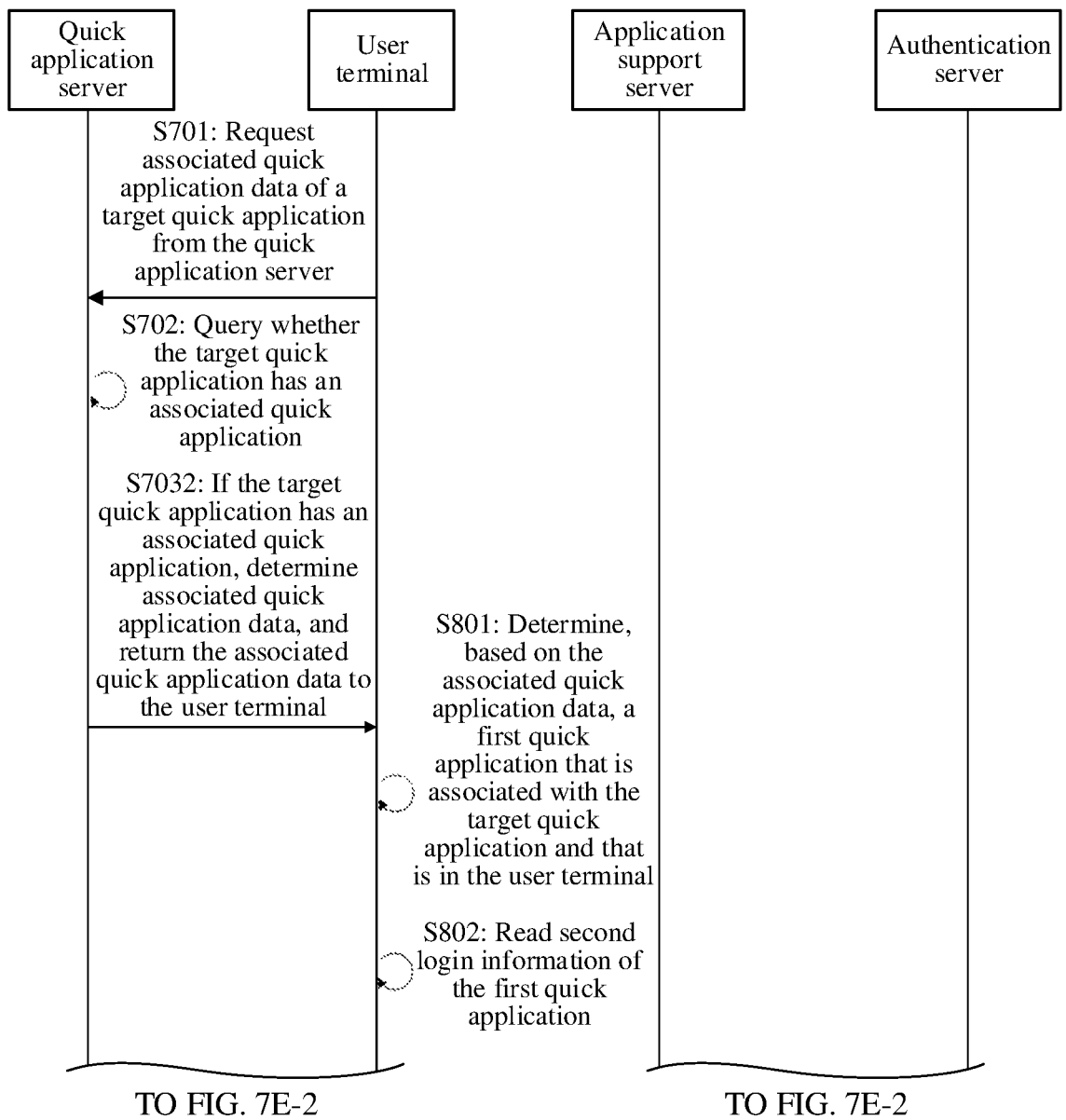
Figures 2, 7E:
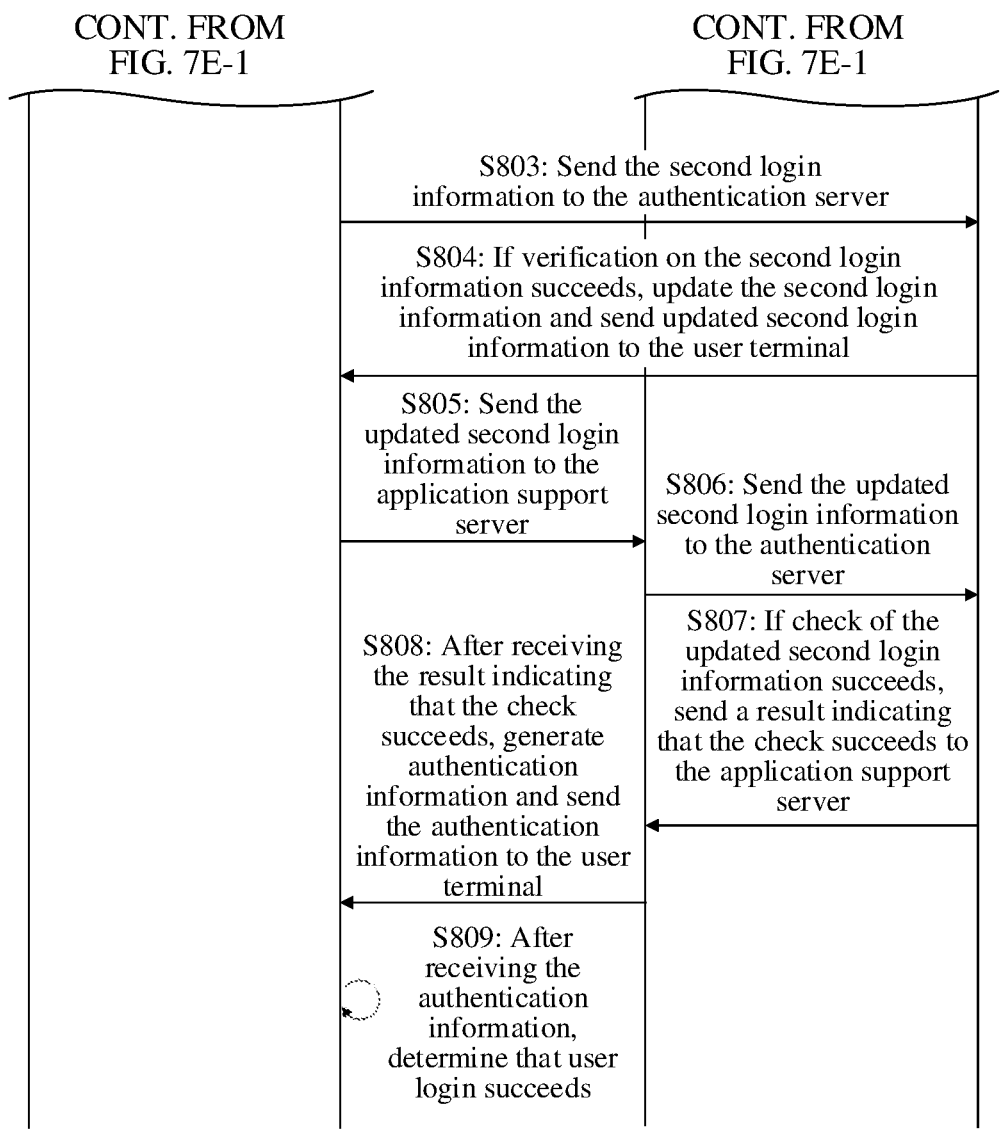

In another case branch of quick application login in this embodiment of this application, the target quick application may also have an associated quick application. In this case, operations of S701 and S702 still exist normally, but a determining result of S702 is different from that of S7031. FIG. 7D is a schematic diagram of a system architecture in a quick application generation method according to an embodiment of this application. Corresponding to FIG. 7D, FIG. 7E-1 and FIG. 7E-2 are a schematic flowchart of implementation of a quick application generation method according to an embodiment of this application. FIG. 7D and FIG. 7E-1 and FIG. 7E-2 are described in detail as follows:

S701: In response to a preset operation, a user terminal requests, from a quick application server, associated quick application data of a target quick application.

S702: After receiving the request of the user terminal, the quick application server queries whether the target quick application has an associated quick application.

For operations of S701 and S702, refer to the description in the embodiment shown in FIG. 7A. Details are not described herein again.

S7032: If the target quick application has an associated quick application, the quick application server determines corresponding associated quick application data, and returns the associated quick application data to the user terminal.

When determining that the target quick application has an associated quick application, the quick application server determines the specific associated quick application, and sends the associated quick application data to the user terminal. For example, it is assumed that a quick application A, a quick application B, and a quick application C are associated quick applications of each other, the target quick application is the quick application A, and a quick application package name of a quick application is set to be used as information for determining the specific quick application. In this case, quick application package names of the quick application B and the quick application C are used as the associated quick application data in this embodiment of this application. That is, in this case, the associated quick application data includes the quick application package names of the quick application B and the quick application C.

S801: The user terminal determines, based on the received associated quick application data, a first quick application that is associated with the target quick application and that is in the user terminal.

After receiving the associated quick application data, the user terminal may determine the associated quick application of the target quick application. However, in actual application, the user terminal may not store data of the associated quick application. Therefore, the user terminal checks, from quick applications whose quick application data has been stored in the user terminal (including a quick application that is currently running, and a quick application that has ended running but whose quick application data is still stored in the user terminal), whether an associated quick application exists. If the associated quick application exists, the user terminal determines all associated quick applications whose quick application data has been stored (in this embodiment of this application, an associated quick application whose quick application data has been stored in the user terminal is referred to as the first quick application). In this case, a quantity of first quick applications may be 1, or may be greater than 1.

An example is used for description. It is assumed that the quick application B and the quick application C are recorded in the associated quick application data. In this embodiment of this application, the user terminal searches for the quick application B and the quick application C from all the quick applications whose quick application data has been stored in the user terminal, and all the found quick applications are referred to as first quick applications. In this case, the first quick application may include only the quick application B or the quick application C, or may include both the quick application B and the quick application C.

In addition, in an optional embodiment of this application, the user terminal may not store any associated quick application of the target quick application, that is, the first quick application does not exist. For example, it is assumed that the quick application B and the quick application C are recorded in the associated quick application data, but neither quick application data of the quick application B nor quick application data of the quick application C may be stored in the user terminal. For a case in which no associated quick application exists, in this embodiment of this application, reference may be made to operations of S704 to S712 in the embodiment shown in FIG. 7B-1 and FIG. 7B-2. After S801 in which it is determined that no associated quick application of the target quick application exists in the user terminal, user login can be applied for from the application support server of the target quick application (this is equivalent to the operation of S704, but the triggering condition becomes that the result of S801 is "it is determined that there is no first quick application in the user terminal").

S802: The user terminal reads second login information of the first quick application.

Because the first quick application is an associated quick application of the target quick application, the login information may be shared. Therefore, after determining the first quick application whose quick application data has been stored, the user terminal attempts to read the second login information of the first quick application. A specific login information reading manner is not excessively limited herein, and may be set by a skilled person based on an actual requirement. For example, in some embodiments, data storage space of the first quick application may be directly searched for the second login information. However, in some other embodiments, if the first quick application is still running, the target quick application may be run in the same process of the first quick application (if the preset operation is starting the target quick application, the target quick application is directly started in the same process). Because quick applications in a same process may perform data sharing, in this case, the target quick application may read the second login information of the first quick application.

It can be learned from the description in S801 that the quantity of first quick applications may be greater than 1. Therefore, the second login information of the first quick application may be read in the following two cases: Case 1 and Case 2.

Case 1: The quantity of first quick applications is 1.

In this case, the user terminal can attempt to read the second login information of only one first quick application. In actual application, the first quick application does not necessarily store the second login information. For example, the user may have not been successfully logged in to the first quick application, or the user may have been successfully logged in to the first quick application, but the second login information is lost due to some factors. Therefore, for a single first quick application in this embodiment of this application, the user terminal may not be able to smoothly read the second login information. Based on Case 1, in this embodiment of this application, the first quick application may also have two possible cases: Case a and Case b.

Case a: The first quick application has second login information.

For a case in which the first quick application has the second login information, the user terminal may read the second login information, and perform a subsequent login operation.

Case b: The first quick application does not have the second login information.

When the first quick application does not have the second login information, the user terminal cannot obtain the second login information, and cannot perform user login to the target quick application based on the shared data of the first quick application. In an optional embodiment of this application, in this embodiment of this application, the user may log in to the target quick application in a manner in which the user enters login information such as an account and a password. In this case, reference may be made to S704 to S712 in FIG. 7B-1 and FIG. 7B-2. In this embodiment of this application, after the second login information of the first quick application cannot be read in S802, user login may be applied for from the application support server of the target quick application (this is equivalent to the operation of S704, but the triggering condition becomes that the result of S802 is "the second login information of the first quick application cannot be read").

Case 2: The quantity of first quick applications is greater than 1.

When the quantity of first quick applications is greater than 1, a case of a single first quick application may alternatively include the foregoing Case a and Case b. However, a difference lies in that, as long as one or more of the first quick applications have second login information, the user terminal can theoretically read the required second login information in this case. Therefore, based on Case 2, S802 in this embodiment of this application may also have two cases: Case c and Case d.

Case c: One or more first quick applications have second login information.

For the first quick application that includes the second login information, in this embodiment of this application, the user terminal may choose to read the second login information of all the first quick applications, or may choose to read second login information of only some of the first quick applications. This embodiment of this application imposes no excessive limitation on a specific first quick application from which the second login information is read, and this may be specifically set by the skilled person. For example, it may be set to randomly select one or more quick applications from the first quick applications that include the second login information, or all the first quick applications that include the second login information may be selected.

For example, in some embodiments, it is assumed that the first quick applications include a quick application B, a quick application C, and a quick application D, and the quick application B and the quick application C have second login information. In this case, the user terminal may choose to read the second login information of both the quick application B and the quick application C, or may select the second login information of the quick application B or the quick application C.

Case d: None of the first quick applications have second login information.

For a case in which none of the first quick applications have second login information, the user terminal cannot obtain the second login information, and cannot perform user login to the target quick application based on shared data of the first quick application. In this case, as an optional embodiment of this application, in this embodiment of this application, the user may log in to the target quick application in a manner of entering login information such as an account and a password. In this case, reference may be made to S704 to S712 in FIG. 7B-1 and FIG. 7B-2. In this embodiment of this application, after the second login information of the first quick application cannot be read in S802, user login may be applied for from the application support server of the target quick application (this is equivalent to the operation of S704, but the triggering condition becomes that the result of S802 is "the second login information of the first quick application cannot be read").

In addition, it should be noted that a data sharing range between associated quick applications is not excessively limited in this embodiment of this application, and may be set by the skilled person based on an actual requirement. On this basis, when reading the second login information for use by the target quick application, the user terminal may also read other data of the first quick application within the data sharing range, and send the other data to the target quick application for use. For example, it is assumed that the data sharing range includes a startup animation, and the preset operation is quick application startup. In this embodiment of this application, when detecting that the target quick application is started, the user terminal may read the startup animation of the first quick application. The startup animation is used as a startup animation of the target quick application, to start the target quick application.

It can be learned from descriptions of S708 to S712 in FIG. 7B-2 that, on the basis of obtaining the second login information, theoretically, the second login information of the first quick application can be used to implement user login to the target quick application. However, in actual application, it is found that, to protect security of user data, the second login information may have a time limitation. That is, the second login information has a validity period, and within the validity period, the second login information may be used for user login. However, when the validity period expires, the second login information becomes invalid, and the second login information cannot be directly used for user login. Therefore, in this embodiment of this application, there may be two possible cases based on the time limitation of the second login information. Case 1 and Case 2.

Case 1: The second login information of the first quick application has no time limitation, or a validity period is permanent.

For Case 1, theoretically, the user terminal may use the second login information of the first quick application as the second login information of the target quick application, and perform user login. Therefore, as an optional embodiment of this application, in Case 1, in this embodiment of this application, the second login information of the first quick application is used as the second login information of the target quick application, and operations of S708 to 712 in the embodiment shown in FIG. 7B-2 are performed. To be specific, in this embodiment of this application, after the second login information of the first quick application is read in S802, the second login information may be locally sent to the application support server. In this case, "receiving the second login information" in S708 becomes "reading the second login information of the first quick application" in S802. In addition, the second login information may be stored locally or not stored locally.

Case 2: The second login information of the first quick application has a time limitation, and a validity period is not permanent.

For Case 2, it is difficult for the user terminal to predict whether the second login information of the first quick application can be used as the second login information of the target quick application to perform user login to the target quick application. Therefore, in an embodiment of this application, three optional manners are provided for processing: Manner a, Manner b, and Manner c.

Manner a: Send the second login information of the first quick application to an authentication server, and the authentication server checks and updates the second login information. Then, updated second login information is used as the second login information of the target quick application, and user login to the target quick application is performed based on the updated second login information.

In Manner a, the user terminal considers, by default, that the second login information of the first quick application is invalid. Therefore, the second login information is sent to the authentication server for check and update, to obtain the updated second login information that can be used for the target quick application. Finally, user login to the target quick application is performed based on the updated second login information, so that quick user login to the target quick application can be implemented. For specific operation details of the specific Manner a, refer to S803 to S809 in FIG. 7E-2 and related descriptions thereof. Details are not described herein again.

Manner b: Attempt to use the second login information of the first quick application as the second login information of the target quick application, and perform user login.

In Manner b, the user terminal considers, by default, that the second login information of the first quick application is not invalid. In this case, the processing manner is the same as that in the foregoing Case 1, that is, the second login information of the first quick application is used as the second login information of the target quick application, and user login is performed. For specific description, refer to the related description of Case 1. Details are not described herein again.

In Manner b, if the user successfully logs in, it indicates that the second login information of the first quick application is not invalid. In this case, user login to the target quick application may be completed. If the user fails to log in, it indicates that the second login information of the first quick application is invalid. In this case, processing may be performed with reference to the processing manner of Manner a. For details, refer to S803 to S809 in FIG. 7E-2 and related descriptions thereof. Details are not described herein again.

Manner c: Determine whether the second login information of the first quick application is invalid. If the second login information of the first quick application is not invalid, the second login information of the first quick application is used as the second login information of the target quick application, and user login is performed. If the second login information of the first quick application is invalid, refer to Manner a for processing.

In this embodiment of this application, the user terminal first determines whether the second login information of the first quick application is invalid. If the second login information of the first quick application is not invalid, it indicates that theoretically, the user terminal may use the second login information of the first quick application as the second login information of the target quick application, and perform user login. Therefore, in this embodiment of this application, the user terminal uses the second login information of the first quick application as the second login information of the target quick application, and performs a user login operation for the target quick application. In this case, refer to the related description of Case 1, and details are not described herein again. If the second login information of the first quick application is invalid, processing may be performed with reference to the processing manner in Manner a. For details, refer to S803 to S809 in FIG. 7E-2 and related descriptions thereof. Details are not described herein again. The method for determining whether the second login information of the first quick application is invalid is not excessively limited in this embodiment of this application, and may be set by the skilled person based on an actual requirement. For example, in some optional embodiments, the user terminal may be set to record a storage time while locally storing the second login information. In addition, the skilled person may preset a specific validity period, for example, 10 seconds. On this basis, the user terminal determines whether storage duration of the second login information of the first quick application exceeds the validity period, and if the storage duration exceeds the validity period, the user terminal determines that the second login information is invalid, or if the storage duration does not exceed the validity period, the user terminal determines that the second login information is not invalid.

In actual application, the skilled person may select, based on a requirement, one of Manner a, Manner b, and Manner c as a manner of processing the second login information of the first quick application. Alternatively, a manner other than Manner a, Manner b, and Manner c may be selected for processing. This is not excessively limited herein.

In addition, description of the need to update the second login information of the first quick application and perform user login to the target quick application based on the updated second login information is as follows:

S803: The user terminal sends the second login information to the authentication server.

After reading the second login information of the first quick application, the user terminal sends the second login information to the authentication server, so that the authentication information checks and updates the second login information. Content of the second login information specifically sent in this embodiment of this application may vary according to different authentication technologies actually used by the authentication server. For example, the second login information sent by the user terminal may be all information of the second login information, or may be only a part of the second login information. This may be specifically determined according to an actual application situation.

An example is used for description. In this embodiment of this application, it is assumed that the authentication server is a CAS server, and the second parameter information of the first quick application includes a cookie and an ST. The ST has a time limitation and will expire after a specific period of time. The cookie can be used by the CAS server for user identity verification, cookie update, and new ST generation. Therefore, in this embodiment of this application, the user terminal may send only the cookie that is read from the first quick application and that is returned by the CAS server (in this embodiment of this application, in S802, only the cookie returned by the CAS server in the first quick application may be read, but the ST returned by the CAS server is not read).

In an optional embodiment of this application, it can be learned from the description of Case 2 in S802. In actual application, the user terminal may read second login information of a plurality of different first quick applications. That is, a plurality of pieces of second login information may be used in this case. In this embodiment of this application, the user terminal may select one piece of second login information from, and use the second login information as the second login information in S803 for processing. A method for selecting the second login information is not excessively limited in this embodiment of this application, and may be set by the skilled person. For example, in some optional embodiments, one piece of second login information may be randomly selected. However, in some other optional embodiments, a piece of second login information whose local storage time is closest to the current time may alternatively be selected. In this case, time validity of the second login information can be improved.

S804: The authentication server checks the second login information sent by the user terminal, if the check succeeds, updates the second login information, and sends the updated second login information to the user terminal.

After receiving the second login information sent by the user terminal, the authentication server checks validity of the second login information, and determines whether the second login information is valid. If the check succeeds, the second login information is updated, to obtain second login information that can be currently used for user login to the target quick application, and the updated second login information is returned to the user terminal for use. A specific check method for the second login information is not excessively limited in this embodiment of this application, and may be set by the skilled person based on an actual requirement. For example, in some optional embodiments, the skilled person may preset some check rules for the second login information, and then check the second login information according to the check rules. In addition, a method for updating the second login information by the authentication server is not excessively limited in this embodiment of this application, and may be specifically determined based on an actual situation of the authentication server.

In an optional embodiment of this application, if the check performed by the authentication server on the second login information fails, it indicates that the second login information of the first quick application is currently invalid. In this case, the user terminal cannot perform user login by using the second login information of the first quick application. The authentication server generates a login failure message and sends the message to the user terminal. To cope with this situation, an optional processing manner is: After receiving the login failure message, the user terminal may log in to the target quick application in a manner in which the user normally enters login information such as an account and a password. Another optional processing manner may be learned from the description of Case 2 in S802. In actual application, the user terminal may read second login information of a plurality of different first quick applications. That is, a plurality of pieces of second login information may be used in this case. On this basis, the user terminal may reselect a piece of second login information that can be used, and perform the operation of S803 again. If all the second login information is selected and sent once, a manner in which the user normally enters login information such as an account and a password may be selected to log in to the target quick application. For a description of performing user login to the target quick application in a manner in which the user normally enters login information such as an account and a password, refer to the related description in the embodiment shown in FIG. 7B-1 and FIG. 7B-2. Details are not described herein again.

S805: The user terminal sends the received updated second login information to the application support server.

For a specific description of S805, refer to the related description of S708 in the embodiment shown in FIG. 7B-2. Details are not described herein again. However, in this embodiment of this application, in this case, the user terminal sends the updated second login information. In addition, in this embodiment of this application, the user terminal may choose to store the updated second login information locally or not to store the updated second login information locally. Specifically, it may be set by the skilled person. If local storage is required, S805 may be replaced with:

The user terminal locally stores the received updated second login information, and sends the updated second login information to the application support server.

S806: The application support server sends the received updated second login information to the authentication server, to request check.

For a specific description of S806, refer to the related description of S709 in the embodiment shown in FIG. 7B-2. Details are not described herein again. However, in this embodiment of this application, in this case, the application support server sends the updated second login information.

S807: The authentication server checks the received updated second login information, and if the check succeeds, sends a result indicating that the check succeeds to the application support server.

For a specific description of S807, refer to the related description of S710 in the embodiment shown in FIG. 7B-2. Details are not described herein again. However, in this embodiment of this application, in this case, the authentication server checks the updated second login information.

S808: After receiving the result indicating that the check succeeds, the application support server generates authentication information for the user terminal, and sends the authentication information to the user terminal. The authentication information is an identity credential of the user terminal in a data exchange process between the user terminal and the application support server.

For a specific description of S808, refer to the related description of S711 in the embodiment shown in FIG. 7B-2. Details are not described herein again.

S809: After receiving the authentication information, the user terminal determines that the user login succeeds.

For a specific description of S809, refer to the related description of S712 in the embodiment shown in FIG. 7B-2. Details are not described herein again.

In this embodiment of this application, for a case in which the target quick application has an associated quick application after the preset operation is triggered, first, the associated quick application (that is, the first quick application) of the target quick application in the user terminal is determined, and the second login information of the first quick application is read. After the second login information of the first quick application is read, the second login information is used to determine the second login information that can be used by the target quick application (the second login information may be directly used, or the authentication server performs check and update to obtain the second login information that can be used). Finally, the second login information that can be used is used to implement work such as identity verification of the application support server, until authentication information of the application support server is finally obtained. The final user login is completed. Therefore, in this embodiment of this application, in an entire process of the user login operation, the user does not need to enter login information such as an account and a password in the target quick application, and can implement an operation on the target quick application. Finally, quick login to the target quick application is implemented. When the preset operation is manually triggered by the user, an effect of "one-tap login" can be implemented.

In this embodiment of this application, for a scenario in which the user terminal has a plurality of quick applications, and user login needs to be performed on two or more of the quick applications, the user can enter login information such as an account and a password in the $1^{st}$ quick application that requires user login. When user login to another quick application is to be performed, for quick applications that can share data with each other, quick login to the quick application can be implemented based on data of the quick application that has login information. In this process, the user does not need to enter login information such as an account and a password repeatedly. Therefore, in this embodiment of this application, a user login operation performed by the user on the quick application can be greatly simplified, so that efficiency of the user login operation of the quick application is greatly improved.

It should be noted that, in this embodiment of this application, the quick application server and the application support server may be a same server or different servers. In addition, in this embodiment of this application, the quick application server that stores the associated quick application data and the quick application server in Phase 2: the quick application generation phase may be a same server or different servers.

In this embodiment of this application, non-quick application content display in use of the quick application may have two phases: content configuration and display of to-be-displayed content, which are described as follows:

Phase 7: Content configuration phase, which is also called an administrative configuration phase.

In this phase, the skilled person or the developer may choose to configure a related content processing manner of the to-be-displayed content, and configure a manner of opening the to-be-displayed content, which are described as follows:

Configure the related content processing manner of the to-be-displayed content:

First, the skilled person or the developer may predetermine to-be-displayed content that may actually need to be displayed in the target quick application. A specific content status of the to-be-displayed content is not excessively limited in this embodiment of this application, and may be determined by the skilled person or the developer based on an actual situation of the quick application. For example, in some optional embodiments, the to-be-displayed content may be an advertisement, media data, another quick application, an application program, an application store, or the like. The advertisement may include a commodity advertisement, a game advertisement, a commercial promotion, and a public service advertisement. In addition, a single quick application may have one or more pieces of to-be-displayed content that needs to be displayed. The specific content depends on an actual situation of the quick application.

After determining the to-be-displayed content, the skilled person or the developer may determine whether some invalid or unsuitable content exists in the to-be-displayed content. For example, for an advertisement and a video, the advertisement or the video may be invalid due to reasons such as expiration of an advertisement resource or a video resource. Due to legal restrictions in a region where the quick application is released, the advertisement or the video is not suitable for playing in the region where the quick application is released (for example, the law of the region where the quick application is released may stipulate that a specific type of advertisement cannot be placed locally, or there may be specific restrictions on the placement of advertisements), or for another reason, the advertisement or the video may not be suitable for display. For another example, for a quick application and an application program, if the quick application and the application program are removed from an application market, the quick application and the application program may be invalid. Due to legal restrictions in a region where quick applications are released, some quick applications or application programs cannot be downloaded by the user terminal. As a result, the quick applications or application programs may not be suitable for display.

For a case in which the to-be-displayed content includes content that is invalid or unsuitable for display (the content that is invalid or unsuitable for display in the to-be-displayed content is called to-be-discarded content below), to prevent the to-be-discarded content from affecting normal use of the target quick application by the user, the skilled person or the developer may determine related content of the to-be-discarded content that may appear in the target quick application, for example, links, code, or resource data related to the to-be-discarded content. In addition, the skilled person or the developer configures a processing manner of the content related to the to-be-discarded content.

For content related to the to-be-discarded content, this embodiment of this application provides three optional content processing manners: delete, hide, and replace (content used for replacement needs to be set). The related content of the to-be-discarded content is deleted or hidden, so that the quick application cannot normally use the related content of the to-be-discarded content. In this way, the quick application can be prevented from displaying the related content of the to-be-discarded content in a process of being used. Therefore, in a process of using the quick application, the user cannot see and cannot operate the related content of the to-be-discarded content. Because the related content of the to-be-discarded content cannot be operated, the quick application does not have a display requirement of the to-be-discarded content. However, the related content of the to-be-discarded content is replaced, so that in a running process of the quick application, the related content of the to-be-discarded content is not displayed, but specific content used after corresponding replacement is displayed. For replacing the related content, in one aspect, the effect of deleting or hiding the related content may also be implemented, and in another aspect, other available content may be provided for the user to perform replacement and display.

In actual application, the skilled person or the developer may select, based on an actual requirement, how to process the related content of the to-be-discarded content. It may be any one or more of the foregoing content deletion, hiding, and replacement, or may be another processing manner.

An example is used for description. It is assumed that the to-be-discarded content of the target quick application is a quick application A (the quick application A is a quick application other than the target quick application). The related content of the to-be-discarded content is a loading link of the quick application A in an application store a. Because the application store a cannot be accessed in a region where the quick application A is released, the loading link of the quick application A in the application store a is actually an invalid link. In this case, the loading link of the quick application A in the application store a may be deleted or hidden, or the loading link of the quick application A in the application store a may be replaced with a loading link of the quick application A in an application store b. The loading link of the quick application A in the application store b is a valid link, and a display interface of the quick application A in the application store b can be normally redirected to.

In an optional embodiment of this application, when the to-be-discarded content is advertisement data, a manner of processing related content of the advertisement data may be different according to different situations of the advertisement data.

For example, in an embodiment, if the advertisement data is not suitable for play in a region where the quick application is released, for example, advertisement data including specific content is not suitable for playing in specific regions, if the quick application is released in these regions, the advertisement data including the specific content is not suitable for playing in the region where the quick application is released. In this case, to prevent the user from viewing the advertisement data, related content of the advertisement data is theoretically unsuitable to be retained in the target quick application. Therefore, in this embodiment of this application, the related content of the advertisement data may be deleted or hidden. Therefore, in a process of using the target quick application, the user cannot view or operate the related content, and further cannot view the advertisement data.

In another embodiment, if the advertisement data cannot be played in the region where the quick application is released, for example, for some advertisement data that can be played only when a website in a specific region is accessed (for example, promotion advertisements for application programs or videos in specific regions) and that cannot be played in other regions, related content of the advertisement data is invalid, and even if the user operates or triggers the related content of the advertisement data, the advertisement data cannot be viewed. To prevent poor user experience caused by a user's failure to operate the related content, in this embodiment of this application, the related content of the advertisement data may be deleted or hidden. Therefore, in a process of using the target quick application, the user cannot view or operate the related content, and a case in which there is no response to an operation on the related content does not occur.

In still some embodiments, if the advertisement data is a promotion advertisement of a commodity or an application program, and the original advertisement data expires due to iterative update of the commodity or the application program, advertisement data corresponding to the iteratively updated commodity or application program may be first determined, and new related content corresponding to the advertisement data may be determined. Then, the original related content is replaced with the new related content. For example, it is assumed that the related content of the advertisement data is an advertisement link. In this case, the original advertisement link can be replaced with a new advertisement link.

In addition, in this embodiment of this application, processing the related content of the to-be-discarded content may be processing the entire related content of the to-be-discarded content, for example, deleting or hiding the entire related content of the to-be-discarded content, or processing a part of the related content of the to-be-discarded content. For example, it is assumed that the related content of the to-be-discarded content includes a web page link, a video, and an advertisement image. In this case, only a part of the content, such as the web page link, may be processed. Specifically, whether the entire related content of the to-be-discarded content is processed, or a part of the related content is processed is set by the skilled person or the developer based on an actual requirement, and is not excessively limited herein.

In an embodiment of this application, when a plurality of parts of the related content of the to-be-discarded content need to be processed, a same processing manner or different processing manners may be selected for processing the different parts of content. Specifically, the skilled person or the developer may set a specific processing manner for each part of content based on an actual requirement. This is not excessively limited herein. For example, in some embodiments, it is assumed that the related content of the to-be-discarded content includes a web page link, a video, and an advertisement image, and the web page link and the advertisement image need to be processed. In this case, the web page link and the advertisement image may be deleted; or the web page link may be replaced with another web page link, and the advertisement image is deleted.

An example is used for description. It is assumed that the to-be-discarded content of the target quick application is an advertisement A. The related content of the to-be-discarded content is a web page link and an advertisement image of the advertisement A. However, the advertisement A has been discontinued, and the web page link is invalid. In this case, the web page link and the advertisement image of the advertisement A may be deleted or hidden. Alternatively, the web page link and the advertisement image of the advertisement A may be replaced with a web page link and an advertisement image of another advertisement related to the advertisement A. Alternatively, the web page link of the advertisement A may be replaced with a web page link of another advertisement related to the advertisement A, and the advertisement image of the advertisement A is deleted.

In an embodiment of this application, a single quick application may have related content of a plurality of pieces of to-be-discarded content. When a processing manner of the related content of the to-be-displayed content is being configured for the single quick application, in this embodiment of this application, related content of each piece of to-be-displayed content may be separately configured, or the related content of the plurality of pieces of to-be-displayed content may be uniformly configured. This may be specifically set by the skilled person or the developer based on an actual requirement. For example, it is assumed that the to-be-discarded content of the target quick application includes an application program A and an application program B, and corresponding related content is a download link of the application program A and a download link of the application program B respectively. Both the application program A and the application program B are application programs in an application store a, and both the download link of the application program A and the download link of the application program B include an address of the application store a. In this case, the download link of the application program A and the download link of the application program B may be both removed. Alternatively, all download links that include the address of the application store a may be deleted from the related content based on a unified configuration.

Configure the Manner of Opening the to-be-Displayed Content:

Similar to the configuration of the processing manner of the related content of the to-be-displayed content, when the manner of opening the to-be-displayed content is being configured, to-be-displayed content that may actually need to be displayed by the target quick application also needs to be determined by the skilled person or the developer in advance. After determining the to-be-displayed content, the skilled person or the developer may determine whether the to-be-displayed content is suitable for display in the target quick application. A specific method for determining whether the target quick application is suitable for display may be selected or set by the skilled person or the developer according to an actual situation. This is not excessively limited herein. For example, for some quick applications with relatively weak stability, it may be determined that all to-be-displayed content corresponding to these quick applications is unsuitable for display in the quick applications. For another example, some to-be-displayed content that may cause loss of original interface content of a quick application may also be determined as unsuitable for display in the quick application.

For the to-be-displayed content that is not suitable for display in the quick application, the skilled person or the developer may set an appropriate opening manner according to an actual situation of the to-be-displayed content. For example, if the to-be-displayed content is an advertisement, there may be a plurality of different suitable opening manners based on different types of advertisements. For example, when the advertisement is a quick application advertisement or an application program advertisement, jumping to a download interface of a quick application or an application program in an application store to which the quick application or the application program belongs is relatively convenient for the user to view and download, and does not affect normal use of the quick application. Therefore, in some optional embodiments, jumping to the download interface of the quick application or the application program in the application store to which the quick application or the application program belongs may be set as a suitable opening manner for the quick application advertisement or the application program advertisement. When the advertisement is a commodity advertisement, jumping to a commodity sales interface of a quick application or an application program for selling a commodity, or jumping to a web page interface for selling a commodity in a browser is relatively convenient for the user to view and purchase. Therefore, in some optional embodiments, jumping to the commodity sales interface of the quick application or the application program, or jumping to the web page interface for selling a commodity in a browser may be set as a suitable opening manner for the quick application advertisement or the application program advertisement. For another example, if the to-be-displayed content is media data, jumping to a play interface of a quick application or an application program on a platform to which the media data belongs is more convenient for the user to watch. Therefore, in some optional embodiments, jumping to the play interface of the quick application or the application program on the platform to which the media data belongs may be set as an opening manner of the media data. Alternatively, jumping to a web page interface for playing the media data in a browser is set as a manner of opening the media data.

For to-be-displayed content that is suitable for display in a quick application, configuration may not be performed, and the quick application opens the to-be-displayed content in a default manner. Alternatively, configuration may be performed by referring to the foregoing method for configuring to-be-displayed content that is not suitable for display in the quick application. Details are not described herein again.

It should be particularly noted that, in some embodiments, for a single piece of to-be-displayed content, the skilled person or the developer may set one or more different opening manners. A plurality of different opening manners are set, so as to prevent a case in which the to-be-displayed content cannot be normally opened in a single opening manner. Therefore, a success rate of opening the to-be-displayed content is improved. For example, in a case in which the to-be-displayed content is media data, in some optional embodiments, both jumping to a play interface of a quick application or an application program on a platform to which the media data belongs and jumping to a web page play interface of the media data in a browser may be set to an opening manner of the media data.

In some embodiments, there are a plurality of different opening manners for a single piece of to-be-displayed content. The skilled person or the developer may further choose to set a priority order of various opening manners based on a viewing effect of the to-be-displayed content and an operation experience (for example, convenience of purchasing a commodity) of the user in the different opening manners. A higher priority is set for an opening manner with a better viewing effect and operation experience. Therefore, in this embodiment of this application, while a success rate of opening the to-be-displayed content is improved, a display effect of the to-be-displayed content can be further improved, and operation experience of the user on the to-be-displayed content can be improved.

In an embodiment of this application, a single quick application may have a plurality of pieces of to-be-displayed content. When a manner of opening the to-be-displayed content is configured for the single quick application, in this embodiment of this application, each piece of to-be-displayed content may be separately configured, or the plurality of pieces of to-be-displayed content may be uniformly configured. This may be specifically set by the skilled person or the developer based on an actual requirement. For example, it is assumed that the to-be-displayed content of the target quick application includes an advertisement A and an advertisement B. In this case, an opening manner of the advertisement A may be configured as follows: jumping to a commodity sales interface of a quick application; an opening manner of the advertisement B is: jumping to a commodity sales interface of a quick application browser. Alternatively, the opening manners of all to-be-displayed content of the target quick application may be set to: jumping to a commodity sales interface of a quick application browser.

It should be noted that, when configuring the opening manner of the to-be-displayed content, for opening the to-be-converted content in a manner other than the quick application, the skilled person or the developer needs to provide related information of the specific opening manner, so that the quick application in the user terminal can determine to smoothly open the to-be-displayed content according to the opening manner. For example, in some embodiments, it is assumed that the to-be-displayed content is an advertisement A, and a manner of opening the advertisement A is set as follows: jumping to a commodity sales interface of a quick application browser. In this case, the skilled person or the developer needs to set related information of the quick application browser, for example, a quick application name, so that the quick application in the user terminal may determine a specific quick application browser. Alternatively, the opening manner may be set as: displaying information of all running quick application browsers in the user terminal for selection by the user. In this case, the quick application browser may be set to any quick application browser.

In an optional embodiment of this application, in this embodiment of this application, two optional manners of opening the to-be-displayed content are provided: jumping to an application program (including a non-browser application program, such as a video playback application program and a shopping application program, and a browser application program, such as the Huawei browser application program), and jumping to a quick application (including a non-browser quick application, such as a video playback application program and a shopping application program, and a browser quick application, such as the Huawei browser quick application). In actual application, the skilled person or the developer may select any one or more opening manners according to an actual situation of the to-be-displayed content.

In an optional embodiment of this application, when the to-be-displayed content is advertisement data, considering that there are relatively many types of advertisement data, for example, commodity sales advertisements, commodity promotion advertisements, application program or quick application promotion advertisements, publicity advertisements (such as public service advertisements or attraction advertisements), and content promotion advertisements (such as promoting novels or TV dramas), starting from an actual display effect of the to-be-displayed content and a requirement of user operation convenience, a manner of opening the to-be-displayed content may be set as follows:

for commodity sales advertisements and commodity promotion advertisements, the opening manner is set to jumping to an application or a quick application (a non-browser application program or quick application) that can sell commodities, for example, some shopping application programs or quick applications (such as the Vmall application program) or non-shopping application programs or quick applications with shopping functions (such as the Huawei Health application program). In this case, the user can not only view the commodity sales advertisement, but also view more information about the commodity (such as a commodity sales volume and user comments) in the application program or quick application, or purchase the commodity. In this way, a display effect of the commodity sales advertisement is improved, and operation convenience of the user to the commodity sales advertisement is improved.

For an application program promotion advertisement, the opening manner may be set to jumping to an application store to open the advertisement. For a quick application promotion advertisement, the opening manner may be set to jumping to a quick application store (which may also be referred to as a quick application center) to open the advertisement. In this case, the user can view not only the application program or quick application promotion advertisement, but also more information about the application program or the quick application, such as a quantity of downloads and user ratings. In addition, the user may choose to directly install the application program or run the quick application. Therefore, a display effect of the application program or quick application promotion advertisement is improved, and operation convenience of the user for the application program or quick application promotion advertisement is improved.

For a publicity advertisement, a specific opening manner may be set based on a type of publicity content. For example, for a video-type publicity advertisement, the opening manner may be set to jumping to a video-playing application program or quick application to open the advertisement, for example, jumping to the Huawei Video application program to open the video-type publicity advertisement. For a publicity advertisement with images, text, or images plus text, the opening manner may be set to jumping to a browser to open the advertisement. In this case, a display effect of the publicity advertisement can be improved, thereby improving a publicity effect of the publicity content.

For a content promotion advertisement, a specific opening manner may be set based on specific promotion content. For example, when a novel is promoted, the advertisement may be opened by jumping to a reader application program or quick application. When a video such as a TV series or a movie is promoted, the advertisement may be opened by jumping to a video playback application program or quick application. In this case, a better effect of the promotion content can be displayed.

In another optional embodiment of this application, for a case in which the to-be-displayed content is not advertisement data, based on an actual situation of the to-be-displayed content, considering an actual display effect of the to-be-displayed content and a requirement of user operation convenience, an opening manner of the to-be-displayed content may be set as follows:

If the to-be-displayed content is an image, the opening manner may be set to jumping to an image display application program to open the content, for example, jumping to an album application program in the user terminal to open the content. In this case, a better display effect of the image can be implemented, and operations such as zooming in, zooming out, and editing can be conveniently performed by the user on the image.

If the to-be-displayed content is a video, the opening manner may be set to jumping to a video playing application program or quick application to open the video, for example, jumping to the Huawei Video application program to open the video. In this case, a better video playing effect can be implemented, and operations such as fast forward, fast rewind, and pause can be conveniently performed by the user on the video.

If the to-be-displayed content is a website, the opening manner may be set to jumping to a browser (including an application program browser and a quick application browser) to open the website. In this case, a better browsing effect can be achieved for the website. It can also facilitate the user to tap, copy and save content of the website.

In still another embodiment of this application, a plurality of opening manners in the foregoing three opening manners may be set for a single piece of to-be-displayed content, and a corresponding priority order of the opening manners may be set. In this case, the user terminal may successively try different opening manners based on the priority order of the opening manners to open the to-be-displayed content.

For example, for a commodity sales advertisement and a commodity promotion advertisement, the opening manner may be set to: jumping to a shopping application program first to open the advertisement, if the shopping application program fails to be opened, jumping to a shopping quick application to open the advertisement, and if the shopping quick application fails to be opened, jumping to a browser to open the advertisement. For example, the opening manner is: first attempting to jump to a shopping application program A to open the commodity sales advertisement and the commodity promotion advertisement, if the user terminal does not install the shopping application program A, attempting to jump to a shopping quick application a to open the commodity sales advertisement and the commodity promotion advertisement, and if the shopping quick application a cannot be normally opened, jumping to a browser to open the commodity sales advertisement and the commodity promotion advertisement. In this embodiment of this application, a display effect of the commodity sales advertisement and the commodity promotion advertisement can be improved as much as possible within a range supported by the user terminal.

Finally, some supplementary descriptions are given for the content configuration phase:

1. A configuration manner of the related content processing manner of the to-be-displayed content and a configuration manner of the to-be-displayed content opening manner are not excessively limited in this embodiment of this application, and may be selected or set by the skilled person or the developer based on an actual requirement.

Figure 8:
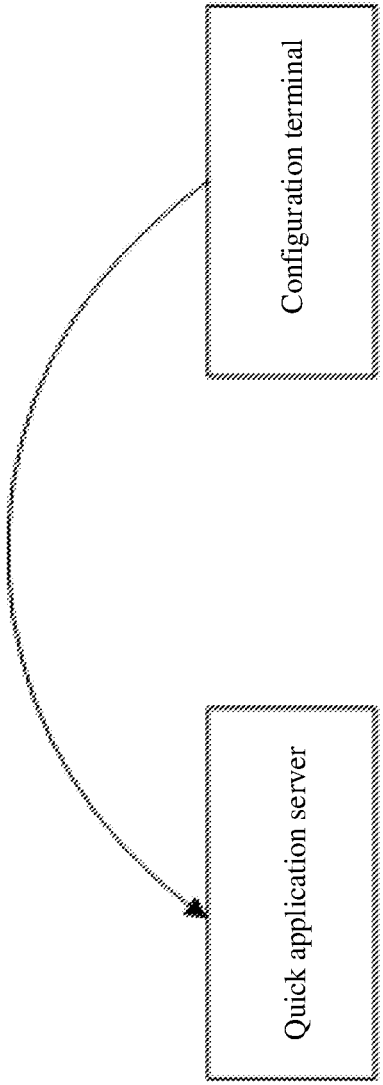
FIG. 8 is a possible implementation flowchart of a content configuration phase according to an embodiment of this application.

For example, in some optional embodiments, configuration data of the related content processing manner and the opening manner of the to-be-displayed content may be uploaded in a manner such as a specific portal. In this case, reference may be made to the configuration manner of the first parameter information in the foregoing Phase 2: the quick application development phase, or the configuration manner of the first release information in the foregoing Phase 3: the quick application release phase, to perform uploading, online input, or the like of the related content processing manner of the to-be-displayed content and the opening manner of the local to-be-displayed content. Correspondingly, a configuration data upload interface for the related content processing manner of the to-be-displayed content and the opening manner of the local to-be-displayed content may be provided for the skilled person or the developer through the special portal. However, in some other optional embodiments, the skilled person or the developer may directly perform data exchange with the quick application server by using a configuration terminal, and upload the configuration data of the related content processing manner of the to-be-displayed content and the opening manner of the local to-be-displayed content. In this case, reference may be made to FIG. 8, which is a flowchart of a possible implementation of a content configuration phase. In an optional embodiment of this application, after receiving the configuration data of the related content processing manner of the to-be-displayed content or the opening manner of the local to-be-displayed content, the quick application server may return an operation success prompt to the configuration terminal, to inform the skilled person or the developer that the configuration of the related content processing manner of the to-be-displayed content or the opening manner of the local to-be-displayed content is successful.

For a scenario in which the configuration data of the related content processing manner of the to-be-displayed content and the opening manner of the local to-be-displayed content is uploaded to the quick application server, a specific data form of the configuration data is not excessively limited in this embodiment of this application, and may be set by the skilled person or the developer based on an actual requirement. For example, in some optional embodiments, for the related content processing manner of the to-be-displayed content, the skilled person or the developer may set a script that includes logic of the related content processing manner of the to-be-displayed content, and upload the script file as configuration data to the quick application server by using the configuration terminal. Similarly, for the opening manner of the to-be-displayed content, the skilled person or the developer may set a script including logic of the opening manner of the to-be-displayed content, and upload the script file as configuration data to the quick application server by using the configuration terminal.

2. According to an actual application requirement, the skilled person or the developer may choose to configure only the related content processing manner of the to-be-displayed content, or configure only the opening manner of the to-be-displayed content. Alternatively, both the related content processing manner and the opening manner may be configured. This is not excessively limited herein.

In addition, the configuration of the related content processing manner of the to-be-displayed content and the configuration of the opening manner of the to-be-displayed content are two configuration operations that are logically independent of each other. Therefore, if both the related content processing manner and the opening manner need to be configured in actual application, the skilled person or the developer may choose to configure the two independently (for example, after the related content processing manner or the opening manner of the to-be-displayed content is configured, the remaining item may be configured after a period of time), or the two may be configured together. In addition, the configuration of the related content processing manner of the to-be-displayed content or the configuration of the opening manner of the to-be-displayed content may also be an operation performed together with another quick application operation. For example, in some embodiments, if the related content processing manner of the to-be-displayed content or the opening manner of the to-be-displayed content is configured in a quick application development or release process, when uploading the first parameter information or the first release information, the developer may upload the configuration data of the related content processing manner of the to-be-displayed content or the opening manner of the to-be-displayed content together in the upload interface. In this case, the configuration operation of the related content processing manner of the to-be-displayed content or the opening manner of the to-be-displayed content is performed together with the quick application generation or release operation. However, in some other optional embodiments, an independent content configuration function may alternatively be set, and when necessary, the skilled person or the developer uses the function to perform an independent configuration operation for the related content processing manner of the to-be-displayed content or the opening manner of the to-be-displayed content.

3. Theoretically, a time for configuring the related content processing manner of the to-be-displayed content and the opening manner of the to-be-displayed content may be at any node in a life cycle of the quick application. For example, the related content processing manner of the to-be-displayed content or the opening manner of the to-be-displayed content may be configured in the quick application development process, or the related content processing manner of the to-be-displayed content and the opening manner of the to-be-displayed content may be configured in the quick application release or maintenance process. Alternatively, the related content processing manner of the to-be-displayed content and the opening manner of the to-be-displayed content are configured in a process of using the quick application. Therefore, in this embodiment of this application, configuration operations for the related content processing manner of the to-be-displayed content and the opening manner of the to-be-displayed content are relatively flexible. The skilled person or the developer may configure the related content processing manner of the to-be-displayed content and the opening manner of the to-be-displayed content one or more times at any time in the life cycle of the quick application based on an actual requirement.

In an embodiment of this application, the related content processing manner of the to-be-displayed content and the opening manner of the to-be-displayed content may be configured in any phase of Phase 1: the template preparation phase, Phase 2: the quick application development phase, Phase 3: the quick application release phase, and Phase 4: the quick application maintenance phase. Therefore, during the development, release, and maintenance of the quick application, the related content processing manner of the to-be-displayed content and the opening manner of the to-be-displayed content of the quick application are synchronously configured. For example, when a quick application parameter is being configured in Phase 2: the quick application development phase, the related content processing manner of the to-be-displayed content and the opening manner of the to-be-displayed content of the quick application may be configured together.

In another embodiment of this application, a configuration occasion and a configuration quantity of the related content processing manner of the to-be-displayed content and the opening manner of the to-be-displayed content are not excessively limited. Therefore, theoretically, the target configuration data can be updated at any time. For example, after the quick application is released, if the skilled person updates the target configuration data of the quick application a plurality of times, theoretically, when the user terminal runs the quick application at different time points, the latest target configuration data obtained may be different.

In still another embodiment of this application, the skilled person or the developer may independently set target configuration data for a single quick application based on an actual situation of each quick application. That is, theoretically, for each quick application, a related content processing manner of the to-be-displayed content and an opening manner of the to-be-displayed content may be the same or different. For example, when the related content of the to-be-displayed content is an advertisement, advertisements removed by different quick applications may be different.

After the skilled person or the developer completes the configuration of the related content processing manner of the to-be-displayed content or the opening manner of the to-be-displayed content, when the user uses the quick application in the user terminal, the quick application may enter Phase 8 of the embodiment of this application, to display the to-be-displayed content.

Phase 8: To-be-displayed content display phase.

Figure 9:
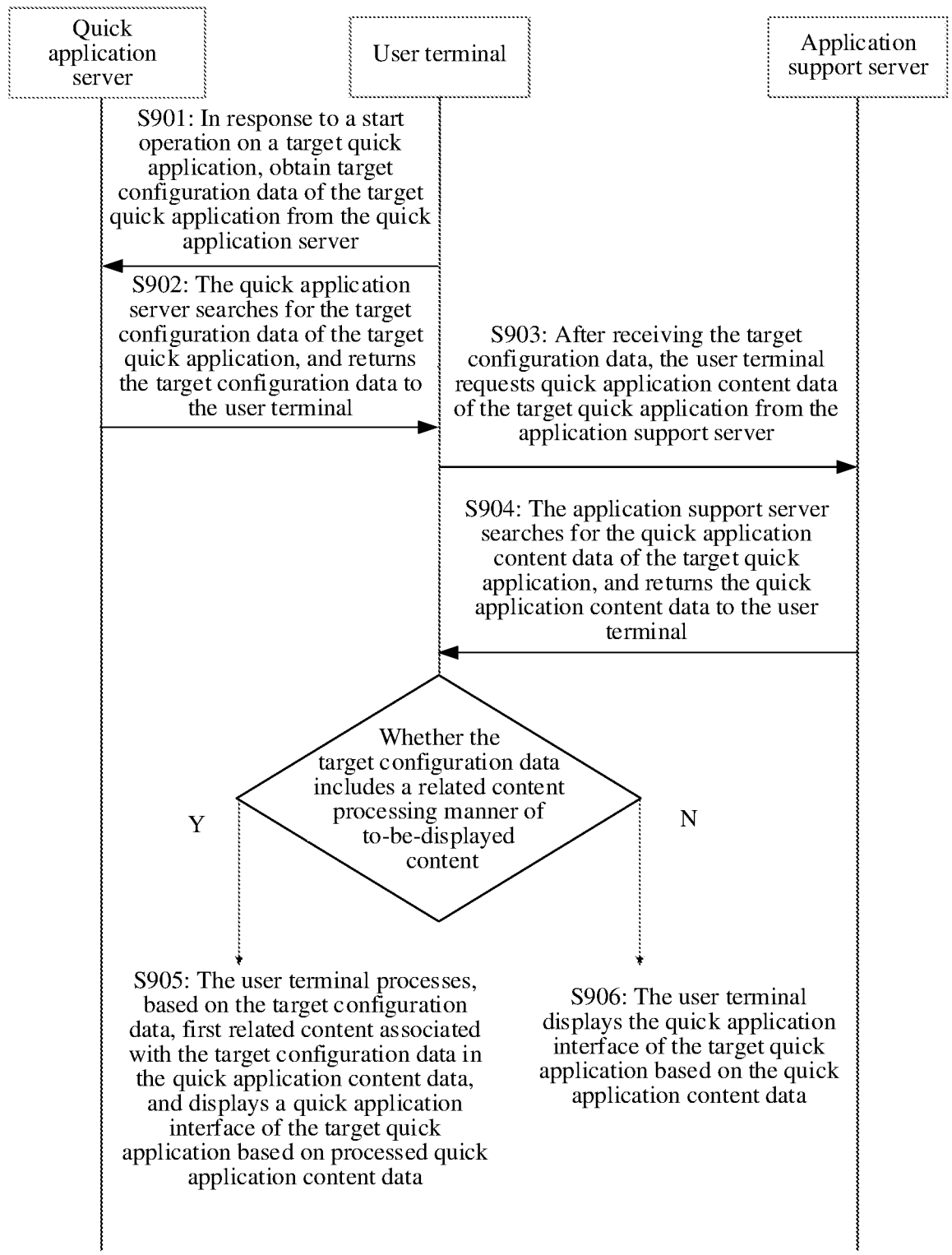
FIG. 9 is a schematic flowchart of a content display method according to an embodiment of this application.

FIG. 9 is a flowchart of implementation of a content display method according to an embodiment of this application. In this embodiment of this application, an example in which the configuration server and the quick application server are a same server is used for description. In actual application, the configuration server may alternatively be replaced with another server other than the quick application server, which is not excessively limited herein. FIG. 9 is described in detail as follows:

S901: In response to a start operation on a target quick application, a user terminal obtains target configuration data of the target quick application from a quick application server.

The target configuration data is a general term of configuration data of an opening manner of to-be-displayed content of the target quick application and configuration data of a related content processing manner of the to-be-displayed content. A skilled person or a developer may choose to configure only the related content processing manner of the to-be-displayed content, or configure only the opening manner of the to-be-displayed content; or choose to configure both. Therefore, in actual application, the target configuration data may include only the configuration data of the opening manner of the to-be-displayed content, or only the configuration data of the related content processing manner of the to-be-displayed content, or may include both the configuration data of the opening manner of the to-bedisplayed content and the configuration data of the related content processing manner of the to-be-displayed content.

A scenario in which the target quick application is started is not excessively limited in this embodiment of this application, and may be determined based on an actual application situation. For example, the user may manually start the target quick application in the user terminal. Alternatively, the target quick application may be automatically started by the user terminal. For example, the target quick application is associated and started by another quick application or an application program in the user terminal, or the user terminal starts the target quick application after receiving a start instruction for the target quick application that is sent by another device. Therefore, in this embodiment of this application, the start operation of the target quick application may be a start operation of the user on the target quick application, or may be an operation of starting the target quick application after the user terminal generates or receives a start instruction for the target quick application.

When detecting the start operation, the user terminal first requests the target configuration data for the target quick application from the quick application server, so as to determine a subsequent processing manner for the to-be-displayed content of the target quick application and the related content of the to-be-displayed content. In an embodiment of this application, the user terminal may send a configuration data request to the quick application server, to request the target configuration data of the target quick application. The configuration data request may carry quick application information such as an application name or an application package name of the target quick application, so that the quick application server can determine the target quick application.

In addition, for a specific implementation of responding to the start operation, in some optional embodiments, it may be set that a platform that is in the user terminal and has a capability of running a quick application responds to the preset operation. For example, a platform that has a capability of running a quick application, such as a quick application loader, a quick application engine, or a quick application center, requests the target configuration data of the target quick application from the quick application server when detecting a start operation on the target quick application.

S902: After receiving the request of the user terminal, the quick application server searches for the target configuration data of the target quick application, and returns the found target configuration data to the user terminal.

After receiving the configuration data request sent by the user terminal, the quick application server searches for the target configuration data of the target quick application. That is, configuration data stored in the quick application server is searched for the configuration data of the opening manner of the to-be-displayed content of the target quick application and the configuration data of the related content processing manner of the to-be-displayed content, and the found configuration data is used as the target configuration data of the target quick application. It can be learned from the description of S901 that in this case, the found target configuration data may include only the configuration data of the opening manner of the to-be-displayed content, or only the configuration data of the related content processing manner of the to-be-displayed content. Alternatively, the found target configuration data may include both the configuration data of the opening manner of the to-be-displayed content and the configuration data of the related content processing manner of the to-be-displayed content.

A method for searching for the target configuration data by the quick application server is not excessively limited in this embodiment of this application, and may be set by a skilled person based on an actual requirement. For example, in some embodiments, the user terminal may add an application identifier of the target quick application to the configuration data request. The application identifier may uniquely identify the target quick application, for example, may be an application name or a package name of the target quick application. Then, the quick application server obtains the target configuration data of the target quick application through matching based on the identification information.

After finding the target configuration data, the quick application server returns the target configuration data to the user terminal based on the configuration data request.

S903: After receiving the target configuration data of the target quick application, the user terminal requests quick application content data of the target quick application from an application support server.

In this embodiment of this application, after receiving the target configuration data, the user terminal starts to start the target quick application.

In this embodiment of this application, data required for running the quick application is collectively referred to as the quick application content data, for example, some service data and media resources required for running the quick application. Therefore, to start the target quick application, the quick application content data of the target quick application needs to be obtained first. A manner of obtaining the quick application content data is not excessively limited in this embodiment of this application, and may be set by the developer or determined based on an actual application scenario. For example, in some optional embodiments, the user terminal may request the quick application content data of the target quick application from a server that stores the quick application content data (the server may be the application support server, a developer server, or the like; in the embodiment shown in FIG. 9, the application support server is used as an example for description). However, in some other optional embodiments, considering that the user terminal may store some data locally, some local data in the user terminal may also be used to run the quick application. Therefore, in these optional embodiments, in one aspect, the user terminal may request a part of the quick application content data of the target quick application from a server that stores the quick application content data. In another aspect, a part of the quick application content data of the target quick application in the local data of the user terminal may be further read. In this way, the quick application content data of the target quick application is obtained.

For a specific implementation of S903, in some optional embodiments, it may be set that S903 is implemented by a platform that is in the user terminal and that has a capability of running a quick application. For example, a platform that has a capability of running a quick application, such as the quick application loader, the quick application engine, or the quick application center, obtains the quick application content data of the target quick application after receiving the target configuration data. Alternatively, the target quick application of the user terminal may be used for implementation. In this case, after receiving the target configuration data, the user terminal sends the target configuration data to the target quick application. The target quick application obtains the quick application content data of the target quick application.

In some other optional embodiments of this application, when obtaining the target configuration data for the target quick application from the quick application server, the user terminal may request the quick application content data of the target quick application from the application support server. In this case, S903 may be: The user terminal requests the quick application content data of the target quick application from the application support server.

S904: After receiving the request of the user terminal, the application support server searches for the quick application content data of the target quick application, and returns the found quick application content data to the user terminal.

After receiving the request for the quick application content data sent by the user terminal, the application support server searches for the quick application content data of the target quick application, and sends the found quick application content data to the user terminal. A method for searching for the quick application content data by the application support server is not excessively limited in this embodiment of this application, and may be set by the skilled person based on an actual requirement. For example, in some embodiments, the user terminal may add the application identifier of the target quick application to the sent request. The application identifier may uniquely identify the target quick application, for example, may be an application name or a package name of the target quick application. Then, the application support server performs matching to obtain the quick application content data of the target quick application based on the identification information.

After obtaining the quick application content data of the target quick application, the user terminal needs to load the target quick application based on the quick application content data. Based on an actual situation of the target configuration data, there are two scenarios:

Scenario 1: The target configuration data includes the related content processing manner of the to-be-displayed content. In this case, the related content needs to be processed. Therefore, the operation of S905 is performed in this embodiment of this application.

Scenario 2: The target configuration data does not include the related content processing manner of the to-be-displayed content. In this case, related content processing does not need to be performed. Therefore, the operation of S906 is performed in this embodiment of this application.

In other words, after S904 in this embodiment of this application, processing may be classified into two scenarios based on whether the target configuration data includes the related content processing manner of the to-be-displayed content. In the two scenarios, the operations of S905 and S906 are correspondingly performed respectively.

S905: The user terminal processes, based on the target configuration data, first related content associated with the target configuration data in the quick application content data, and displays a quick application interface of the target quick application based on processed quick application content data.

In this embodiment of this application, related content whose processing manner is configured by the skilled person or the developer is referred to as the first related content. It can be learned from the description of configuring the related content processing manner of the to-be-displayed content in Phase 7 that, in actual application, the skilled person or the developer may configure some or all of the related content in the target quick application. Therefore, in this embodiment of this application, the user terminal first determines, based on the target configuration data, the first related content specifically corresponding to the target quick application, and determines, from the quick application content data, the first related content specifically included. It should be noted that, because some related content may be data obtained only in a running process of the quick application, the related content may not exist when the quick application is started. Therefore, in actual application, the quick application content data may not include all the first related content. In this case, in this embodiment of this application, all the first related content included in the quick application content data is determined. For example, it is assumed that the first related content includes a web page link A, code B, and resource data C. However, the quick application content data includes only the web page link A and the code B. In this embodiment of this application, the web page link A and the code B are determined from the quick application content data.

After determining the first related content in the quick application content data, the user terminal processes the first related content based on an actual configuration of a processing manner of the first related content in the target configuration data. For example, it is assumed that the first related content includes the web page link A, the code B, and the resource data C. The processing manner of the first related content in the target configuration data is as follows: replacing the web page link A with a web page link B, hiding the code B, and deleting the resource data C. In this embodiment of this application, the user terminal replaces the web page link A in the quick application content data with the web page link B, hides the code B in the quick application content data, and deletes the resource data C in the quick application content data. It should be noted that, in actual application, determining and processing of different pieces of first related content may be performed simultaneously or may be performed sequentially. This may be specifically set by the skilled person or the developer, and is not excessively limited herein.

In an optional embodiment of this application, an example is used for description. First related content corresponding to to-be-displayed content that is not suitable for playing in a region where the quick application is released or cannot be played in the region where the quick application is released may be selectively hidden or deleted. For example, first related content corresponding to a video or an advertisement that is not suitable for playing in the region where the quick application is released or cannot be played in the region where the quick application is released (for example, an advertisement or a video from a website in a specific region cannot be played in other regions), for example, a link, code, or resource data, can be hidden or deleted. For example, a link or code of the advertisement is deleted. In this case, if the first related content can originally be displayed in an interface of the user terminal, after the first related content is hidden and deleted, the first related content is no longer displayed in the interface of the user terminal.

For a case in which the to-be-displayed content is invalid, but there is iteratively updated content, or there is content that can be used for replacement, new related content corresponding to the iteratively updated content or the content that can be used for replacement may be determined. The first related content of the to-be-displayed content is replaced with the new related content. In this way, the new related content after replacement can continue to be used. In this case, if the first related content may originally be displayed in the interface of the user terminal, and the new related content may also be displayed in the interface of the user terminal, after the replacement, the first related content is no longer displayed in the interface of the user terminal, but the new related content may be displayed in the interface of the user terminal.

For example, the to-be-displayed content is an application program promotion advertisement, and the first related content is a download link of a promoted application program and an introduction video. If the original promoted application program is discontinued, but can be replaced with a similar application program, or an original version of the promoted application program is discontinued, but a new version of the application program is released, the first related content may be replaced with: related content of the similar application program, or related content of the new version of the application program. It is assumed that the related content of the similar application program is a download link and an introduction video of the similar application program, and the related content of the new version of the application program is a download link and an introduction video of the new version of the application program. In this case, the user terminal may display the download link and the introduction video of the similar application program, or display the download link and the introduction video of the new version of the application program.

After completing the processing on the first related content, the user terminal may start the target quick application based on the processed quick application content data, and load the quick application interface of the target quick application. In this case, the quick application interface is a startup interface of the target quick application. A case of the startup interface is not excessively limited in this embodiment of this application, and may be determined based on actual application. For example, in some embodiments, the startup interface may be an interface such as a home page, an advertisement interface, or a login interface of the target quick application.

It should be understood that, due to the first related content configured by an actual skilled person or developer, not all of the related content in the quick application content data may be applied. In addition, a manner of processing the first related content may alternatively be replacing the first related content with other related content. Therefore, after the first related content is processed, specific related content may still exist in the quick application content data. Therefore, in this embodiment of this application, the quick application interface loaded by the user terminal may still include specific related content. For example, some advertisement images or links may be included.

In addition, it should be specially noted that an occasion for processing the first related content in S905 is not excessively limited in this embodiment of this application, and may be set by a skilled person or a developer based on an actual requirement. For example, to start the target quick application, the user terminal needs to load the quick application content data. In this case, in some optional embodiments, first related content processing may be performed on the quick application content data based on the target configuration data, and then the quick application content data is loaded. In this case, the quick application content data needs to be parsed first. Alternatively, the quick application content data may be loaded, and in a process of loading the quick application content data, the first related content is processed for the quick application content data. Alternatively, the quick application content data may be loaded first, and after the quick application content data is loaded, the first related content is processed for the quick application content data.

In an optional embodiment of this application, a manner of processing related content may be recorded in a form of a JS script. In this case, the target configuration data includes the JS script set by the skilled person or developer. After obtaining the quick application content data, the user terminal loads the quick application content data, and runs the JS script in the target configuration data. In this case, the user terminal processes the quick application content data according to a rule in the JS script, so as to implement processing on the first related content.

An example is used as for description. It is assumed that a link for jumping to an application store A needs to be hidden (that is, the first related content is a link for jumping to the application store A), and it is assumed that play.appA is a common English identifier of the application store A. In this case, the rule may be configured in the JS script as follows: xxx.domian.com##a[href*="play.appA" ]. On this basis, when running the JS script, the user terminal detects code in the quick application content data, and hides all link code snippets for jumping to the application store A. For example, if code of a hyperlink includes a snippet: <a href="https://play.appA.com/" target="_top">appA Play Store</a>, a css style of display:none may be added to the hyperlink to hide the hyperlink. Alternatively, if the link for jumping to the application store A needs to be deleted, in the preceding operations, if code of a hyperlink includes a snippet: <a href="https://play.appA.com/" target="_top">appA Play Store</a>, the hyperlink can be removed.

S906: The user terminal displays the quick application interface of the target quick application based on the quick application content data.

For Scenario 2: The target configuration data does not include the related content processing manner of the to-be-displayed content. In this case, the user terminal does not need to process the related content. Therefore, the quick application content data may be loaded, and the quick application interface of the target quick application may be displayed.

Until S905 or S906, the user terminal completes starting the target quick application. In this case, the user may normally use the target quick application in the user terminal.

In actual application, it is found that as the user uses the target quick application, quick application content data of the target quick application is continuously updated, so that an interface of the target quick application may be updated with use by the user. However, in a process of updating the quick application content data, some first related content may be added. For example, in a process of using a quick application, related content such as some advertisement links is downloaded from the server. For another example, it is assumed that the target quick application needs to open a new function interface with an operation performed by the user. In this case, the target quick application obtains data required by the new function interface (in this case, the quick application content data is updated), and then generates a new function interface based on the updated quick application content data. However, data required by the new function interface may include first related content configured by a skilled person or a developer.

To prevent the newly added first related content from affecting display of the to-be-displayed content after the quick application content data is updated, in this embodiment of this application, an occasion of processing the first related content by the user terminal is not limited to starting the target quick application. Alternatively, the first related content in the quick application content data may be processed before or after the target quick application updates the interface each time. This may be specifically set by the skilled person or the developer based on an actual requirement.

Figure 10:
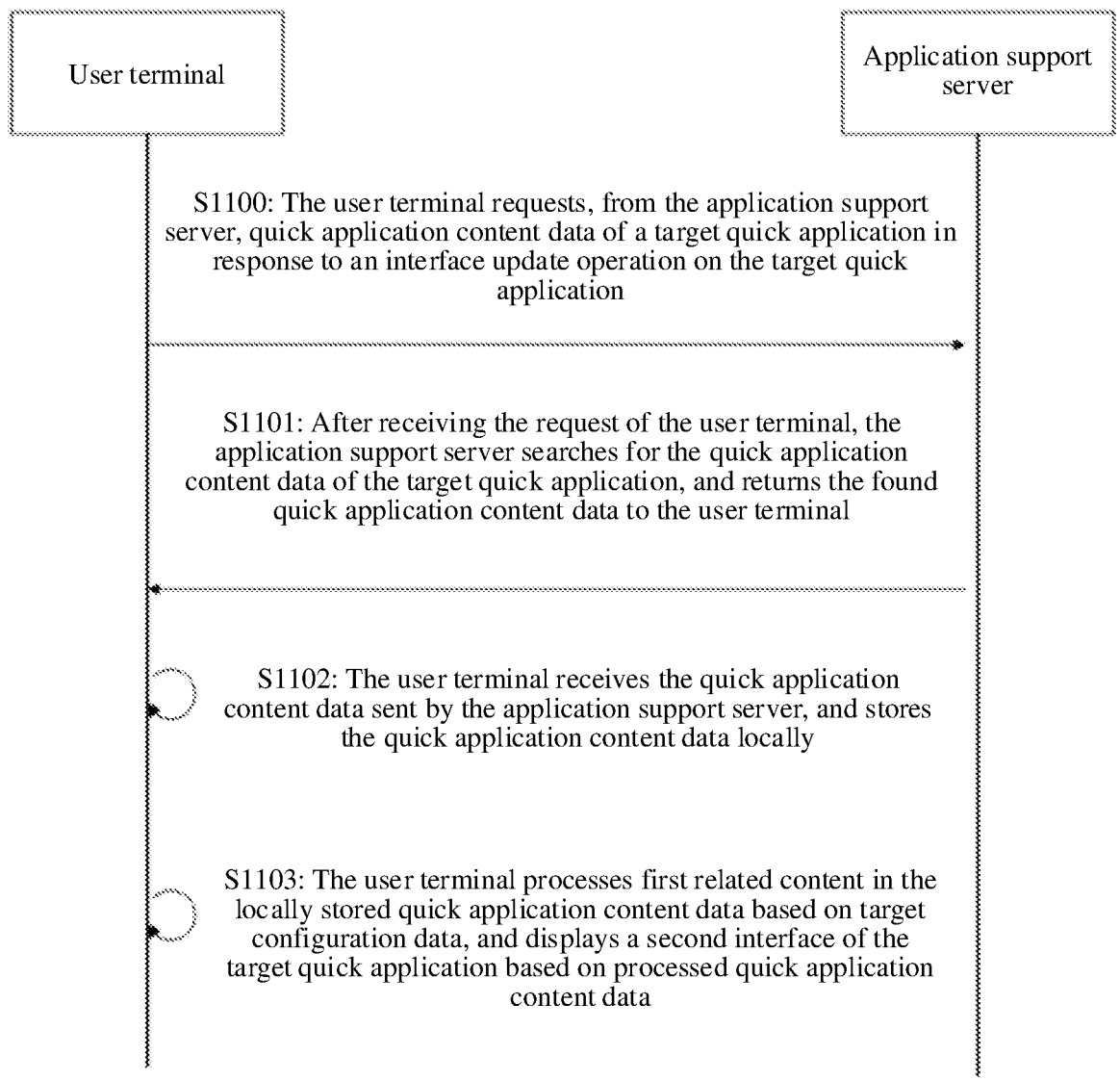
FIG. 10 is a schematic flowchart of a content display method according to an embodiment of this application.

In an optional embodiment of this application, the first related content in the quick application content data may be processed before the target quick application updates the interface each time. As shown in FIG. 10, after S905, this embodiment of this application may further include the following steps.

S1100: The user terminal requests, from the application support server, the quick application content data of the target quick application in response to an interface update operation on the target quick application.

S1101: After receiving the request of the user terminal, the application support server searches for the quick application content data of the target quick application, and returns the found quick application content data to the user terminal.

For descriptions of S1100 and S1101, refer to related descriptions in S903 and S904. Details are not described herein again. However, in this embodiment of this application, only the quick application content data of the target quick application related to the interface update operation may be requested in S1100. That is, only the quick application content data required for updating the interface may be requested. Therefore, in S1101, the application support server may search for only the quick application content data required for updating the interface.

S1102: The user terminal receives the quick application content data sent by the application support server, and stores the quick application content data locally.

In this embodiment of this application, updating the local quick application content data means that the received quick application content data is added to the local quick application content data. In this case, the locally stored quick application content data is updated. The updated quick application content data is the second content data.

S1103: The user terminal processes the first related content in the locally stored quick application content data based on the target configuration data, and displays a second interface of the target quick application based on processed quick application content data.

In this embodiment of this application, the first related content in the second content data is first processed. Therefore, when the interface is updated to obtain the updated second interface, theoretically, the second interface does not include the first related content.

Figure 11:
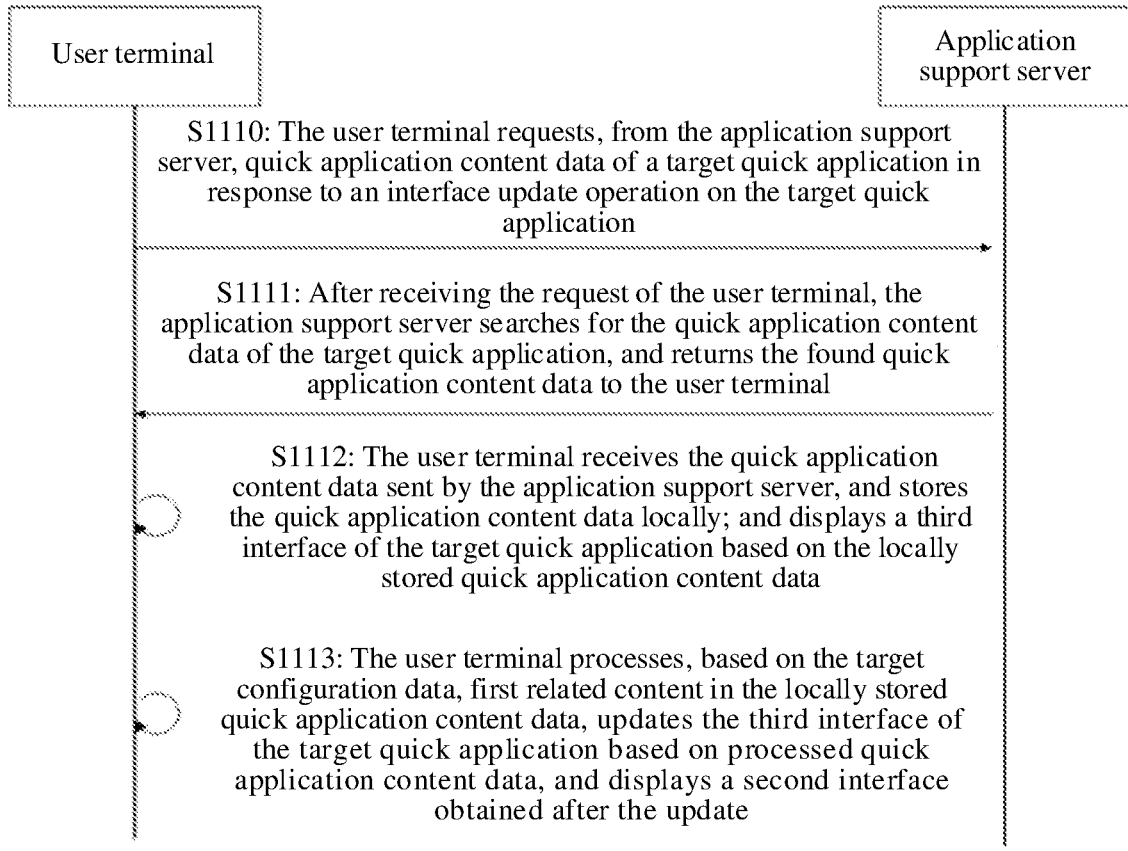
FIG. 11 is a schematic flowchart of a content display method according to an embodiment of this application.

In another optional embodiment of this application, the first related content in the quick application content data may be processed each time after the target quick application updates the interface. As shown in FIG. 11, after S905, this embodiment of this application may further include the following steps.

S1110: The user terminal requests, from the application support server, the quick application content data of the target quick application in response to an interface update operation on the target quick application.

S1111: After receiving the request of the user terminal, the application support server searches for the quick application content data of the target quick application, and returns the found quick application content data to the user terminal.

S1112: The user terminal receives the quick application content data sent by the application support server, and stores the quick application content data locally; and displays a third interface of the target quick application based on the locally stored quick application content data.

S1113: The user terminal processes, based on the target configuration data, the first related content in the locally stored quick application content data, updates the third interface of the target quick application based on the processed quick application content data, and displays a second interface obtained after the update.

For descriptions of S1110 to S1112, refer to related descriptions of S1100 to S1102 (in this case, the third content data is equivalent to the second content data in S1102). However, in this embodiment of this application, after the quick application content data is updated, the target quick application interface is first updated based on the updated third content data. That is, the new third interface is displayed based on the updated third content data. In this case, because the first related content in the third content data is not processed, the obtained third interface may still include the first related content.

To implement processing on the first related content, after the third interface is obtained, the first related content in the third content data is further processed. Then, the interface of the target quick application is updated based on the processed third content data, to obtain a second interface that is updated again. In this case, the second interface theoretically does not include the first related content.

In the embodiments shown in FIG. 1 and FIG. 11, a specific operation type of the interface update operation is not excessively limited, and may be determined based on an actual application scenario. For example, the user may manually refresh the interface, or open a new interface in a process of using the target quick application. Alternatively, the target quick application may automatically update the interface under specific conditions. For example, the interface is refreshed periodically, or functions are associated for jumping to an interface.

In an optional embodiment of this application, based on the embodiment shown in FIG. 9, FIG. 10, or FIG. 11, in a process of using the target quick application, the user terminal may still need to display some to-be-displayed content of the target quick application. For example, the quick application content data may still include other related content in addition to the first related content. In this embodiment of this application, related content other than the first related content in the quick application content data is collectively referred to as the second related content (if the first related content is replaced with other related content, the replaced related content is also the second related content in this embodiment of this application). If the user operates the second related content, the user terminal needs to display the to-be-displayed content associated with the second related content. In this case, reference may be made to FIG. 12. In this embodiment of this application, a process of displaying the to-be-displayed content includes the following steps.

S1120: In response to a trigger operation on the second related content, the user terminal determines the to-be-displayed content associated with the second related content.

In this embodiment of this application, the trigger operation may be a manual trigger operation of the user, for example, a tap operation of the user, or may be an automatic triggering operation on the second related content in the user terminal. For example, in some embodiments, some scheduled triggering tasks may be set to automatically trigger the second related content when a specific time condition (for example, the quick application continuously plays a video for 15 minutes) is met.

In this embodiment of this application, when detecting the trigger operation on the second related content, the user terminal determines that the to-be-displayed content corresponding to the second related content needs to be displayed.

In this case, the to-be-displayed content specifically corresponding to the second related content needs to be determined. For example, it is assumed that the second related content is a download link (referred to as an application download link below) of an application A in the application store A, and the to-be-displayed content is a download interface (referred to as an application download interface below) of the application A in the application store A. When the user taps the application download link, the user terminal detects a tap operation performed by the user on the application download link, and in this case, it is determined that the application download interface corresponding to the application download link needs to be displayed.

After determining the to-be-displayed content that needs to be displayed, the user terminal needs to display the to-be-displayed content. In this embodiment of this application, the to-be-displayed content is displayed in the following two scenarios:

Scenario a: The target configuration data does not include the opening manner of the to-be-displayed content. In this case, a new interface may be directly generated in the target quick application, and the to-be-displayed content is displayed in the new interface.

Scenario b: The target configuration data includes an opening manner of the to-be-displayed content. In this case, the to-be-displayed content needs to be displayed according to the configured opening manner. Therefore, S1121 is performed.

S1121: If the target configuration data includes an opening manner of the to-be-displayed content, the user terminal opens, according to the opening manner of the to-be-displayed content included in the target configuration data, an interface including the to-be-displayed content.

In this embodiment of this application, after determining the to-be-displayed content, the user terminal determines a specific opening manner of the to-be-displayed content based on the target configuration data, for example, directly opening the target quick application, or jumping to a quick application, or jumping to an application program. After a specific opening manner is determined, an interface including the to-be-displayed content is opened according to the opening manner.

Figure 13:
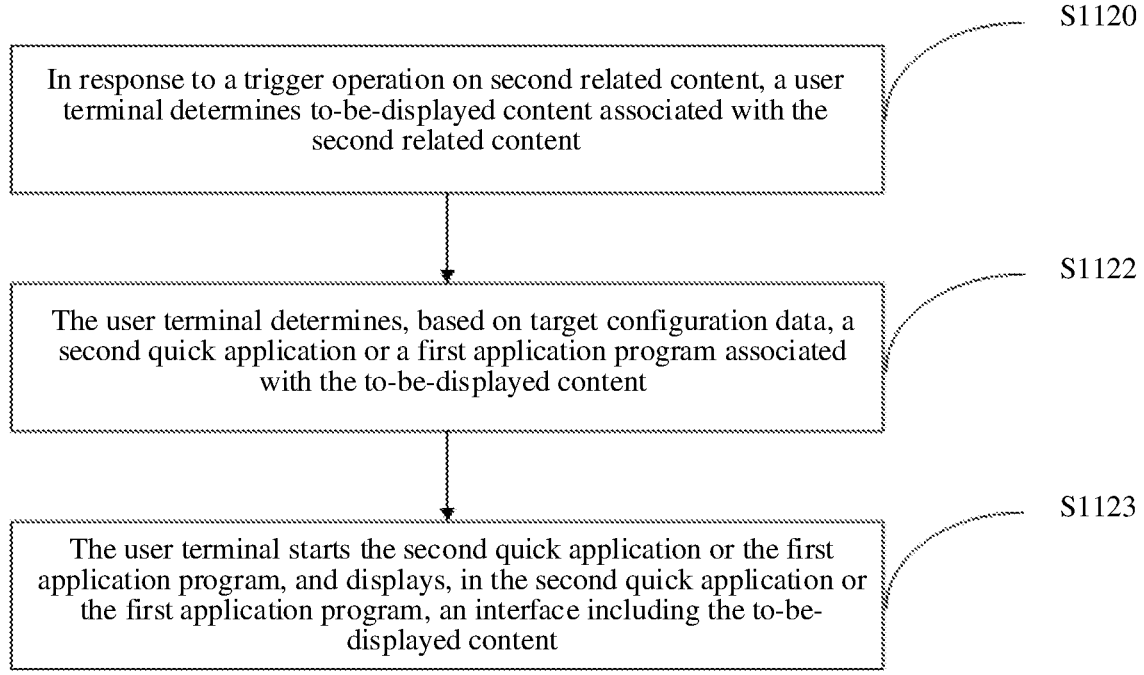
FIG. 13 is a schematic flowchart of a content display method according to an embodiment of this application.

In an embodiment of this application, when the opening manner is opening the to-be-displayed content in a manner other than the target quick application, as shown in FIG. 13, S1121 may be replaced with the following steps:

S1122: The user terminal determines, based on the target configuration data, a second quick application or a first application program associated with the to-be-displayed content.

S1123: The user terminal starts the second quick application or the first application program, and displays, in the second quick application or the first application program, an interface including the to-be-displayed content.

In this embodiment of this application, if a skilled person or a developer configures to open the to-be-displayed content by using another quick application or application program, the user terminal first determines, based on the target configuration data, a specifically used quick application (that is, the second quick application) or an application program (that is, the first application program). Then, the corresponding second quick application or the first application program is started (if the second quick application or the first application program has been started, jump to the corresponding second quick application or the first application program in this case). A new interface is opened in the second quick application or the first application program, and the to-be-displayed content is displayed in the new interface. The second quick application may be a non-browser-type quick application, for example, a video playback application and a shopping application, or may be a browser-type quick application, for example, a Huawei browser quick application. Similarly, the first application program may be a non-browser application program, for example, a video playback application program and a shopping application program, or a browser application program, for example, a Huawei browser application program. Specific situations of the second quick application and the first application program may be set by a skilled person or a developer based on an actual requirement. For example, an appropriate quick application or application program may be set based on an actual type of the to-be-displayed content. If the to-be-displayed content is a commodity sales interface, the second quick application or the first application program may be set as a commodity sales platform quick application or application program. When the to-be-displayed content is a game advertisement interface, the second quick application or the first application program may be a browser-type quick application or application program.

In an optional embodiment of this application, when the to-be-displayed content is an application promotion advertisement, an opening manner may be set to jumping to an application store (that is, the first application program is an application store) for opening. If the to-be-displayed content is a quick application promotion advertisement, the opening manner may be set to jumping to a quick application store (that is, the second quick application is the quick application store) to open the advertisement.

In another optional embodiment of this application, when the to-be-displayed content is a publicity advertisement, the opening manner may be set to jump to the browser to open the advertisement. In this case, the browser may be a browser of an application type or a browser of a quick application type. Correspondingly, the user terminal opens a locally installed application-type browser, or opens a browser of a quick application type by using a platform such as a quick application store, and then uses the opened browser to display the publicity advertisement.

In an optional embodiment of this application, after S1122, if the to-be-displayed content fails to be presented because the second quick application or the first application program cannot be started, or the like, the following operations may be performed based on an actual configuration.

If it is determined in S1122 that the to-be-displayed content is associated with the first application program, and the to-be-displayed content cannot be finally displayed due to a reason such as a failure to start the first application program, in this embodiment of this application, an automatic attempt may be made to start the third quick application to display the to-be-displayed content. A specific quick application type of the third quick application may be set by a skilled person or a developer. This is not excessively limited herein. For example, the third quick application may be some quick applications of a video player type, for example, a Huawei video quick application; or may be some quick applications of a reader type, such as the Huawei reader quick application.

If the to-be-displayed content still cannot be displayed due to a reason such as a startup failure of the third quick application, in this embodiment of this application, the browser may continue to be automatically tried, and the to-be-displayed content is displayed by using the browser. The browser can be an application browser (for example, a system browser delivered with the user terminal) or a quick application browser (for example, Huawei browser quick application).

If it is determined in S1122 that the to-be-displayed content is associated with the second quick application, and because the second quick application cannot be started, the to-be-displayed content cannot be finally displayed, in this embodiment of this application, the browser may continue to be automatically tried, and the to-be-displayed content is displayed by using the browser. The browser can be an application browser (for example, a system browser delivered with the user terminal) or a quick application browser (for example, Huawei browser quick application).

After S1123, if the user does not want to continue to view the to-be-displayed content, the user may close the second quick application or the first application program. In this case, the target quick application still maintains an interface displayed when the trigger operation on the second related content is detected. Therefore, the user may continue to perform an operation on the target quick application before jumping to the second quick application or the first application program. For example, when the target quick application is a game quick application, the user may return to a game interface of the target quick application before jumping to the second quick application or the first application program, and continue the game. The game is not affected at this point.

In an optional embodiment of this application, in the embodiment shown in FIG. 13, if a skilled person or a developer configures to open the to-be-displayed content by using another application program (namely, the first application program), theoretically, the to-be-displayed content may be displayed by using the configured first application program. However, if the first application program is not installed on the user terminal, the user terminal cannot jump to the corresponding first application program in this case. As a result, the to-be-displayed content cannot be displayed by using the first application program. To prevent a case in which the to-be-displayed content cannot be displayed because the first application program is not installed on the user terminal, in this embodiment of this application, a plurality of opening manners of the to-be-displayed content may be set, and a priority sequence of the opening manners may be set. When the to-be-displayed content needs to be displayed, each opening manner is tried in sequence according to a priority order until the to-be-displayed content is successfully displayed.

An example is used for description. In this embodiment of this application, it is set to jump to the first application program to display the to-be-displayed content, and jump to the second application program to display the to-be-displayed content. The priority order is as follows: Jumping to the first application program to display the to-be-displayed content takes precedence over jumping to the second quick application to display the to-be-displayed content. Based on the embodiment shown in FIG. 13, in this case, reference may be made to FIG. 14. S1121 may be:

S1124: The user terminal determines, based on the target configuration data, a first application program and/or a second quick application associated with to-be-displayed content.

S1125: The user terminal starts the first application program.

S1126: If the first application program is successfully started, display, in the first application program, an interface including the to-be-displayed content.

S1127: If the first application program fails to be started, the user terminal starts the second quick application and displays, in the second quick application, an interface including the to-be-displayed content.

In this embodiment of this application, based on different cases of the to-be-displayed content, the application program and the quick application that are associated with the to-be-displayed content, and a priority order of opening the application program and the quick application may be different.

In an optional embodiment of this application, when the to-be-displayed content is a commodity sales advertisement, a commodity promotion advertisement, or a content promotion advertisement, the first application program may be set as an application program client associated with the to-be-displayed content. For example, for a commodity sales advertisement and a commodity promotion advertisement, the first application program may be a shopping application program client, for example, the Vmall application program. For the content promotion advertisement, the first application program may be a reader-type application program or a video playback-type application program. In addition, the second quick application may be set as a quick application associated with the to-be-displayed content, for example, a shopping-type quick application, a reader-type quick application, or a video playback-type quick application. To obtain a better display effect of the to-be-displayed content and facilitate a user operation, it may alternatively be set that the locally installed first application program is opened first. If the first application program fails to be opened because the first application program is not installed locally, the corresponding second quick application is opened again.

An example is used for description. It is assumed that the to-be-displayed content is a commodity sales advertisement. It may be set that the first application program is a Vmall application, and the second quick application is a Vmall quick application. In addition, it is set that using the Vmall app to open the commodity sales advertisement takes precedence over using the Vmall quick application to open the commodity sales advertisement. In this case, the user terminal first attempts to open the Vmall application. If the Vmall application is properly opened, the commodity sales advertisement is displayed in the Vmall application. If the user cannot open the Vmall application because no Vmall application is installed on the user terminal or due to insufficient permission, the user terminal opens the Vmall quick application through a platform such as a quick application center, and then displays the commodity sales advertisement in the Vmall quick application.

After S1126 or S1127, if the user does not want to continue to view the to-be-displayed content, the user may close the second quick application or the first application program. In this case, the target quick application still maintains an interface displayed when the trigger operation on the second related content is detected. Therefore, the user may continue to perform an operation on the target quick application before jumping to the second quick application or the first application program. For example, when the target quick application is a game quick application, the user may return to a game interface of the target quick application before jumping to the second quick application or the first application program, and continue the game. The game is not affected at this point.

Figure 14:
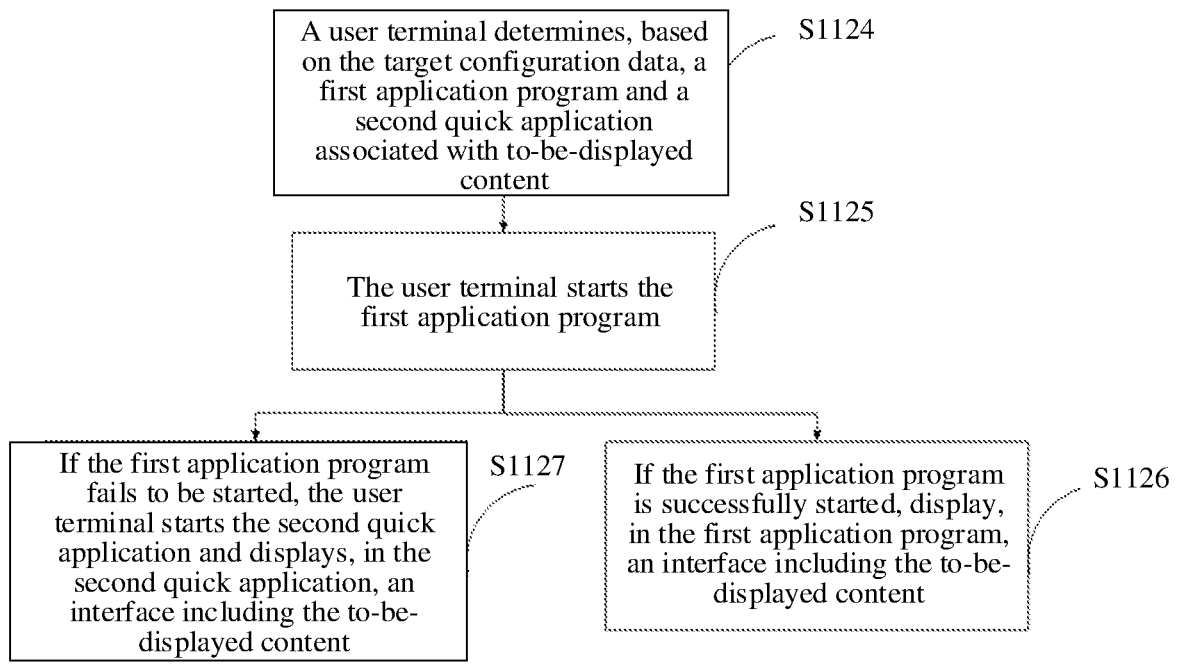
FIG. 14 is a schematic flowchart of a content display method according to an embodiment of this application.

In addition, it should be understood that the embodiment shown in FIG. 14 is merely an example for describing how a plurality of opening manners are set simultaneously. In actual application, other different opening manners may be set. This may be specifically set by a skilled person or a developer based on a requirement. For example, a plurality of application programs may be set as application programs for displaying the to-be-displayed content. In this case, the user terminal may successively attempt to start different application programs to display the to-be-displayed content.

Figure 12:
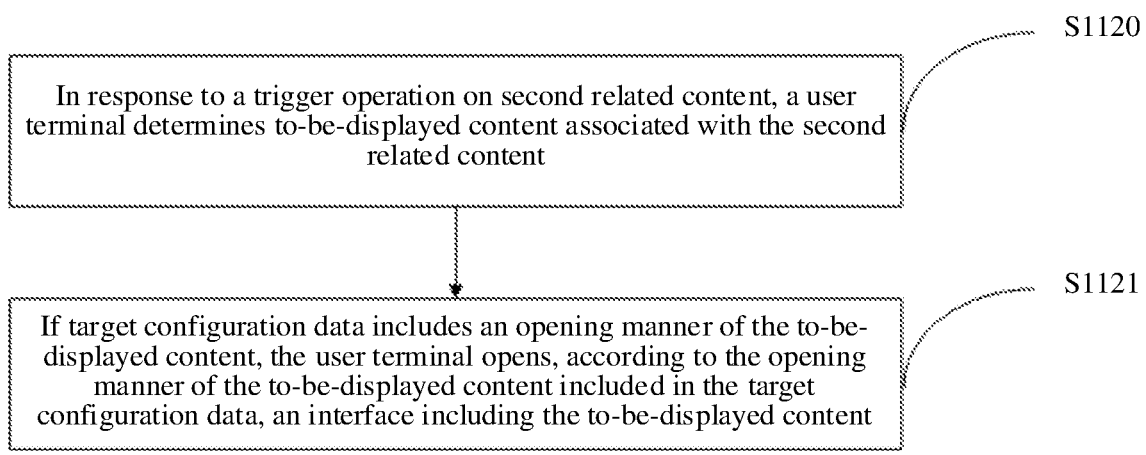
FIG. 12 is a schematic flowchart of a content display method according to an embodiment of this application.
Figures 1, 15:
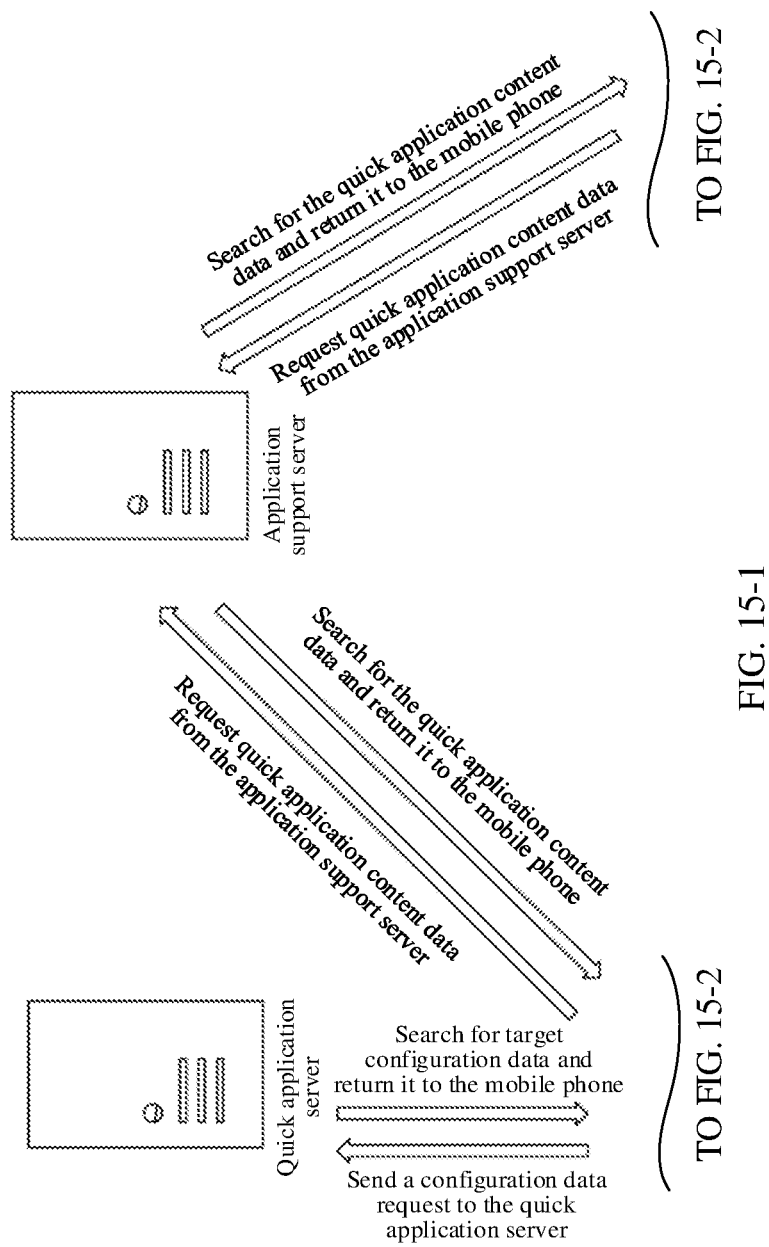
Figures 2, 15:
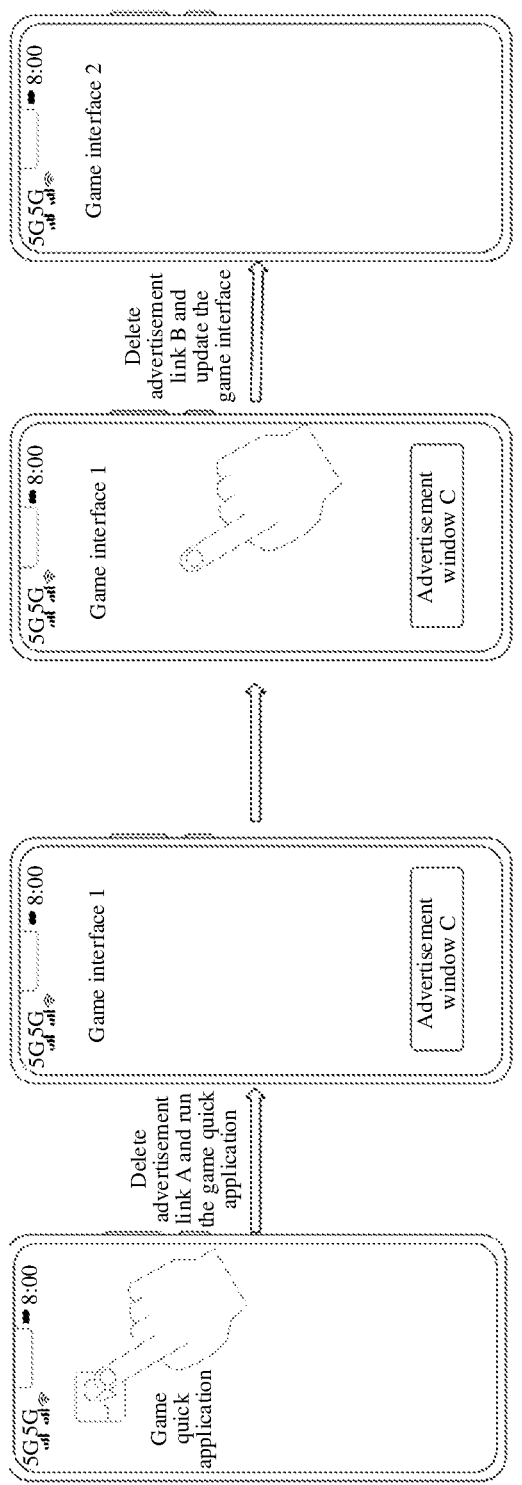
Figures 3, 15:
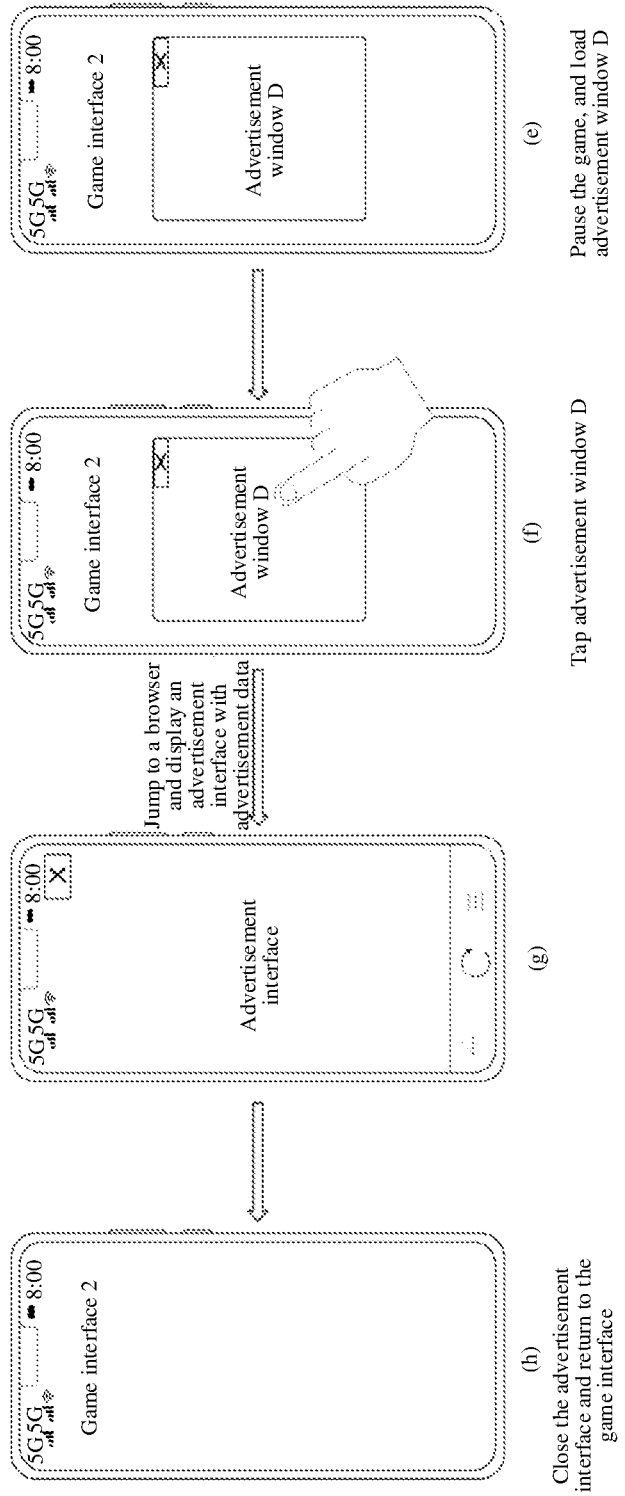

The embodiments shown in FIG. 9, FIG. 12, and FIG. 13 are described by using an example. In this embodiment of this application, the user terminal is a mobile phone. It is assumed that the target quick application is a game quick application, the first related content is an advertisement link A and an advertisement link B, and the second related content is an advertisement link C, an advertisement image associated with the advertisement link C, an advertisement link D, and an advertisement image associated with the advertisement link D. The to-be-displayed content is advertisement data corresponding to the advertisement link D. The developer configures that the advertisement link A and the advertisement link B are deleted, and the advertisement data corresponding to the advertisement link D is opened in a browser. FIG. 15-1 to FIG. 15-3 are a schematic diagram of a scenario according to an embodiment of this application.

As shown in (a) in FIG. 15-2, in this embodiment of this application, the user opens a game quick application. In this case, the mobile phone sends a data configuration request to the quick application server.

The quick application server searches for target configuration data of the game quick application and returns the data to the mobile phone.

After receiving the target configuration data, the mobile phone requests quick application content data from the application support server.

The application support server searches for the quick application content data of the target quick application, and sends the quick application content data to the mobile phone. The quick application content data includes an advertisement link A, an advertisement link C, and an advertisement image associated with the advertisement link C.

As shown in (b) in FIG. 15-2, the mobile phone loads the quick application content data of the game quick application, and deletes the advertisement link A from the quick application content data based on the target configuration data.

When the game quick application is run, the mobile phone displays a game interface 1 of the game quick application. At the same time, the game interface 1 loads an advertisement window C, and the advertisement window C displays an advertisement image associated with the advertisement link C, and is associated with the advertisement link C. The user may trigger the advertisement link C by tapping the advertisement window C, so as to open advertisement data corresponding to the advertisement link C.

As shown in (c) in FIG. 15-2, the user performs an operation on the game interface 1, to trigger update of the game quick application interface. In this case, the mobile phone requests quick application content data from the application support server again.

The application support server searches for the quick application content data of the target quick application, and sends the quick application content data to the mobile phone. The quick application content data includes an advertisement link B, an advertisement link D, and an advertisement image associated with the advertisement link D.

The mobile phone updates local quick application content data by using the received quick application content data, updates the game interface by using the updated quick application content data, and deletes the advertisement link B in the quick application content data based on the target configuration data. An updated game interface 2 is displayed at the same time. As shown in (d) in FIG. 15-2, in this case, the game interface 2 does not include the advertisement link B, and the user cannot trigger the advertisement link B in the game interface 2.

In this embodiment of this application, when the game is paused or ended, the game application displays, in a form of an advertisement window (pop-up window), the advertisement image corresponding to the advertisement link D. As shown in (e) in FIG. 15-3, if the game is paused at this time, the game interface 2 loads an advertisement window D, and the advertisement window D displays an advertisement image associated with the advertisement link D, and is associated with the advertisement link D. As shown in (f) in FIG. 15-3, the user may trigger the advertisement link D by tapping the advertisement window D, so as to open advertisement data corresponding to the advertisement link D.

As shown in (f) and (g) in FIG. 15-3, if the user taps the advertisement window D, the mobile phone starts a browser, jumps from the game quick application to the browser, and opens the advertisement link B by using the browser. The browser displays an advertisement interface including corresponding advertisement data.

If the user does not need to view the advertisement data, the user may close the advertisement interface B and return to the game quick application. As shown in (h) in FIG. 15-3, in this case, the mobile phone continues to run the game quick application in the foreground, and displays a game interface before the advertisement window appears. The user can continue to use the game quick application and operate the previous game interface. In this embodiment of this application, there are at least two manners of closing the advertisement interface. One manner is tapping a close button in the advertisement interface, or closing the browser. The other is to use a back function in the user terminal or the target quick application. (that is, back to the previous interface, also known as a function of returning to the previous page). In both manners, the advertisement interface can be closed, and the game quick application can be returned.

In the embodiments shown in FIG. 9 to FIG. 15-3, a skilled person or a developer may configure, in advance, a manner of opening the to-be-displayed content and a manner of processing the related content of the to-be-displayed content in the quick application server.

In a process of running the quick application, the user terminal obtains, from the quick application server, a manner of processing the related content of the to-be-displayed content in the quick application and a manner of opening the to-be-displayed content, and processes the related content in the quick application according to the processing manner, to remove content that cannot be displayed or used in the pushed content. When the related content needs to be displayed, the processed related content is displayed. On this basis, if the quick application needs to display the to-be-displayed content, the user terminal may open and display the to-be-displayed content based on the processed related content and the opening manner of the to-be-displayed content.

In this embodiment of this application, the user terminal first processes the related content, and deletes, hides, or replaces content that cannot be normally viewed or used in the related content. In one aspect, display of some invalid content in the related content can be avoided, and a probability that the quick application cannot normally respond to a user operation due to content such as an invalid web page link in the related content is reduced. In another aspect, some to-be-displayed content that is invalid or unsuitable for display cannot be linked or opened by using the related content. This avoids a case in which the user mistakenly views, by using the related content, to-be-displayed content that is invalid or unsuitable for display. In this way, a probability of impact on normal use of the quick application by the user is reduced. In addition, the to-be-displayed content is opened in a manner configured by a skilled person or a developer, so that different to-be-displayed content can be opened in an appropriate manner.

In a case in which direct displaying in an overwriting manner on an original interface of the quick application is not suitable, it may be set that the content is opened in another manner other than the quick application, to effectively prevent original interface content on the quick application from being overwritten. After browsing the to-be-displayed content, if the user wants to return to the original interface of the quick application to perform an operation, the user only needs to return to the quick application. The user does not need to worry about the loss of the original interface content or the loss of the original interface. In addition, because the to-be-displayed content is opened in a manner other than the quick application, and the to-be-displayed content is displayed, a compatibility problem of the user terminal for the quick application is not involved. Even if the back function in the user terminal or the quick application is used, the quick application is not closed due to exiting the interface that displays the to-be-displayed content. Therefore, the stability of the quick application can be improved. In a case in which direct displaying in an overwriting manner on an original interface of the quick application is suitable, the to-be-displayed content may be set to be displayed in a manner of generating a new interface in the quick application, or may be set to be opened in another manner other than the quick application. Therefore, this embodiment of this application can be adapted to different display requirements of to-be-displayed content, and impact on normal use of the quick application by the user is greatly reduced.

In addition, the target configuration data of the quick application is independently configured on the server side, so that configuration operations on the to-be-displayed content of the quick application and related content of the to-be-displayed content are more convenient. The skilled person or developer can effectively configure the quick application without modifying original quick application data (for example, original quick application code), which is highly applicable. In addition, by simply modifying the target configuration data or associating a single piece of target configuration data with a plurality of quick applications, one piece of target configuration data is applicable to a plurality of different quick applications. This greatly shortens a quick application configuration period and reduces a configuration workload. Costs of quick application development and management can be effectively reduced.

It should be particularly noted that, in Phase 7 and Phase 8, the content configuration of the quick application and the display operation of the to-be-displayed content are described by using the target quick application as an example (the target quick application is a quick application obtained by converting the website by using the method of Phase 1 to Phase 3). In actual application, content configuration and to-be-displayed content display operations of the quick application in Phase 7 and Phase 8 may also be applicable to a quick application developed by using a method other than Phase 1 to Phase 3. For example, a quick application developed by using a quick application development tool or the like may be used. Specifically, this is excessively limited herein, and may be determined based on an actual application situation.

In an optional embodiment of this application, the target quick application is developed by using the quick application development method in the embodiments shown in FIG. 2A to FIG. 2F. The embodiment shown in FIG. 8 may be used to configure an opening manner of the to-be-displayed content of the target quick application, and configure a related content processing manner of the to-be-displayed content in the target quick application. Alternatively, the embodiments shown in FIG. 9 to FIG. 15-3 may be used to process the related content of the to-be-displayed content in the target quick application, and display the to-be-displayed content corresponding to the target quick application.

Figure 16:
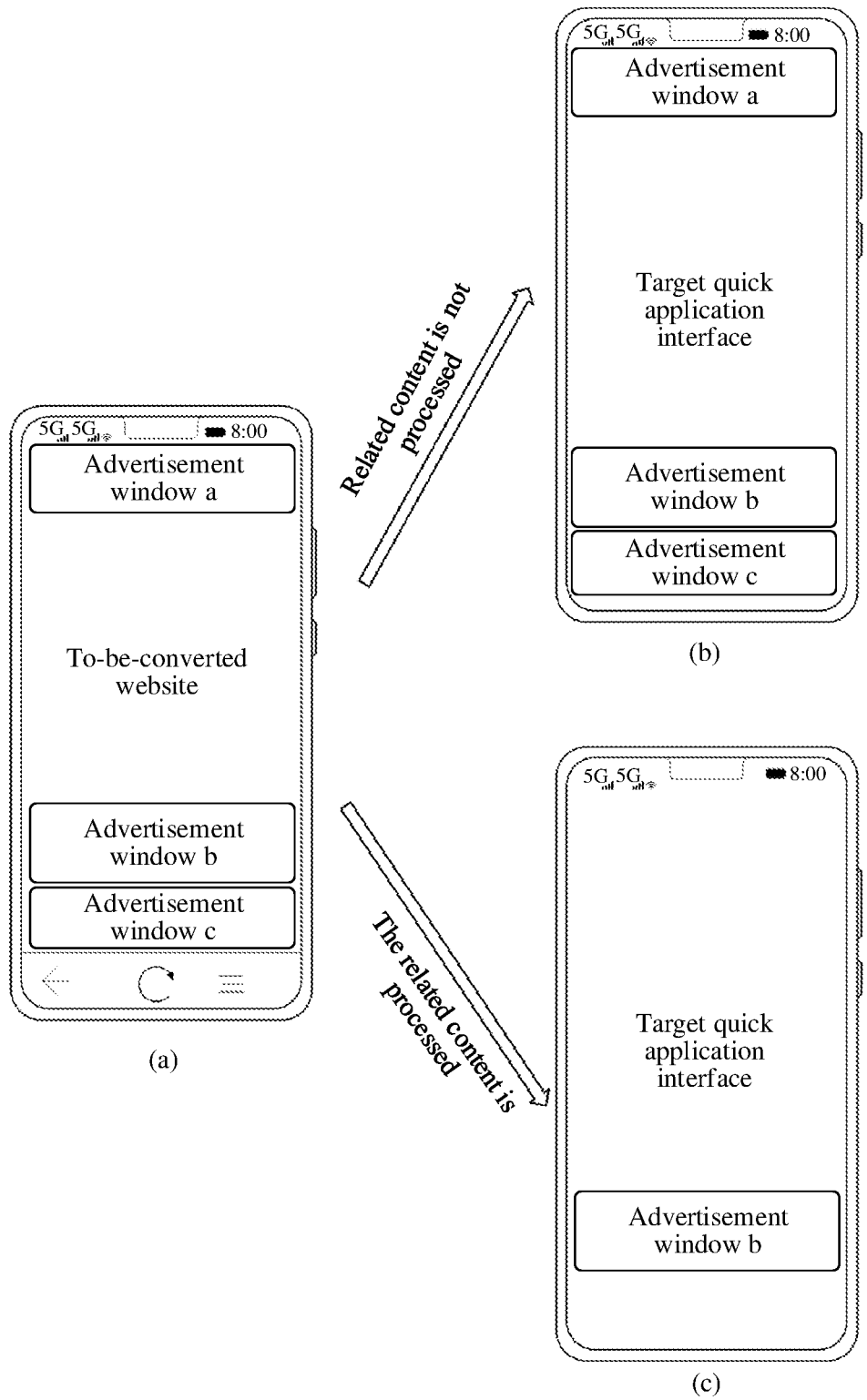
FIG. 16 is a schematic diagram of a scenario of a content display method according to an embodiment of this application.

An example is used for description. FIG. 16 is a schematic diagram of a quick application development and content display scenario according to an embodiment of this application. In this embodiment of this application, the user terminal is a mobile phone. The first related content is an advertisement link a, an advertisement image associated with the advertisement link a, an advertisement link c and an advertisement image associated with the advertisement link c, and the second related content is an advertisement link b and an advertisement image associated with the advertisement link b. The to-be-displayed content is advertisement data corresponding to the advertisement link b. The developer configures that the advertisement link a, the advertisement image associated with the advertisement link a, the advertisement link c, and the advertisement image associated with the advertisement link c are deleted, and the advertisement data corresponding to the advertisement link b is opened in a browser.

(a) in FIG. 16 is an effect of displaying a to-be-converted website in a mobile phone browser. In this case, the to-be-converted website includes three advertisement windows: an advertisement window a, an advertisement window b, and an advertisement window c. The advertisement window a displays the advertisement image associated with the advertisement link a, and is associated with the advertisement link a. The advertisement window b displays the advertisement image associated with the advertisement link b, and is associated with the advertisement link b. The advertisement window c displays the advertisement image associated with the advertisement link c, and is associated with the advertisement link c. The user may trigger an associated advertisement link by tapping an advertisement window, so as to open advertisement data corresponding to the advertisement link, for example, tap the advertisement window b to trigger the associated advertisement link b, so as to open advertisement data corresponding to the advertisement link b.

In this embodiment of this application, the quick application development method in the embodiments shown in FIG. 2A to FIG. 2F is used to convert a to-be-converted website, to obtain a target quick application. (b) in FIG. 16 is a schematic diagram of an interface of an obtained target quick application. In this case, the interface of the target quick application still includes the advertisement window a, the advertisement window b, and the advertisement window c.

When the target quick application is obtained by using the quick application development method in the embodiments shown in FIG. 2A to FIG. 2F, in this embodiment of this application, the content display method in the embodiments shown in FIG. 9 to FIG. 15-3 is further used to process the target quick application. (c) in FIG. 16 is a schematic diagram of an interface of starting the target quick application after the advertisement link a, the advertisement image associated with the advertisement link a, the advertisement link c, and the advertisement image associated with the advertisement link c are deleted. Because the advertisement link a, the advertisement image associated with the advertisement link a, the advertisement link c, and the advertisement image associated with the advertisement link c are deleted, the advertisement window a and the advertisement window c are not displayed in (c) in FIG. 16. In this case, the user cannot trigger the advertisement link a and the advertisement link b.

By comparing (b) in which the related content is not processed with (c) in which the related content is processed in FIG. 16, it can be learned that after the target quick application is obtained by converting the to-be-converted website by using the quick application development method in the embodiments shown in FIG. 2A to FIG. 2F, processing the related content in the target quick application by using the content display method in the embodiments shown in FIG. 9 to FIG. 15-3 can effectively reduce a quantity of advertisement windows in the target quick application, and prevent inappropriate or invalid content from affecting the normal use of the target quick application. Therefore, a display effect of the target quick application is improved, and user experience of using the target quick application is improved.

It should be understood that, in this embodiment of this application, an example in which the to-be-displayed content is advertisement data is merely used for description. In actual application, the to-be-displayed content may alternatively be other data, for example, a media resource. In this case, the related content corresponding to the to-be-displayed content is processed by using the content display method in the embodiments shown in FIG. 9 to FIG. 15-3. An amount of related content displayed in the target quick application can also be reduced. In this way, some inappropriate or invalid related content is prevented from affecting the normal use of the target quick application by the user. Therefore, a display effect of the target quick application is improved, and user experience of using the target quick application is improved.

Figure 17:
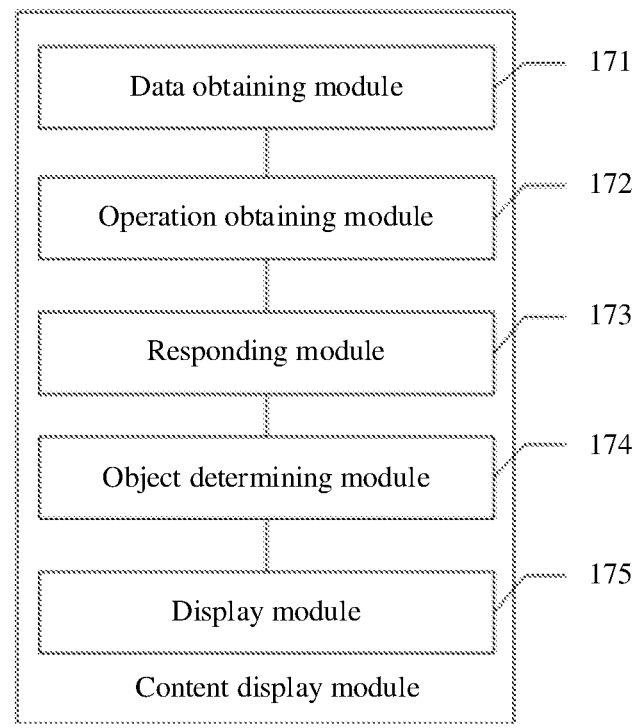
FIG. 17 is a schematic diagram of a structure of a content display apparatus according to an embodiment of this application.

Corresponding to the content display method in the foregoing embodiment, FIG. 17 is a schematic diagram of a structure of a content display apparatus according to an embodiment of this application. For ease of description, only a part related to this embodiment of this application is shown.

As shown in FIG. 17, the content display apparatus includes:
a data obtaining module 171, configured to obtain target configuration data of a target quick application;
an operation obtaining module 172, configured to obtain a trigger operation of the user on the second related content in the target quick application;
a responding module 173, configured to determine to-be-displayed content associated with the second related content in response to the trigger operation;
an object determining module 174, configured to determine, based on the target configuration data, a second quick application and/or a first application program associated with the to-be-displayed content; and
a display module 175, configured to: open the second quick application or the first application program, and display the to-be-displayed content in the second quick application or the first application program.

For a specific process in which each module in the content display apparatus implements a respective function provided in this embodiment of this application, refer to descriptions of steps performed by the user terminal in the embodiments shown in FIG. 9 to FIG. 16 and other related method embodiments. Details are not described herein again.

It should be noted that, content such as information exchange and execution processes between the foregoing apparatuses/units are based on a same concept as those in the method embodiments of this application. For specific functions and brought technical effects of the foregoing apparatuses/units, refer to the method embodiments. Details are not described herein again.

It should be understood that a sequence number of each step in the foregoing embodiments does not mean a sequence of execution, and should not constitute any limitation on an implementation process of the embodiments of this application. An execution sequence of each process should be determined by its function and internal logic.

It should be understood that the term "include"/"comprise" when used in the specification of this application and the appended claims indicates the presence of the described features, wholes, steps, operations, elements, and/or components, but does not preclude the presence or addition of one or more other features, wholes, steps, operations, elements, components, and/or collections thereof.

It should also be understood that the term "and/or" as used in the specification of this application and the appended claims refers to any combination of one or more of associated items and all possible combinations, and includes such combinations.

As used in the specification of this application and the appended claims, the term "if" may be interpreted as "when" or "once" or "in response to determining" or "in response to detecting" depending on the context. Similarly, the phrase "if it is determined" or "if [described condition or event] is detected" may be interpreted, depending on the context, to mean "once determined" or "in response to determining" or "once [described condition or event] is detected" or "in response to detecting [described condition or event]".

In addition, in the description of the specification of this application and the appended claims, the terms "first", "second", "third", and the like are merely used for distinguishing descriptions, but cannot be understood as indicating or implying relative importance. It should be further understood that although the terms "first", "second", and the like are used in text to describe various elements in some embodiments of this application, these elements should not be limited by these terms. These terms are simply used to distinguish one element from another. For example, the first table may be named the second table, and similarly, the second table may be named the first table without departing from the scope of the various described embodiments. The first table and the second table are both tables, but they are not the same table.

Reference to "an embodiment", "some embodiments", or the like described in the specification of this application indicates that one or more embodiments of this application include a specific feature, structure, or characteristic described with reference to those embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In the quick application generation method provided in this embodiment of this application, the first developer terminal may be a terminal device such as a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the first developer terminal is not limited in this embodiment of this application.

As an example instead of a limitation, when the first developer terminal is a wearable device, the wearable device may alternatively be a general name of wearable devices developed by intelligently designing daily wear by using a wearable technology, for example, glasses, gloves, a watch, clothing, and shoes. The wearable device is a portable device that is directly worn on the body or integrated into clothes or accessories of the user. Wearable devices are not only hardware devices, but also powerful functions through software support, data interaction, and cloud interaction. In a broad sense, the wearable smart device includes a device, such as a smartwatch or smart glasses, with full functions and a large size that can implement complete or partial functions without relying on a smartphone, and a device, such as a smart bracelet and smart jewelry for physical sign monitoring, that focuses only on a specific type of application function and needs to be used together with another device, for example, a smartphone.

Figure 18:
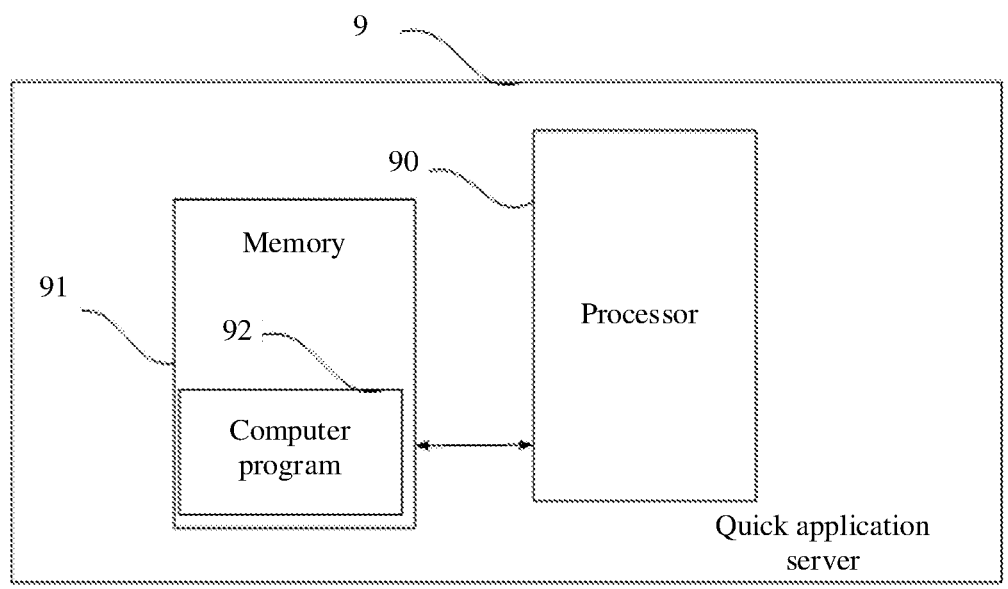
FIG. 18 is a schematic diagram of a structure of a quick application server according to an embodiment of this application.

FIG. 18 is a schematic diagram of a structure of a quick application server according to an embodiment of this application. As shown in FIG. 18, the quick application server 9 in this embodiment includes: at least one processor 90 (only one processor is shown in FIG. 18) and a memory 91. The memory 91 stores a computer program 92 that can be run on the processor 90. When executing the computer program 92, the processor 90 implements the steps in the foregoing quick application generation method embodiments or the content display method embodiments, for example, the steps performed by the quick application server in the steps shown in FIG. 2B-1 and FIG. 2B-2.

The quick application server may include, but is not limited to, the processor 90 and the memory 91. A person skilled in the art may understand that FIG. 18 is merely an example of the quick application server 9, and does not constitute a limitation on the quick application server 9. The quick application server 9 may include more or fewer components than those shown in the figure, or a combination of some components, or different components. For example, the quick application server may further include an input sending device, a network access device, a bus, and the like.

The processor 90 may be a central processing unit (Central Processing Unit, CPU), or may be another general-purpose processor, a digital signal processor (Digital Signal Processor, DSP), or an application specific integrated circuit (Application Specific Integrated Circuit, ASIC), a field-programmable gate array (Field-Programmable Gate Array, FPGA) or another programmable logic device, a discrete gate or transistor logic device, a discrete hardware component, or the like. The general-purpose processor may be a microprocessor, or the processor may be any conventional processor, or the like.

In some embodiments, the memory 91 may be an internal storage unit of the quick application server 9, for example, a hard disk or a memory of the quick application server 9. Alternatively, the memory 91 may be an external storage device of the quick application server 9, for example, a plug-in hard disk, a smart media card (Smart Media Card, SMC), a secure digital (Secure Digital, SD) card, a flash card (Flash Card), or the like that is provided on the quick application server 9. Further, the memory 91 may further include both an internal storage unit of the quick application server 9 and an external storage device. The memory 91 is configured to store an operating system, an application program, a boot loader (BootLoader), data, another program, and the like, for example, program code of the computer program. The memory 91 may be further configured to temporarily store data that has been sent or is to be sent.

Figure 19:
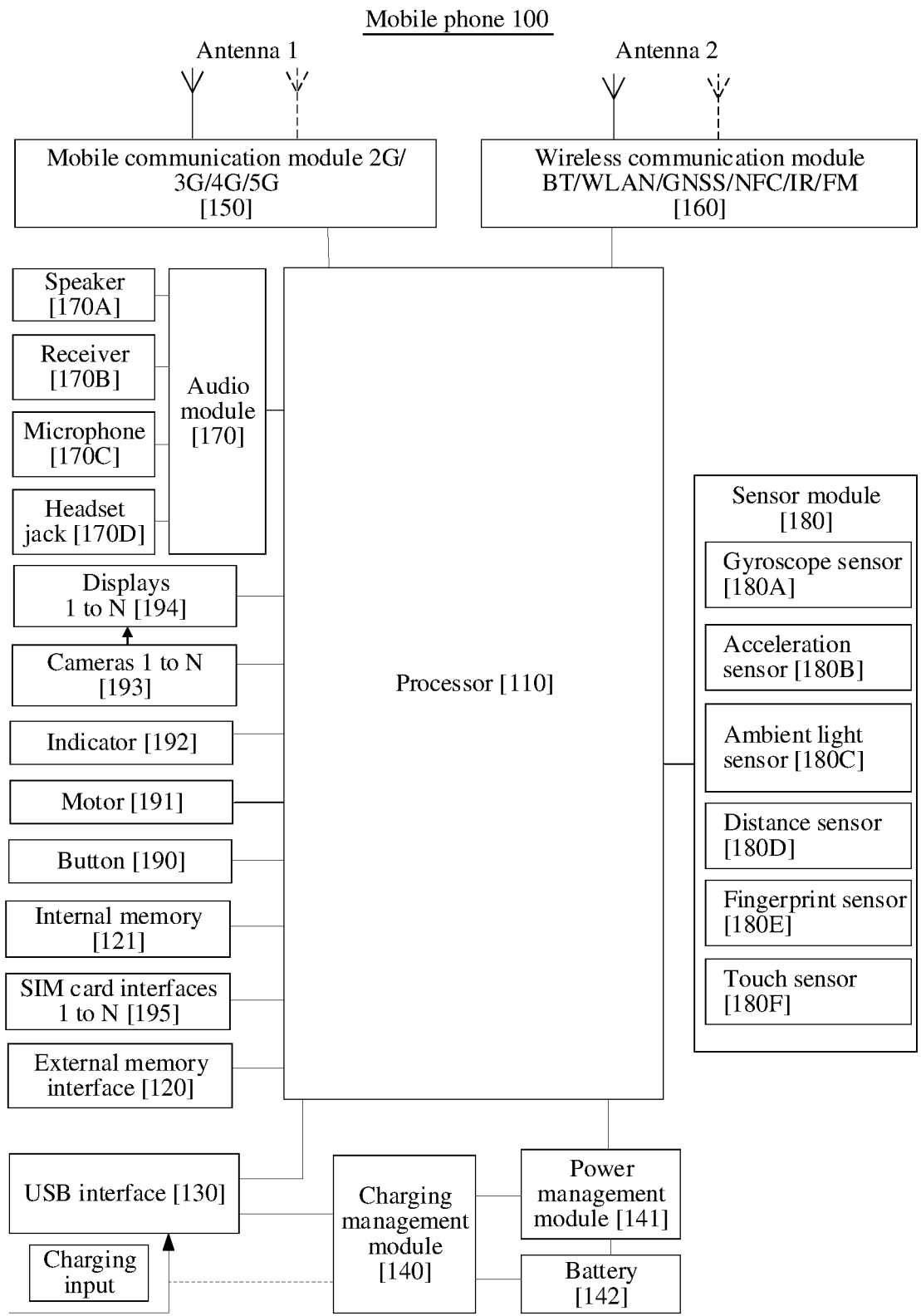
FIG. 19 is a schematic diagram of a structure of a mobile phone to which a quick application login method for a sensor is applicable according to an embodiment of this application.

The following uses an example in which the terminal device (that is, the user terminal in FIG. 7A to FIG. 13) is a mobile phone. FIG. 19 is a schematic diagram of a structure of a mobile phone 100.

The mobile phone 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, an SIM card interface 195, and the like. The sensor module 180 may include a gyroscope sensor 180A, an acceleration sensor 180B, an ambient optical sensor 180C, a distance sensor 180D, a fingerprint sensor 180E, and a touch sensor 180F (certainly, the mobile phone 100 may further include another sensor, for example, a temperature sensor, a pressure sensor, a barometric pressure sensor, or a bone conduction sensor, which is not shown in the figure).

It may be understood that the structure shown in this embodiment of the present invention does not constitute a specific limitation on the mobile phone 100. In other embodiments of this application, the mobile phone 100 may include more or fewer components than those shown in the figure, or some components may be combined, or some components may be split, or components are arranged in different manners. The illustrated components may be implemented by hardware, software, or a combination of software and hardware.

The processor 110 may include one or more processing units, for example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (Neural-network Processing Unit, NPU), and/or the like. Different processing units may be independent components, or may be integrated into one or more processors. The controller may be a neural center and a command center of the mobile phone 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

The processor 110 may run the quick application login method provided in the embodiment of this application, to simplify a quick application user login function, improve user login efficiency, and improve user experience. The processor 110 may include different components. For example, when a CPU and a GPU are integrated, the CPU and the GPU may cooperate to perform the quick application login method provided in the embodiment of this application. For example, in the quick application login method, some algorithms are executed by the CPU, and the other algorithms are executed by the GPU, to obtain relatively fast processing efficiency.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the mobile phone 100 may include one or N displays 194, where N is a positive integer greater than 1. The display 194 may be configured to display information entered by the user or information provided to the user and various graphical user interfaces (graphical user interface, GUI). For example, the display 194 may display a photo, a video, a web page, a file, or the like. For another example, the display 194 may display a graphical user interface, such as a user login interface. The graphical user interface includes a status bar, a navigation bar that can be hidden, a time and weather widget (widget), and an application icon, for example, a browser icon. The status bar includes a carrier name (for example, China Mobile), a mobile network (for example, 4G), time, and a remaining battery level. The navigation bar includes a back (back) button icon, a home (home) button icon, and a forward button icon. In addition, it may be understood that, in some embodiments, the status bar may further include a Bluetooth icon, a Wi-Fi icon, an external device icon, and the like. It may be further understood that, in some other embodiments, the graphical user interface may further include a Dock bar, and the Dock bar may include a common application icon or the like. After detecting a touch event of a finger (or a stylus or the like) of a user on an application icon, the processor opens, in response to the touch event, a user interface of an application corresponding to the application icon, and displays the user interface of the application on the display 194.

In this embodiment of this application, the display 194 may be an integrated flexible display, or may be a spliced display formed by two rigid screens and one flexible screen located between the two rigid screens. After the processor 110 runs the quick application login method provided in this embodiment of this application, the processor 110 may control the external audio output device to switch an output audio signal.

The mobile phone 100 implements a display function by using the GPU, the display 194, the application processor, and the like. The GPU is a microprocessor for image processing, and connects the display 194 and the application processor. The GPU is configured to perform mathematical and geometrical calculation, and is configured to perform graphics rendering. The processor 110 may include one or more GPUs that execute program instructions to generate or change display information.

The internal memory 121 may be configured to store computer-executable program code. The executable program code includes instructions. The processor 110 executes various functional applications of the mobile phone 100 and data processing by running instructions stored in the internal memory 121. The internal memory 121 may include a program storage area and a data storage area. The program storage area may store an operating system, code of a quick application, and the like. The data storage area may store data created in a process of using the mobile phone 100 (for example, an image or a video collected by a camera application, or login information and authentication information received by a quick application) or the like.

The internal memory 121 may further store one or more computer programs corresponding to the quick application login method provided in this embodiment of this application. The one or more computer programs are stored in the memory 121 and are configured to be executed by the one or more processors 110. The one or more computer programs include instructions, and the instructions may be used to perform steps in corresponding embodiments in FIG. 7A to FIG. 7E-1 and FIG. 7E-2. The computer program may include an account verification module and a priority comparison module. The account verification module is configured to attempt to authenticate a system authentication account of another terminal device in the local area network. The priority comparing module may be configured to compare a priority of an audio output request service with a priority of a current output service of the audio output device. A status synchronizing module may be configured to synchronize a device status of an audio output device currently connected to the terminal device to another terminal device, or synchronize a device status of an audio output device currently connected to another device to a local device. When the processor 110 runs the code of the quick application login method stored in the internal memory 121, the processor 110 may control the mobile phone to process login information and authentication information.

In addition, the internal memory 121 may include a high-speed random access memory, or may include a non-volatile memory, for example, at least one magnetic disk storage device, a flash memory, or a universal flash storage (universal flash storage, UFS).

Certainly, the code of the quick application login method provided in this embodiment of this application may alternatively be stored in an external memory. In this case, the processor 110 may run, by using the external memory interface 120, code of the quick application login method stored in the external memory, and the processor 110 may control the terminal device to process login information and authentication information.

For example, the display 194 of the mobile phone 100 displays a home screen, and the home screen includes icons of a plurality of quick applications. The user taps, by using the touch sensor 180K, an icon of a camera quick application in the home screen, to trigger the processor 110 to start the camera quick application and start the camera 193. The display 194 displays an interface of the camera application, for example, a viewfinder interface. For another example, the user taps, by using the touch sensor 180K, an icon of a social quick application on the home screen, to trigger the processor 110 to start the social quick application. The display 194 displays an interface of the social quick application, for example, a user login interface.

A wireless communication function of the mobile phone 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the mobile phone 100 may be configured to cover a single or a plurality of communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution, including 2G/3G/4G/5G or the like, that is applied to the mobile phone 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110. In this embodiment of this application, the mobile communication module 150 may be further configured to exchange information with another terminal device, that is, send user login related data to the another terminal device, or the mobile communication module 150 may be configured to receive login information or authentication information and encapsulate the received login information or authentication information into a message in a specified format.

The modem processor may include a modulator and a demodulator. The modulator is configured to modulate a to-be-sent low-frequency baseband signal into an intermediate-and-high frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 170A, the receiver 170B, or the like), or displays an image or a video on the display 194. In some embodiments, the modem processor may be an independent device. In other embodiments, the modem processor may be independent of the processor 110 and disposed in the same device as the mobile communication module 150 or other functional modules.

The wireless communication module 160 may provide a solution to wireless communication applied to the mobile phone 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2. In this embodiment of this application, the wireless communication module 160 may be configured to access an access point device, and send a message to and receive a message from another terminal device.

In some embodiments, the antenna 1 of the mobile phone 100 is coupled to the mobile communication module 150, and the antenna 2 is coupled to the wireless communication module 160, so that the mobile phone 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

In addition, the mobile phone 100 may implement audio functions by using the audio module 170, the speaker 170A, the receiver 170B, the microphone 170C, the headset jack 170D, the application processor, and the like. The audio functions are, for example, music playback and recording. The mobile phone 100 may receive an input from the button 190, and generate a button signal input related to user setting and function control of the mobile phone 100. The mobile phone 100 may generate a vibration prompt (for example, an incoming call vibration prompt) by using the motor 191. The indicator 192 in the mobile phone 100 may be an indicator light, and may be configured to indicate a charging status and a power change, or may be configured to indicate a message, a missed call, a notification, and the like. The SIM card interface 195 in the mobile phone 100 is configured to connect to a SIM card. The SIM card may be inserted into the SIM card interface 195 or pulled out of the SIM card interface 195, so that the SIM card is in contact with or separated from the mobile phone 100.

It should be understood that, in actual application, the mobile phone 100 may include more or fewer components than those shown in FIG. 19. This is not limited in this embodiment of this application. The mobile phone 100 shown in the figure is merely an example, and the mobile phone 100 may have more or fewer components than those shown in the figure, or two or more components may be combined, or components are configured in different manners. The various components shown in the figure may be implemented in hardware including one or more signal processing and/or application-specific integrated circuits, software, or a combination of hardware and software.

Figure 20:
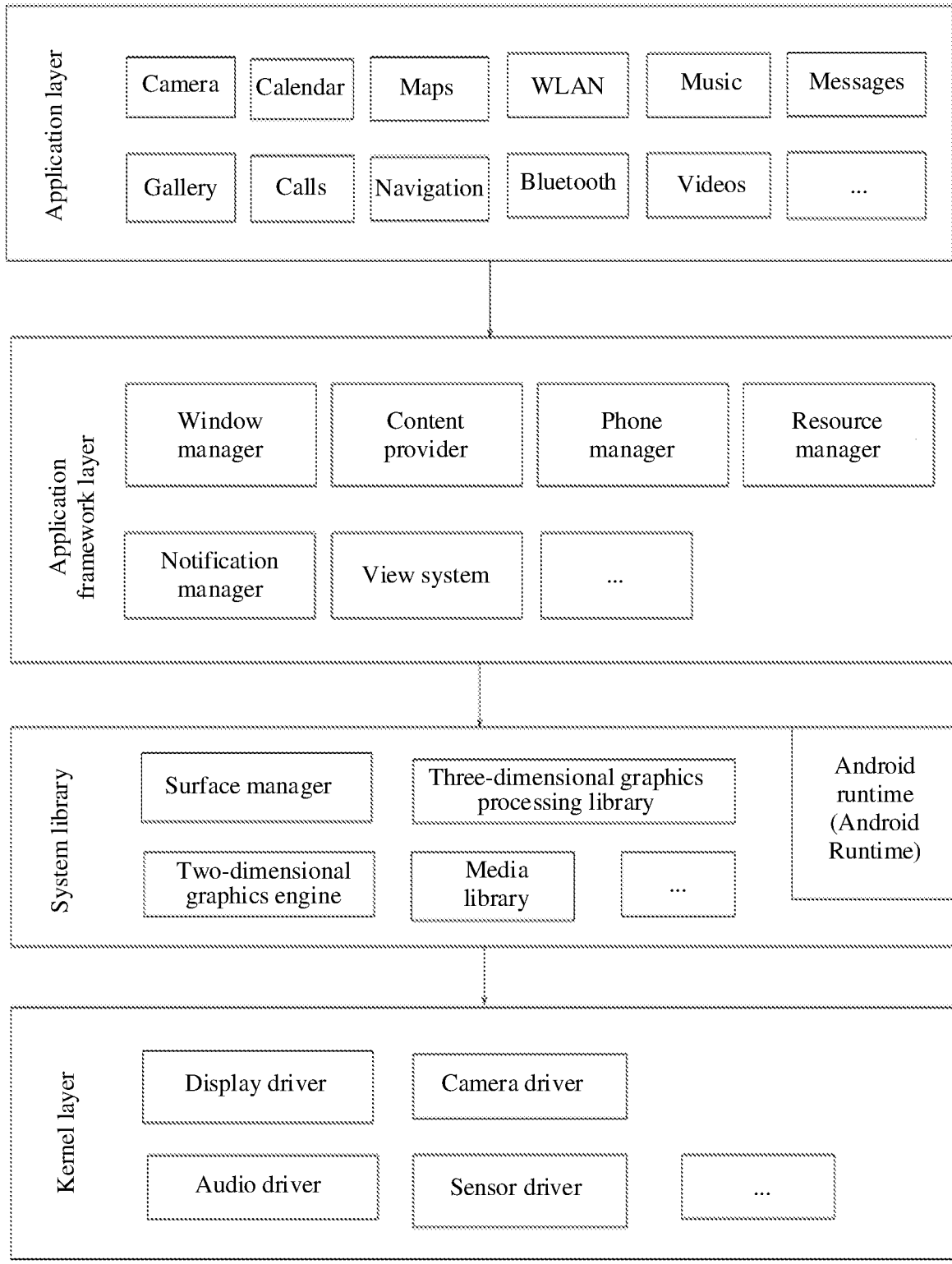
FIG. 20 is a block diagram of a software structure of a terminal device according to an embodiment of this application.

A software system of the terminal device (that is, the user terminal in FIG. 7A to FIG. 16) may use a hierarchical architecture, an event-driven architecture, a microkernel architecture, a microservice architecture, or a cloud architecture. In embodiments of the present invention, an Android system with a layered architecture is used as an example to describe a software structure of the terminal device. FIG. 20 is a block diagram of a software structure of a terminal device according to an embodiment of this application.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and a system library, and a kernel layer.

The application layer may include a series of application packages.

As shown in FIG. 20, the application packages may include applications such as Phone, Camera, Gallery, Calendar, Calls, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 20, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is used to store and obtain data and make the data accessible to an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is used to provide a communication function of the terminal device, for example, management of a call status (including answering, declining, or the like).

The resource manager provides various resources for the application, such as a localized string, an icon, an image, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The Android Runtime includes a kernel library and a virtual machine. The Android runtime is responsible for scheduling and management of the Android system.

The kernel library includes two parts: a function that needs to be called in Java language and a kernel library of Android.

The application layer and the application framework layer run in the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), media libraries (Media Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, such as: MPEG-4, H.164, MP3, AAC, AMR, JPG, PNG, and the like.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of working procedures of software and hardware of the mobile phone 100 with reference to a scenario in which the mobile phone 100 performs quick application login.

When the touch sensor 180K receives a touch operation, a corresponding hardware interrupt is sent to the kernel layer. The kernel layer processes the touch operation into an original input event, and the original input event is stored in the kernel layer. The application framework layer obtains the original input event from the kernel layer, and responds to the original input event by invoking the resource manager in the application framework layer to implement user login to the quick application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

An embodiment of this application further provides a quick application server. The quick application server includes at least one memory, at least one processor, and a computer program that is stored in the at least one memory and that can be run on the at least one processor. When the processor executes the computer program, the quick application server is enabled to implement the steps that the quick application server is responsible for in any one of the foregoing method embodiments.

An embodiment of this application further provides a terminal device. The terminal device includes at least one memory, at least one processor, and a computer program that is stored in the at least one memory and that can be run on the at least one processor. When the processor executes the computer program, the terminal device is enabled to implement the steps that the user terminal is responsible for in any one of the foregoing method embodiments.

An embodiment of this application further provides a computer-readable storage medium. The computer-readable storage medium stores a computer program. When the computer program is executed by a processor, the steps performed by the quick application server in the foregoing method embodiments can be implemented, or the steps performed by the user terminal in the foregoing method embodiments can be implemented.

An embodiment of this application provides a computer program product. When the computer program product runs on a terminal device, the terminal device is enabled to implement the steps performed by the quick application server in the foregoing method embodiments, or implement the steps performed by the user terminal in the foregoing method embodiments.

An embodiment of this application further provides a chip system. The chip system includes a processor, the processor is coupled to a memory, and the processor executes a computer program stored in the memory, to implement the steps performed by the quick application server in the foregoing method embodiments, or implement the steps performed by the user terminal in the foregoing method embodiments.

When the integrated module/unit is implemented in the form of the software functional unit and sold or used as an independent product, the integrated module/unit may be stored in a computer-readable storage medium. Based on this understanding, all or some of the processes in the methods in the foregoing embodiments may be implemented in this application by a computer program instructing related hardware. The computer program may be stored in a computer-readable storage medium. When the computer program is executed by a processor, the steps of the foregoing method embodiments may be implemented. The computer program includes computer program code, and the computer program code may be in a source code form, an object code form, an executable file, an intermediate form, or the like. The computer-readable storage medium may include: any entity or apparatus capable of carrying the computer program code, a recording medium, a USB flash drive, a removable hard disk, a magnetic disk, an optical disc, a computer memory, a read-only memory (Read-Only Memory, ROM), a random access memory (Random Access Memory, RAM), electrical carrier signals, telecommunications signals, and software distribution media.

In the foregoing embodiments, description of each embodiment has its own focus. For a part that is not described or recorded in detail in an embodiment, reference may be made to related descriptions in another embodiment.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

The foregoing embodiments are merely used to describe the technical solutions of this application, but not to limit the technical solutions. Although this application is described in detail with reference to the foregoing embodiments, a person of ordinary skill in the art should understand that: The technical solutions described in the foregoing embodiments may still be modified, or some technical features thereof may be equivalently replaced. These modifications or replacements do not deviate from the spirit and scope of the technical solutions in the embodiments of this application, and shall fall within the protection scope of this application.

Finally, it should be noted that: the foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A content display method, comprising:
obtaining target configuration data for a target quick application, wherein the target configuration data comprises configuration data of an opening manner of to-be-displayed content and configuration data of a processing manner of related content of the to-be-displayed content;
processing the related content according to the processing manner to obtain processed related content;
obtaining a trigger operation performed by a user on second related content in the target quick application;
determining, in response to the trigger operation, the to-be-displayed content associated with the second related content;
determining, based on the target configuration data, at least one of a second quick application, or a first application program that is associated with the to-be-displayed content;
opening the second quick application or the first application program; and
displaying, based on the processed related content, the to-be-displayed content in the second quick application or the first application program,
wherein the related content and the second related content is data content that is related to the to-be-displayed content and that is able to be used to display the to-be-displayed content in an associating manner after being triggered.

2. The content display method according to claim 1, wherein obtaining the target configuration data for the target quick application comprises:
obtaining the target configuration data for the target quick application from a quick application server.

3. The content display method according to claim 2, wherein obtaining the target configuration data for the target quick application comprises:

obtaining a start operation performed by the user on the target quick application; and obtaining the target configuration data for the target quick application from the quick application server in response to the start operation.

4. The content display method according to claim 3, further comprising:

obtaining first quick application content data of the target quick application in response to the start operation;

determining, from the first quick application content data, first related content associated with the target configuration data;

processing the first related content in the first quick application content data based on the target configuration data; and displaying a quick application interface of the target quick application based on second quick application content data obtained through processing.

5. The content display method according to claim 1, further comprising:

obtaining an interface update operation performed by the user on the target quick application;

obtaining third quick application content data of the target quick application in response to the interface update operation;

determining, from the third quick application content data, first related content associated with the target configuration data;

processing the first related content in the third quick application content data based on the target configuration data; and displaying a second interface of the target quick application based on fourth quick application content data obtained through processing.

6. The content display method according to claim 1, further comprising:

obtaining an interface update operation performed by the user on the target quick application;

obtaining third quick application content data of the target quick application in response to the interface update operation;

displaying a third interface of the target quick application based on the third quick application content data;

determining, from the third quick application content data, first related content associated with the target configuration data;

processing the first related content in the third quick application content data based on the target configuration data;

updating the third interface based on fourth quick application content data obtained through processing; and displaying a second interface obtained after the update.

7. The content display method according to claim 4, wherein processing the first related content in the first quick application content data based on the target configuration data comprises skipping displaying the first related content based on the target configuration data.

8. The content display method according to claim 7, wherein skipping displaying the first related content based on the target configuration data comprises:

performing, based on the target configuration data, one of deleting the first related content, hiding the first related content, or replacing the first related content with preset content.

9. The content display method according to claim 7, wherein the target configuration data further comprises a preset script, and the preset script records a processing manner for the first related content; and wherein skipping displaying the first related content based on the target configuration data comprises skipping displaying, by running the preset script in the target configuration data, the first related content.

10. The content display method according to claim 1, wherein the first application program is recorded in the target configuration data;

wherein determining, based on the target configuration data, at least one of the second quick application or the first application program that is associated with the to-be-displayed content comprises determining, based on the target configuration data, the first application program that is associated with the to-be-displayed content; and wherein the method further comprises:

opening, based on the first application program failing to be opened, a third quick application, and displaying the to-be-displayed content in the third quick application; and opening, based on the third quick application failing to be opened, a browser, and displaying the to-be-displayed content in the browser.

11. The content display method according to claim 1, wherein the target configuration data records the second quick application and the first application program, and wherein the target configuration data records a priority of the first application program and a priority of the second quick application; and wherein determining, based on the target configuration data, at least one of the second quick application or the first application program that is associated with the to-be-displayed content, and opening the second quick application or the first application program and displaying the to-be-displayed content in the second quick application or the first application program comprises:

determining, based on the target configuration data, the second quick application and the first application program that are associated with the to-be-displayed content;

determining, from the second quick application and the first application program, a first object with a highest priority; and opening the first object, and displaying the to-be-displayed content in the first object.

12. The content display method according to claim 1, further comprising, after the displaying the to-be-displayed content:

detecting a closing operation of the user on the to-be-displayed content; and returning to the target quick application in response to the closing operation.

13. The content display method according to claim 1, wherein the to-be-displayed content is a commodity sales advertisement or a commodity promotion advertisement, the second quick application is a shopping-type quick application, and the first application program is a shopping-type application program.

14. The content display method according to claim 1, wherein the to-be-displayed content is advertisement data, the second quick application is a browser-type quick application, and the first application program is a browser-type application program.

15. An terminal device, comprising:

at least one processor; and at least one non-transitory computer-readable storage medium storing a program to be executed by the at least one processor, the program including instructions to:
obtain target configuration data for a target quick application, wherein the target configuration data comprises configuration data of an opening manner of to-be-displayed content and configuration data of a processing manner of related content of the to-be-displayed content;
process the related content according to the processing manner to obtain processed related content;
obtain a trigger operation performed by a user on second related content in the target quick application;
determine, in response to the trigger operation, the to-be-displayed content associated with the second related content;
determine, based on the target configuration data, at least one of a second quick application or a first application program that is associated with the to-be-displayed content;
open the second quick application or the first application program; and
display, based on the processed related content, the to-be-displayed content in the second quick application or the first application program,
wherein the related content and the second related content is data content that is related to the to-be-displayed content and that is able to be used to display the to-be-displayed content in an associating manner after being triggered.

16. The terminal device according to claim 15, wherein the instructions further include instructions to:
obtain the target configuration data for the target quick application from a quick application server.

17. The terminal device according to claim 16, wherein the instructions further include instructions to:
obtain a start operation performed by the user on the target quick application; and
obtain the target configuration data for the target quick application from the quick application server in response to the start operation.

18. The terminal device according to claim 17, wherein the instructions further include instructions to:
obtain first quick application content data of the target quick application in response to the start operation;
determine, from the first quick application content data, first related content associated with the target configuration data;
process the first related content in the first quick application content data based on the target configuration data; and
display a quick application interface of the target quick application based on second quick application content data obtained through processing.

19. The terminal device according to claim 15, wherein the instructions further include instructions to:
obtain an interface update operation performed by the user on the target quick application;
obtain third quick application content data of the target quick application in response to the interface update operation;
determine, from the third quick application content data, first related content associated with the target configuration data;
process the first related content in the third quick application content data based on the target configuration data; and
display a second interface of the target quick application based on fourth quick application content data obtained through processing.

20. The terminal device according to claim 15, wherein the instructions further include instructions to:
obtain an interface update operation performed by the user on the target quick application;
obtain third quick application content data of the target quick application in response to the interface update operation;
display a third interface of the target quick application based on the third quick application content data;
determine, from the third quick application content data, first related content associated with the target configuration data;
process the first related content in the third quick application content data based on the target configuration data;
update the third interface based on fourth quick application content data obtained through processing; and
display a second interface obtained after the update.

* * * * *